United States Patent [19]

Sugita et al.

[11] Patent Number: 5,542,051
[45] Date of Patent: Jul. 30, 1996

[54] WATCH DOG TIMER

[75] Inventors: Mitsuru Sugita; Yurika Sumida, both of Itami, Japan

[73] Assignees: Mitsubishi Denki Kabushiki Kaisha, Tokyo; Mitsubishi Electric Semiconductor Software Corporation, Hyogo, both of Japan

[21] Appl. No.: 202,247

[22] Filed: Feb. 25, 1994

[30] Foreign Application Priority Data

Mar. 3, 1993 [JP] Japan ................................. 5-042687
Dec. 21, 1993 [JP] Japan ................................. 5-322591

[51] Int. Cl.⁶ ............................. G06F 11/34; G11B 27/00
[52] U.S. Cl. .................................... 395/185.04; 371/61
[58] Field of Search ................................ 371/16.3, 16.1, 371/57.1, 60, 61, 62; 395/575; 364/260.8, 261.8, 267.2, 267.9

[56] References Cited

U.S. PATENT DOCUMENTS

| | | | |
|---|---|---|---|
| 4,594,685 | 6/1986 | Owens | 364/900 |
| 4,689,766 | 8/1987 | Kent | 364/900 |
| 4,763,296 | 8/1988 | Gercekci | 364/900 |
| 4,796,211 | 1/1989 | Yokouchi et al. | 371/62 |
| 4,809,280 | 2/1989 | Shonaka | 371/62 |
| 4,811,200 | 3/1989 | Wagner et al. | 364/200 |
| 4,956,842 | 9/1990 | Said | 371/62 |
| 5,333,285 | 7/1994 | Drerup | 395/575 |

FOREIGN PATENT DOCUMENTS 63-95546  4/1988  Japan ........................... G06F 11/30

*Primary Examiner*—Robert W. Beausoliel, Jr.
*Assistant Examiner*—Albert Decady
*Attorney, Agent, or Firm*—Lowe, Price, LeBlanc & Becker

[57] ABSTRACT

A watch don timer comprising a reload register 2 and a shift register 3 is disclosed. In the case where an object to be monitored is operating normally, a circuit 43 is supplied with as a reload request signal the rising timing of a monitor signal changing cyclically, which is reloaded from the reload register 2 of the shift, register 3 in synchronism with a reload request signal in accordance with the value of data located in each bit of the shift register 3. Circuits 41, 42 are adapted to detect an abnormal condition in the case where a reload request signal is given in a cycle shorter or longer than a predetermined cycle of reloading. This configuration realizes a watch dog timer with a comparatively small scale of circuit configuration in which the pulse width of the input signal is monitored, the cycle detected and the execution of a plurality of instructions monitored, while at the same time having a programmable width and cycle and a tolerable range thereof.

23 Claims, 62 Drawing Sheets

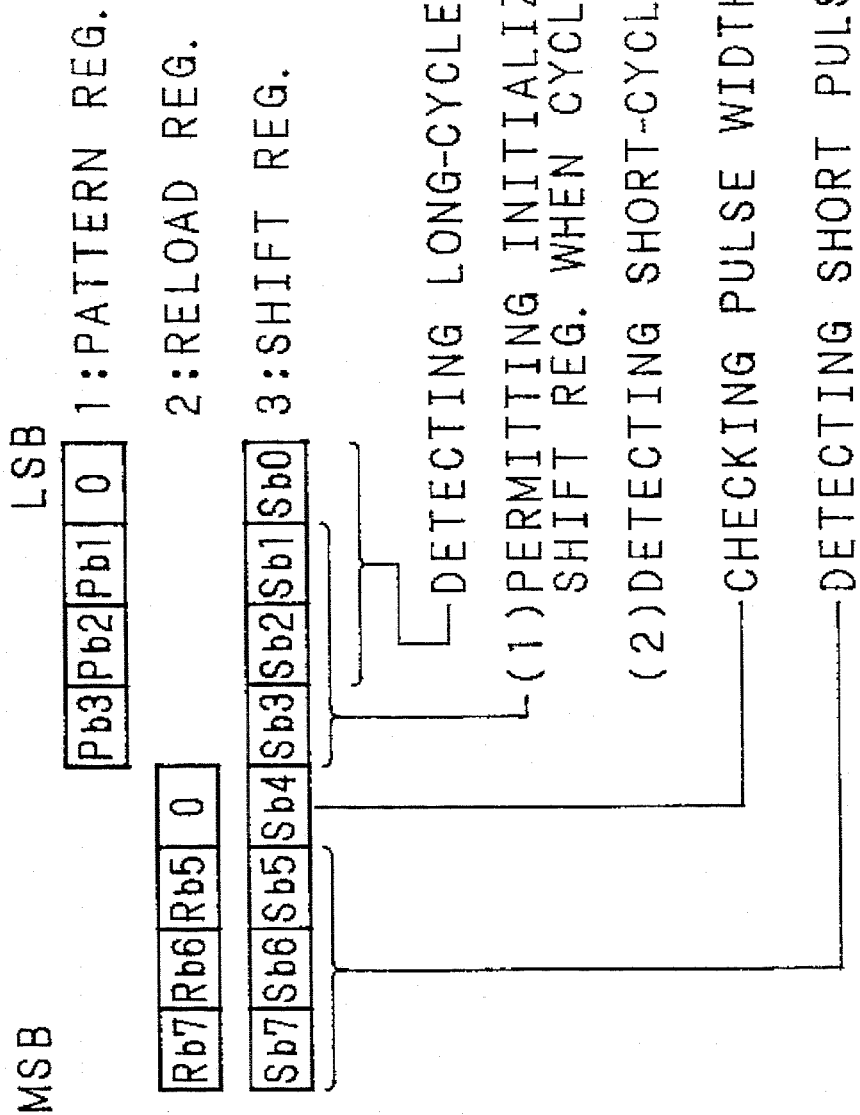

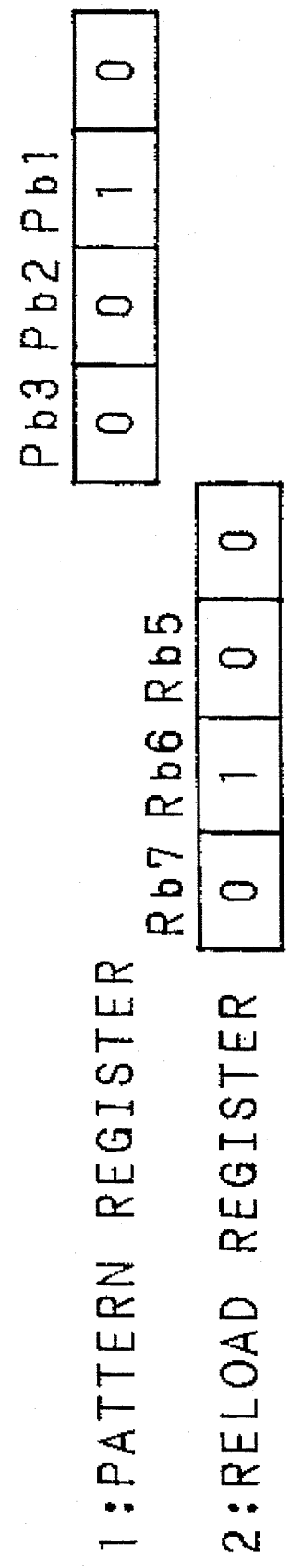

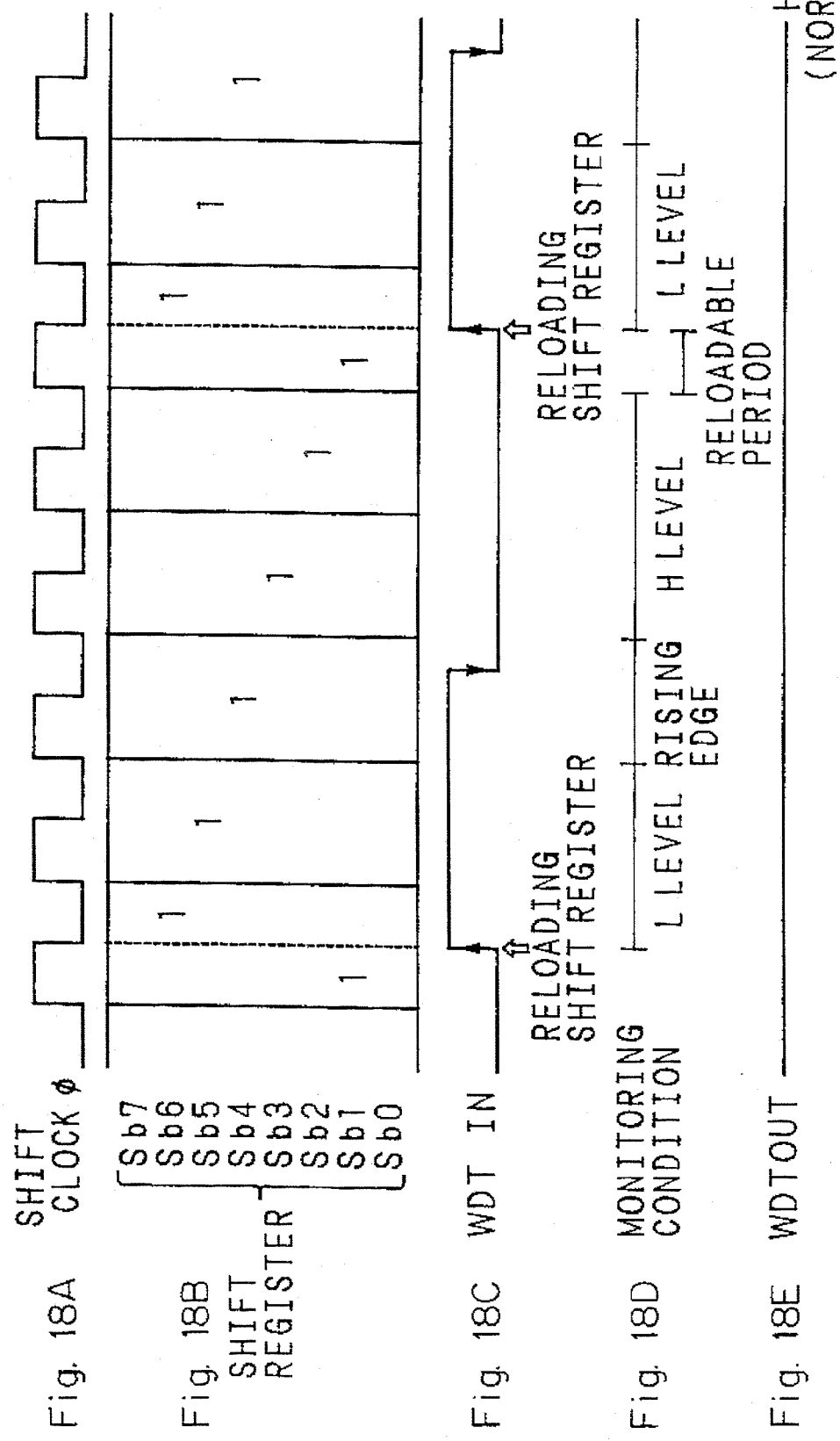

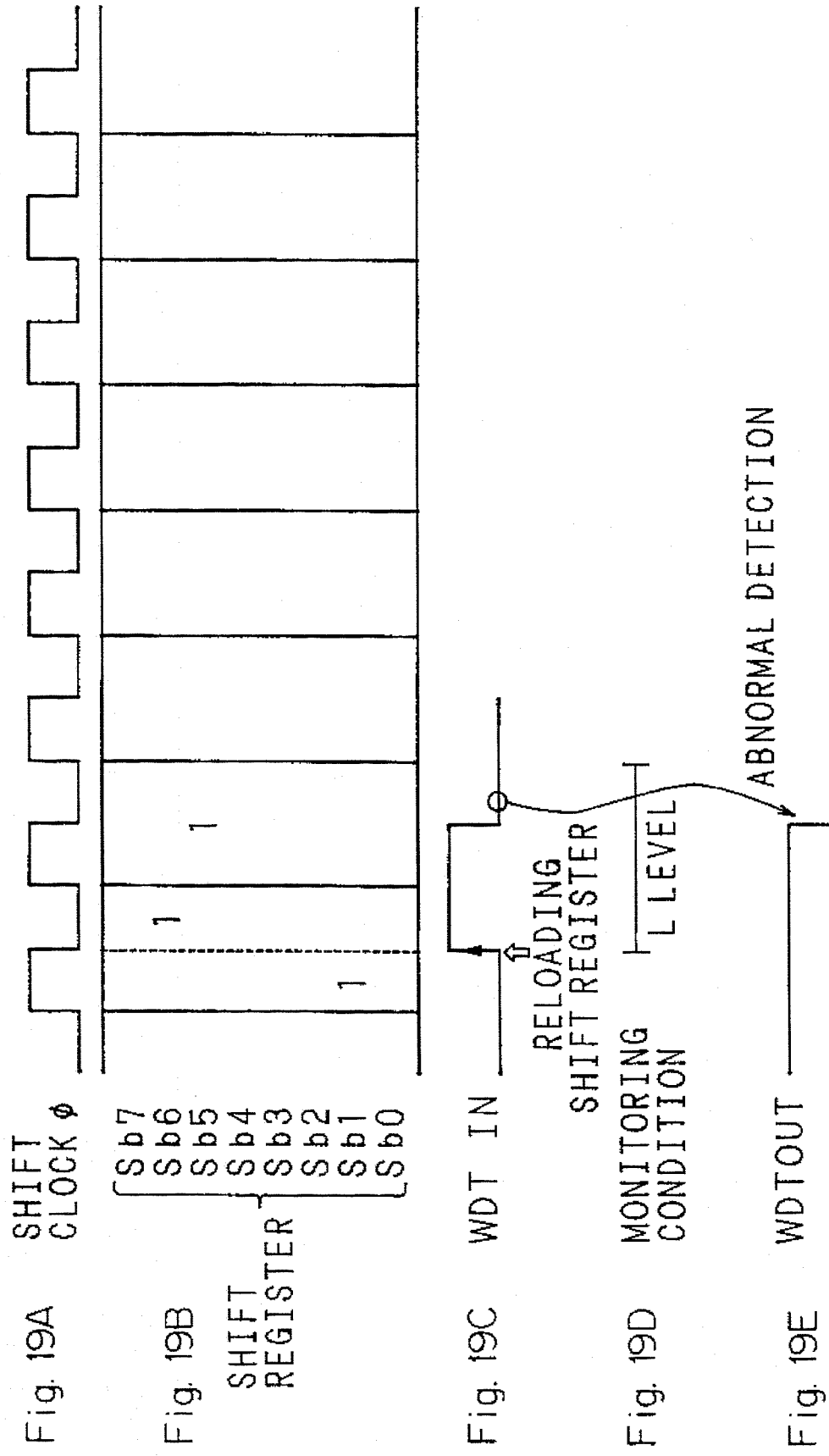

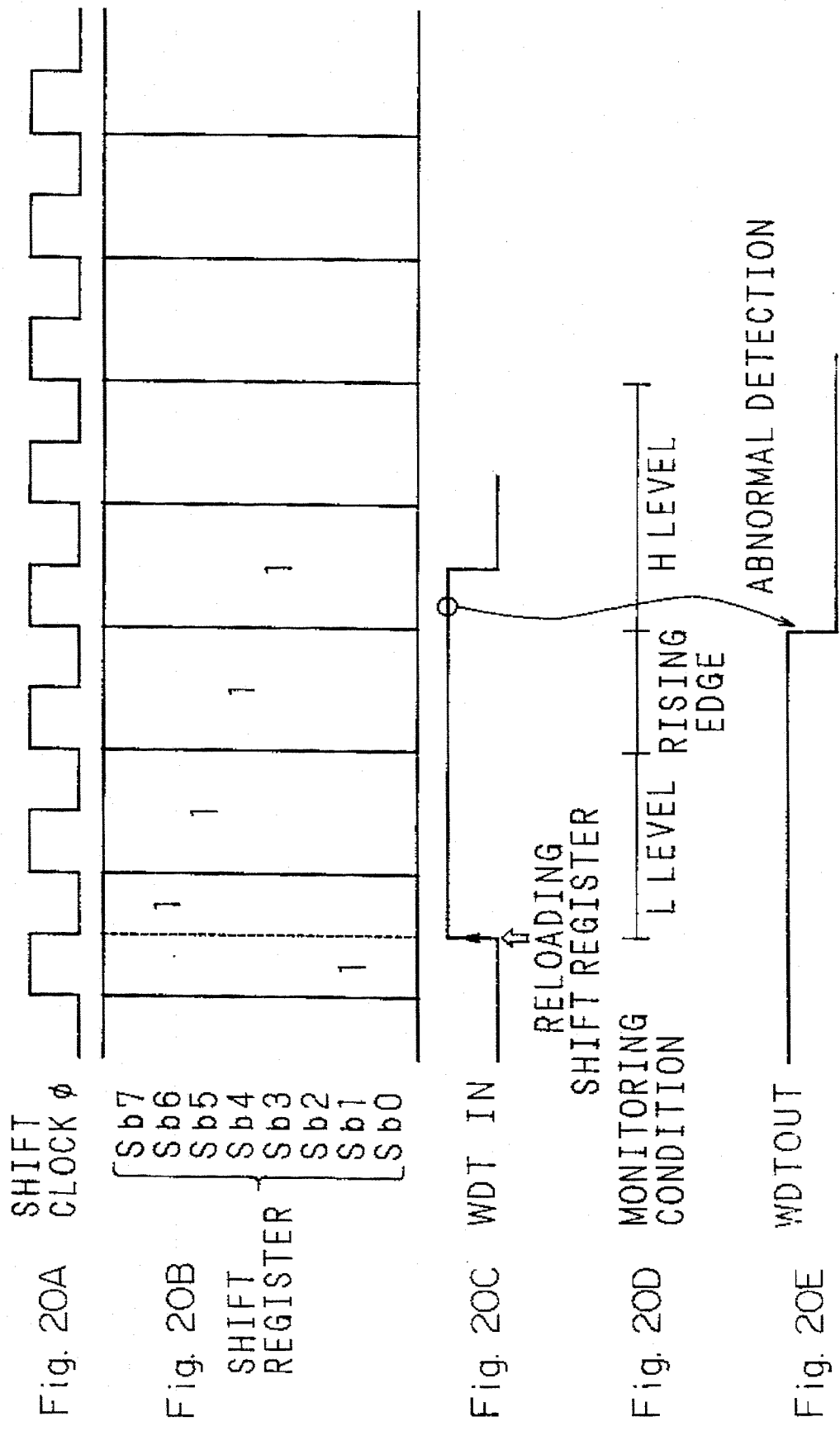

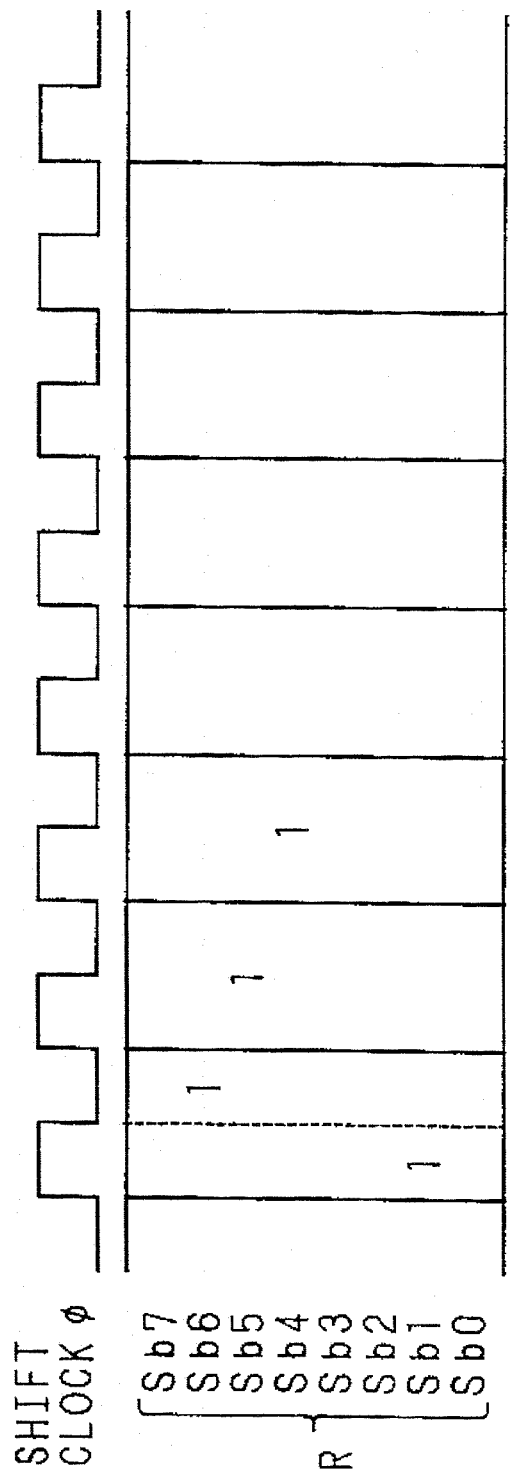
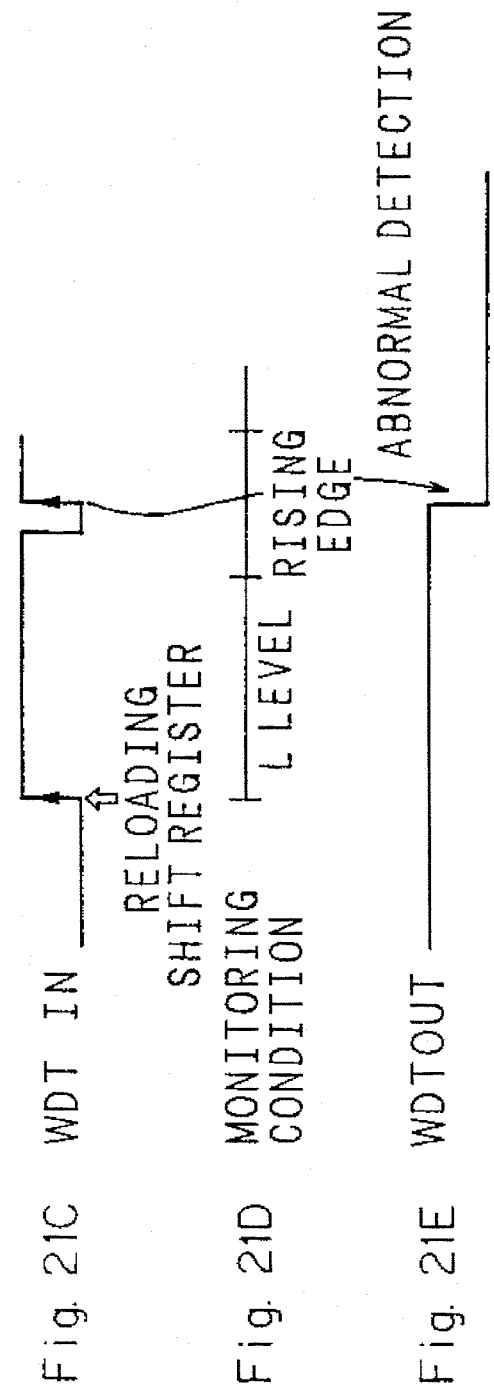
Fig. 21A SHIFT CLOCK φ
Fig. 21B SHIFT REGISTER
Fig. 21C WDT IN
Fig. 21D MONITORING CONDITION
Fig. 21E WDTOUT

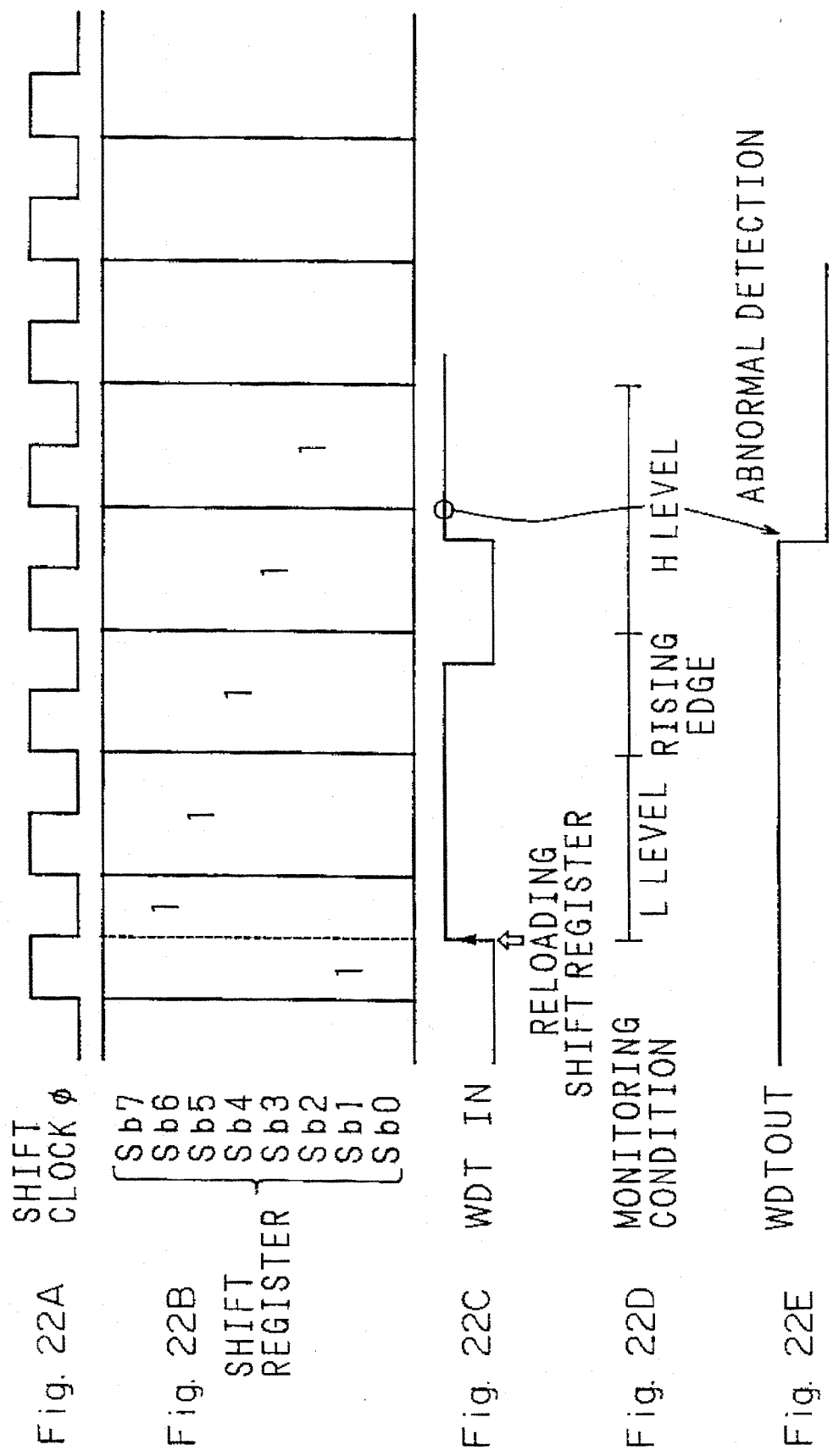

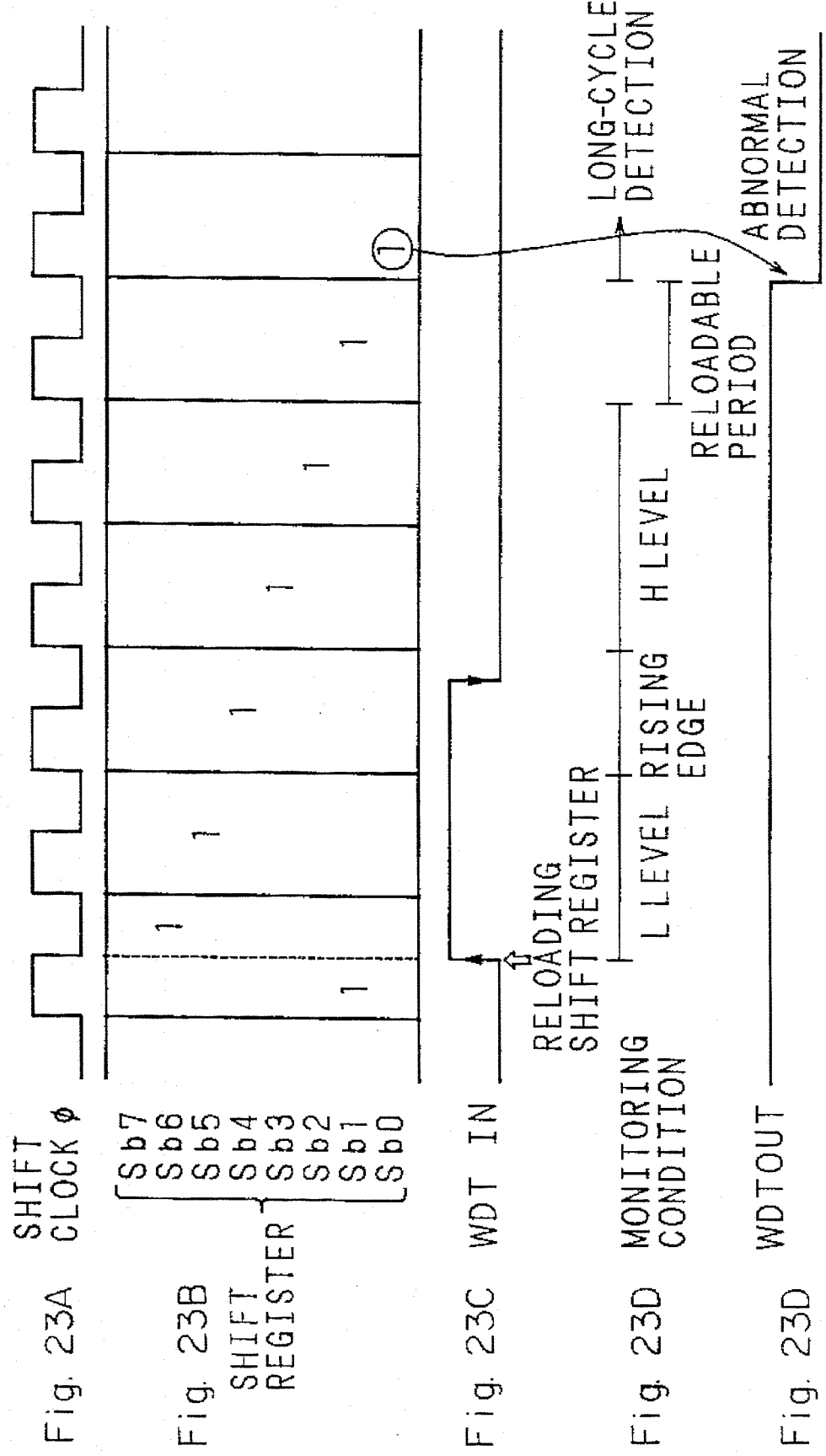

Fig. 24

1: PATTERN REGISTER

| Pb3 | Pb2 | Pb1 | |
|---|---|---|---|
| 0 | 0 | 1 | 0 |

2: RELOAD REGISTER

| Rb7 | Rb6 | Rb5 | |
|---|---|---|---|
| 1 | 0 | 0 | 0 |

1: PATTERN REGISTER
2: RELOAD REGISTER

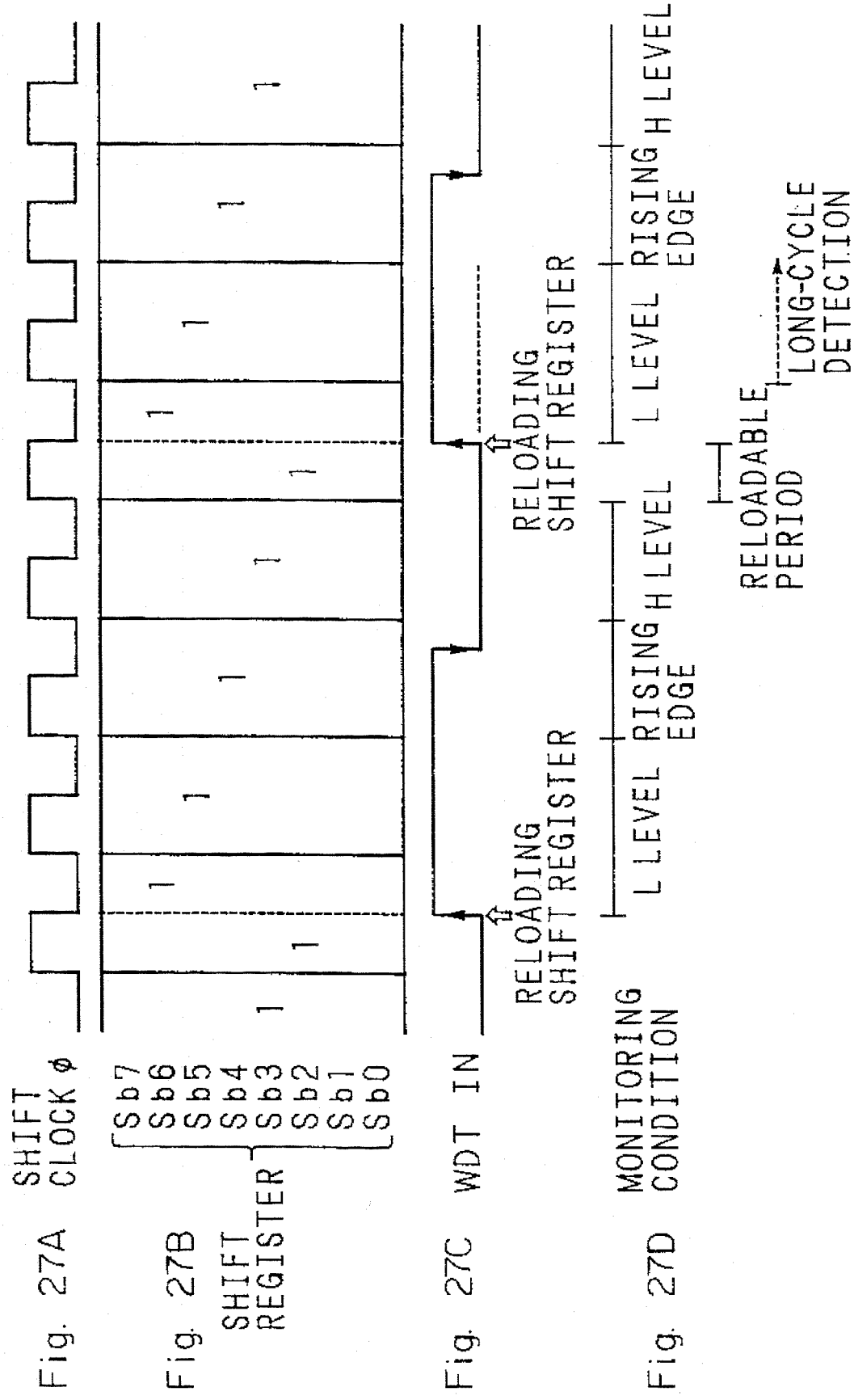

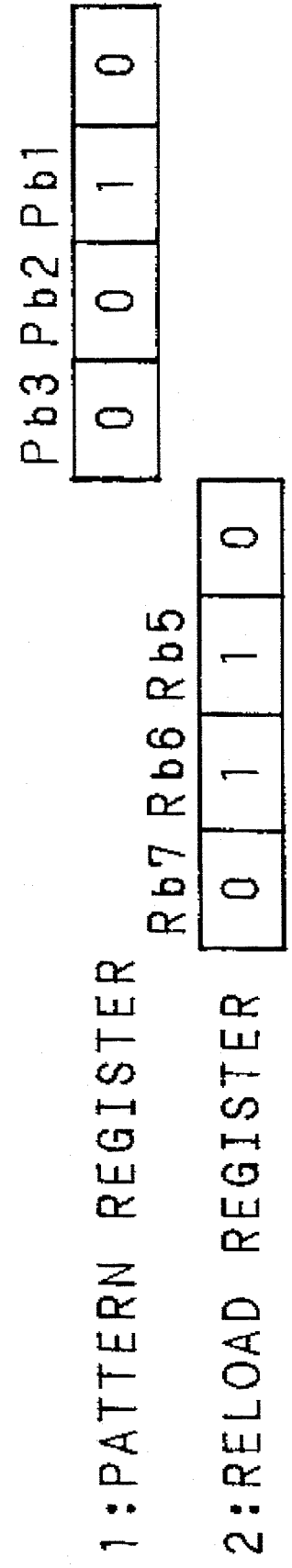

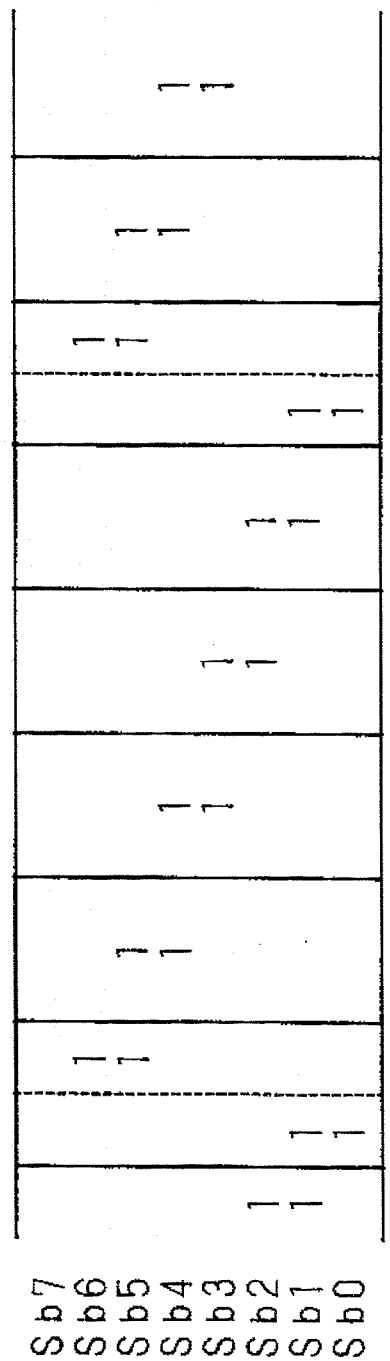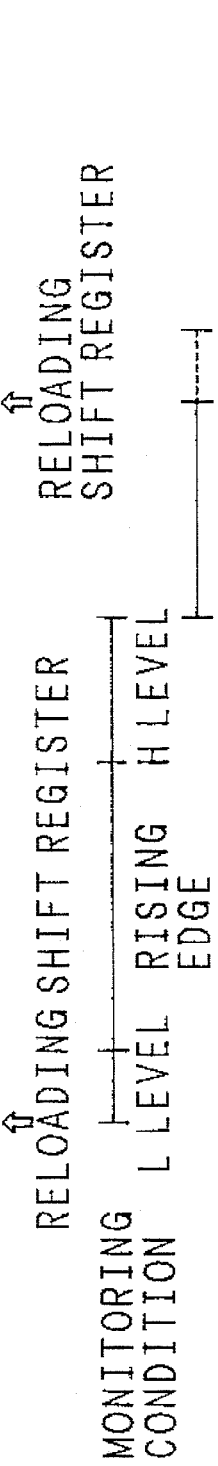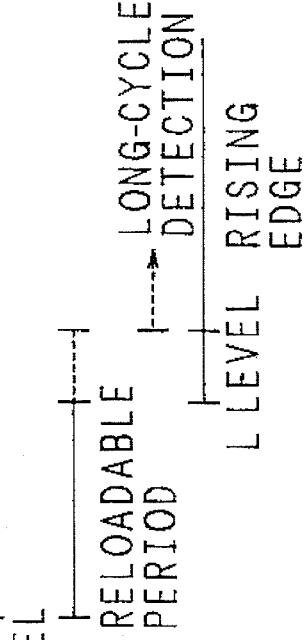
Fig. 29A SHIFT CLOCK φ
Fig. 29B SHIFT REGISTER
Fig. 29C WDT IN
Fig. 29D MONITORING CONDITION Fig. 46A  100: NORMAL OUTPUT CONFIRMATION FREQUENCY REGISTER

Fig. 46B  WDT IN

Fig. 46C  WDTOUT

1: PATTERN REG.

| Pb3 | Pb2 | Pb1 | 0 |
|---|---|---|---|

2: RELOAD REG.

| Rb7 | Rb6 | Rb5 | 0 |
|---|---|---|---|

3: SHIFT REG.

| Sb7 | Sb6 | Sb5 | Sb4 | Sb3 | Sb2 | Sb1 | Sb0 |
|---|---|---|---|---|---|---|---|

DETECTING LONG-CYCLE (1) PERMITTING EXECUTION OF IN1 (PERMITTING RELOADING OF SHIFT REG.)
(2) DETECTING IMPROPER EXECUTION OF IN1, IN2
(3) CHECKING WHETHER IN2 IS EXECUTED WHEN b4="1"

PERMITTING IN2

DETECTING IMPROPER EXECUTION OF IN1, IN2

Fig. 49

1: PATTERN REGISTER

| Pb3 | Pb2 | Pb1 | |
|---|---|---|---|
| 0 | 0 | 1 | 0 |

2: RELOAD REGISTER

| Rb7 | Rb6 | Rb5 | |
|---|---|---|---|
| 0 | 1 | 0 | 0 |

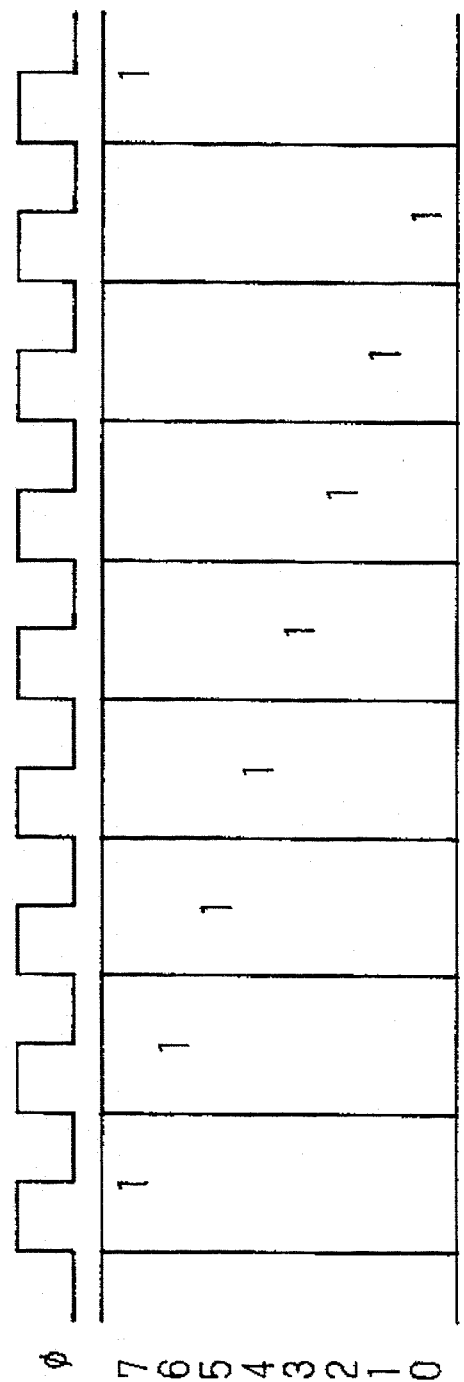
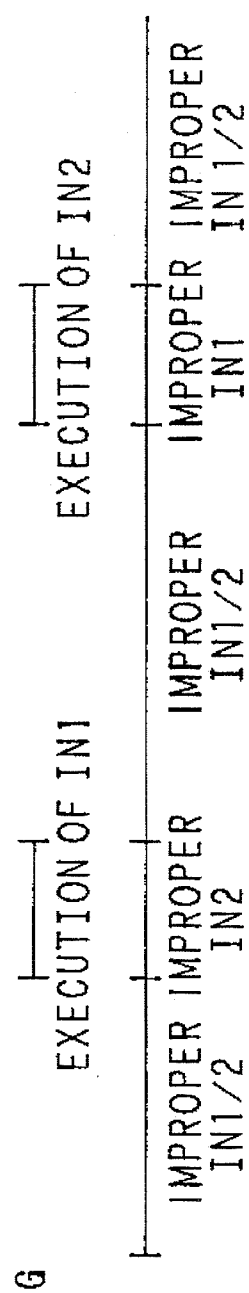
Fig. 62A SHIFT CLOCK φ
Fig. 62B SHIFT REGISTER
Fig. 62C MONITORING CONDITION

WATCH DOG TIMER

BACKGROUND OF THE INVENTION

1. Field of the Invention

The present invention relates to a watch dog timer which is the art for detecting a program runaway of a system using a microcomputer or the like.

2. Description of the Related Art

The block diagram of FIG. 1 shows a general configuration of a conventional watch dog timer.

In FIG. 1, reference numeral 151 designates a counter. The clock φ given from an input terminal 152 are counted as a count source, and when the count value reaches a predetermined value, an overflow signal OVF is outputted from an input terminal 153.

Reference numeral 154 designates a clear terminal of the counter 151 to which a clear signal CLR is given. When supplied with the clear signal CLR, the counter 151 clears the own count value to "0".

Reference numeral 155 designates a 3-input OR gate. A reset signal RESET is given to the first input from the input terminal 156, a clear request signal CLRREQ to the second input from the input terminal 157, and the above-mentioned overflow signal OVF to the third input. As a result, when the OR gate 155 is supplied with any one of the reset signal RESET, the clear request signal CLRREQ or the overflow signal OVF, the clear terminal 154 of the counter 151 is inputted with the clear signal CLR thereby to clear the count value of the counter 151.

The operation of this conventional watch dog timer is described below.

In the case where whether a CPU such as a microcomputer is running away or not is to be judged, the program is constructed in such a manner as to generate a clear request signal CLRREQ within a predetermined period of time. By constructing the program in this way, while the CPU is normally operating, the clear request signal CLRREQ generated within a predetermined period clears the counter 151, so that the counter 151 is cleared before its count value teaches a predetermined value, thereby preventing the overflow signal OVF from being generated.

Now, assume that a runaway has occurred. The CPU is no longer able to generate a clear request signal CLRREQ according to the program, and therefore the count value of the counter 151 reaches a predetermined value to generate an overflow signal OVF. By detecting the generation of this overflow signal OVF, whether a runaway has occurred or not can be judged.

Also, in the case where two CPUs are used for mutual monitoring or the like, a clear request signal CLRREQ can be given from one of the two CPUs to use the overflow signal OVF as a control signal for the remaining CPU.

Further, in the case where a plurality of programs are run concurrently by the use of two CPUs, a clear request signal CLRREQ is generated by the same procedure from the two CPUs to generate an overflow signal OVF.

The conventional watch dog timer is constructed as described above. Therefore, the detection is limited to a long period over a counting period when no clock is generated, and such an operation as to monitor the program execution individually or over a short period is impossible.

Also, in the case where CPUs are mutually monitored in a multiprocessor system, no more than the period of the waveform generated by the monitored CPU can be detected, and the operation of pulse width monitoring is impossible. Although such a problem can be solved by providing a plurality of watch dog timers or counters, for example, a new problem of an increased circuit size arises.

SUMMARY OF THE INVENTION

The invention has been made in view of the above-mentioned situations, and the object of the invention is to provide a watch dog timer with a comparatively small circuit configuration, in which the monitoring of the pulse width of an input signal, detection of the period or the monitoring of execution of a plurality of instructions are made possible, and at the same time, the width and period as well as the allowable range thereof are programmable.

The watch dog timer according to the invention is roughly constructed of five inventions. The first invention uses as a monitor signal which cyclically varies when an object to be monitored is operating normally in order to monitor whether the object to be monitored such as a computer system or the like is normally operating. This first invention basically comprises a reload register and a shift register, means for reloading the shift register from the reload register in accordance with the value of the data located at each bit of the shift register and means for changing the contents of monitoring.

The second invention comprises a register in which an optional data can be set as monitoring pattern setting means for setting patterned data of the contents to be monitored to be performed during a cycle of the monitor signal.

Further, the third invention comprises normal input detecting means for detecting the start of a normal period of the monitor signal and a register for setting the frequency thereof. This third invention is so configured that in the case where an abnormal condition is detected, a normal condition is considered to have been returned only after a normal start of a period of the monitor signal is detected by the normal input detecting means the same number of times that is set in the register without the abnormal condition being detected again.

The fourth invention, which has basically the same configuration as the second invention, comprises a register capable of setting an optional data as a monitoring pattern setting means for setting a period of execution of a first instruction and a timing of executing a second instruction during the particular period in order to monitor the execution conditions of two instructions.

Further, the fifth invention comprises a rotary type shift register for reducing the hardware volume by deleting the reload register and the register capable of setting an optional data as the monitoring pattern setting means from the fourth invention.

Each of the above-mentioned basic inventions comprises, in order to prevent a malfunction, means for detecting that all of the bits of the data to be initialized in the shift register have the same value, means for detecting that a predetermined value for setting a reloadable period in the shift register from the reload register is include in the data of the shift register in the form of abnormal conditions, and means for detecting that a predetermined value of the period during which reloading from the reload register to the shift register is possible is not included in the data to be initialized from the reload register to the shift register.

Further, each of the above-mentioned basic inventions employs a configuration for synchronizing the shift clock of a shift register with the timing of reloading the data in the shift register from a reload register in order to assure accurate operation.

Furthermore, each of the above-mentioned basic inventions comprises, for the purpose of reducing the hardware, a circuit for setting fixed data as monitoring pattern setting means which sets data patterned from the contents of the monitoring operation to be performed during a cycle of the monitor signal, in which case there is also included means for changing the period of the shift clock of the shift register.

According to the watch dog timer of the first invention, the contents to be monitored are varied basically with the shifting of the value of each bit of the shift register by the shift clock, and when the periodical change of the monitor signal is normal, the shift register is reloaded cyclically from the reload register.

According to the second invention, in the case where the system comprises a register as monitoring pattern setting means for setting the data patterned from the contents to be monitored to be performed during one cycle of the monitor signal, the timing is set for reloading from the reload register into the shift register and the pattern of the contents to be monitored. Also, in the case where the system comprises means for setting the data fixed as monitoring pattern setting means for setting the data patterned from the contents to be monitored to be performed during a cycle of the monitor signal, it also includes means for changing the period of the shift clock of the shift register, whereby the shifting period of the shift register is changed to change the monitoring pattern.

Further, according to the third invention, in the case where an abnormal condition is detected, a normal condition is returned after normal inputs by the number of times set in the register without subsequent repeated detection of an abnormal condition.

Further, according to the fourth invention, the execution timing of the first instruction and the execution timing of the second instruction are set in the monitoring pattern setting means thereby to monitor the execution period of the two instructions.

further, according to the fifth invention, the operation similar to the data reloading on a shift register from a reload register is effected by the rotational shifting of data of a rotary type shift register.

A malfunction is prevented upon detection that all of the bits of the data to be initialized in the shift register have the same value, upon detection that a predetermined value of the reloadable period into the shift register from the reload register is contained in the data in the shift register in abnormal conditions, and further upon detection that a predetermined value of the reloadable period into the shift register from the reload register is not included in the least in the data to be initialized in the shift register from the reload register.

Further, since the timing of reloading data from the reload register to the shift register is synchronized with the shift clock of the shift register, the reloading period of data from the reload register to the shift register is uniquely determined in accordance with the clock period.

The above and further objects and features of the invention will more fully be apparent from the following detailed description with accompanying drawings.

BRIEF DESCRIPTION OF THE DRAWINGS

FIG. 16 is a schematic diagram showing the monitoring operation which is to be performed depending on the value held by each bit of the shift register of the watch dog timer according to the sixth embodiment of the invention.

FIG. 17 is a schematic diagram showing an example of setting of each bit of the reload register and each bit of the pattern register of the watch dog timer according to the sixth embodiment of the invention, FIGS. 18(a)–18(e) are a timing chart showing the operating conditions in the case where the monitor input signal is normal for the watch dog timer according to the sixth embodiment of the invention.

FIGS. 19(a)–19(e) are a timing chart showing the operating conditions in the case where the monitor input signal is abnormal for the watch dog timer according to the sixth embodiment of the invention.

FIGS. 20(a)–20(e) are a timing chart showing the operating conditions in the case where the monitor input signal is abnormal for the watch dog timer according to the sixth embodiment of the invention.

FIGS. 21(a)–20(e) are a timing chart showing the operating conditions in the case where the monitor input signal is abnormal for the watch dog timer according to the sixth embodiment of the invention.

FIGS. 22(a)–22(e) are a timing chart showing the operating conditions in the case where the monitor input signal is abnormal for the watch dog timer according to the sixth embodiment of the invention.

FIGS. 23(a)–23(d) are a timing chart showing the operating conditions in the case where the monitor input signal is abnormal for the watch dog timer according to the sixth embodiment of the invention.

FIG. 24 is a schematic diagram showing another setting example of each bit of the reload register and each bit of the pattern register of the watch dog timer according to the sixth embodiment of the invention.

FIGS. 27(a)–27(d) are a timing chart showing the operating conditions of the watch dog timer for a setting example of each bit of the reload register and each bit of the pattern register shown in FIG. 26 according to the sixth embodiment of the invention.

FIG. 28 is a schematic diagram showing still another setting example of each bit of the reload register and each bit of the pattern register of the watch dog timer according to the sixth embodiment of the invention.

FIGS. 29(a)–29(d) are a timing chart showing the operating conditions of the watch dog timer for a setting example of each bit of the reload register and each bit of the pattern register shown in FIG. 28 according to the sixth embodiment of the invention.

FIG. 47 is a circuit diagram showing a configuration example of the watch dog timer according to the 14th embodiment of the invention.

FIG. 48 is a schematic diagram showing the monitoring operation to be conducted depending on the value held by each bit of the shift register of the watch dog timer according to a 14th embodiment of the invention.

FIG. 49 is a schematic diagram showing a setting example of each bit of the reload register and each bit of the pattern register of the watch dog timer according to the 14th embodiment of the invention.

FIGS. 62(a)–62(c) are a timing chart showing the operating conditions of the watch dog timer according to the 21st embodiment of the invention.

DESCRIPTION OF THE PREFERRED EMBODIMENTS

The invention will be explained in detail below with reference to the drawings showing embodiments thereof.

[Embodiment 1]

Figure 1:
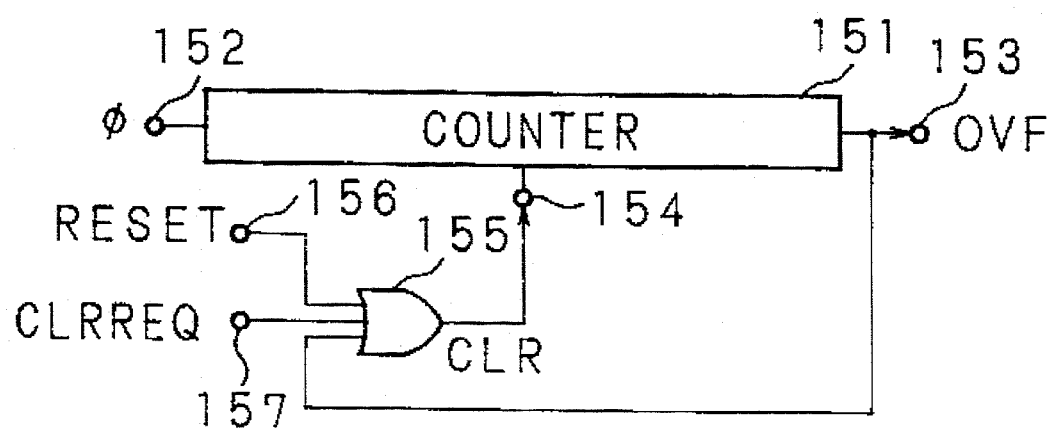
FIG. 1 is a block diagram showing a general configuration of a conventional watch dog timer.
Figure 2:
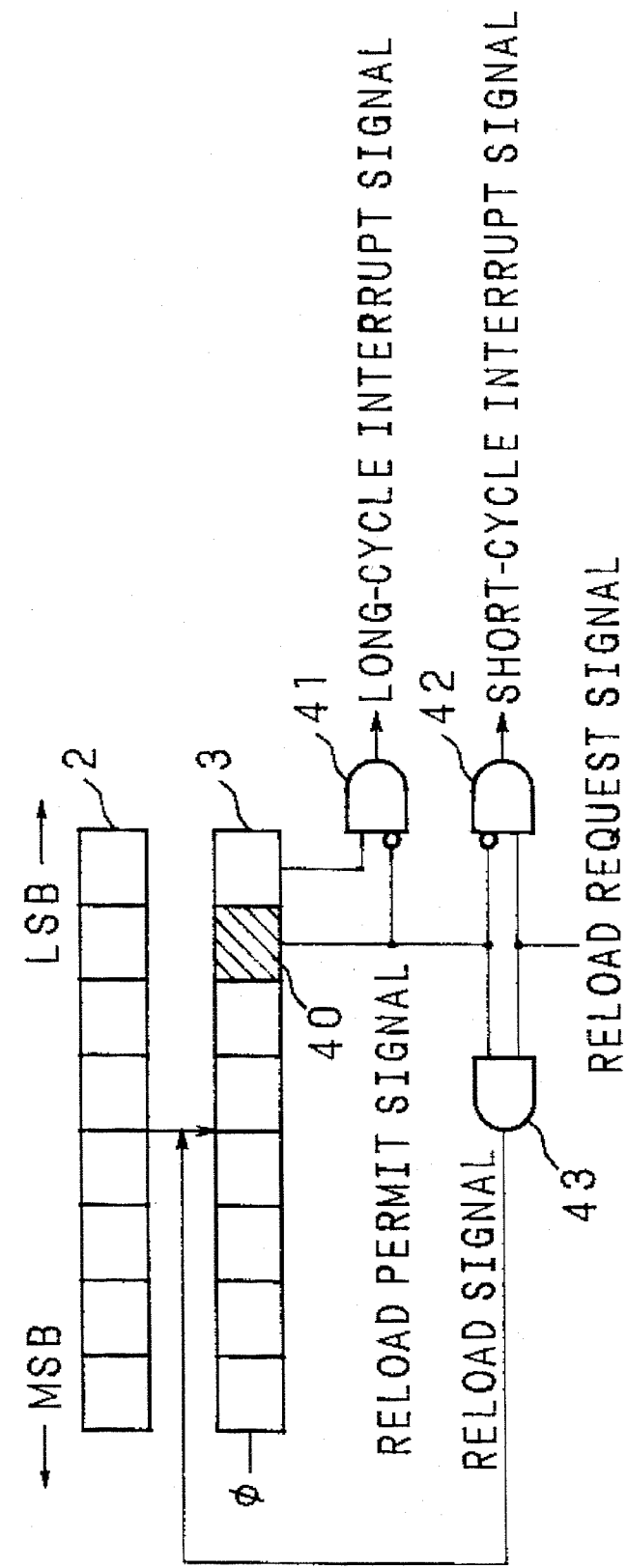
FIG. 2 is a circuit diagram showing a configuration example of a first embodiment of the basic configuration of a watch dog timer according to the invention.

FIG. 2 is a circuit diagram showing a configuration example of a first embodiment having a basic configuration of the watch dog timer according to the invention.

In FIG. 2, reference numeral 2 designates a reload register, and 3 a shift register, and each of them is an eight-bit register in the first embodiment.

Both the reload register 2 and the shift register 3 have the MSB on the left-hand side and the LSB on the right-hand side, each of the bits of the two registers being represented as b7 to b0 from MSB to LSB sides.

The reloading of the 8-bit data from the reload register 2 to the shift register 3 is effected by giving "1" level reload signal. This reload signal is outputted from a 2-input AND gate 43 as reloading means. One of the inputs to the AND gate 43 is supplied with a holding value of a reload permit bit 40 being the bit b1 of the shift register 3, and the other input with a reload request signal from an external source.

By the way, the reload request signal corresponds to the clear request signal in the conventional example, and it is a monitor signal changing cyclically, as long as the system to be monitored by the circuit shown in FIG. 2 operates under normal conditions.

As a result, in the case where the bit b1 of the shift register 3, i.e., the holding value of the reload permit bit 40 is "1" (active) and the reload request signal is "1" (active), a high level (hereinafter referred to as H level) reload signal is outputted from the AND gate 43 and the data held in each bit of b7 to b0 of the reload register 2 is reloaded in each bit of b7 to b0 of the shift register 3.

The shift register 3 is supplied with a clock φ as a shift clock, and the data held in the shift register 3 is shifted from MSB b7 to LSB b0 for each of the clock φ.

Reference numeral 41 designates a two-input AND gate being second abnormal condition detecting means. One of the inputs to the AND gate is supplied with a value held in the bit b0 being the LSB of the shift register 3, and the other negative logic input with a holding value of the reload permit bit (b1) 40. As a consequence, this AND gate 41 outputs an H level signal when the bit b0 of the shift register 3 is "1" level and the reload permit bit (b1) 40 "0" level.

The output signal from the AND gate 41 is a long-cycle interrupt signal and indicates that no reload request has been made during a predetermined time length.

Reference numeral 42 designates a two-input AND gate being first abnormal condition detecting means. The negative logic input thereto is supplied with a holding value of the reload permit bit (b1) 40, and the other input with the reload request signal. Consequently, this AND gate 42 outputs an H level signal when the reload permit bit (b1) 40 of the shift register 3 holds "0" and the reload permit signal is active ("1").

The output signal from the AND gate 42 is a short-cycle interrupt signal and indicates that a reload request has been made before the lapse of a predetermined time length.

Figure 3:
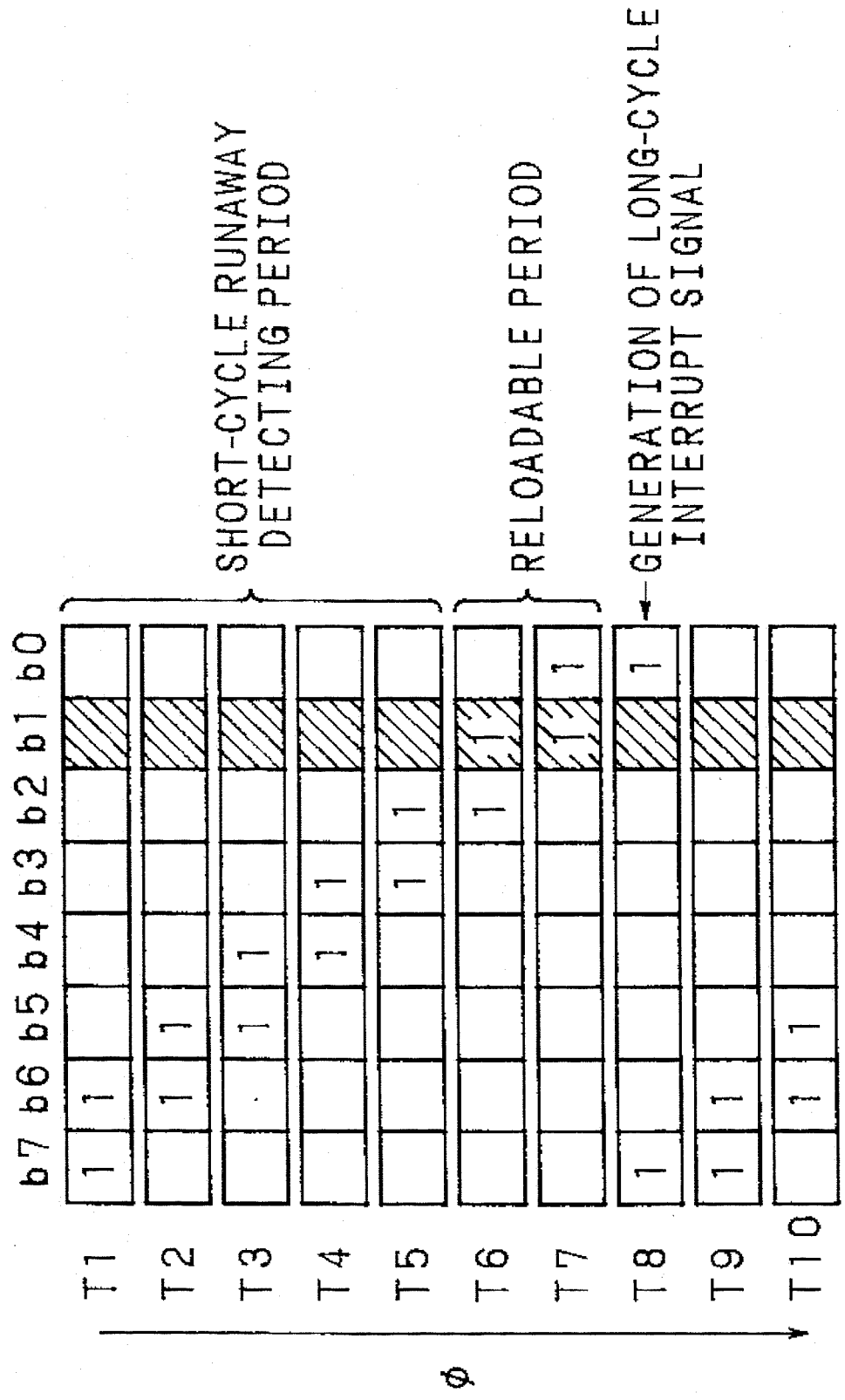
FIG. 3 is a schematic diagram showing the monitoring operation which is performed according to the value held by each bit of the shift register of a watch dog timer according to the first embodiment of the invention.

FIG. 3 is a schematic diagram showing the type of monitoring operation to be performed by the circuit shown in FIG. 2 depending on the value held in the bits b7 to b0 of the shift register 3.

In the watch dog timer according to a first embodiment of the invention, the bit data which is active is designated by "1", and the manner in which "1" data are shifted by clock φ is depicted from upper to lower sides in FIG. 3. By the way, the initial value reloaded in the shift register 3, that is, the set value of the reload register 2 is "11000000", i.e., "COH (H indicates a hexadecimal number)".

First, assume that an active reload request signal is given when the reload permit bit 40 of the shift register 3 holds "1" under normal conditions. An H level reload signal is outputted from the AND gate 43, and the set value "COH" of the reload register 2 is reloaded in the shift register 3. The value held by each bit b7 to b0 of the shift register 3 under this condition is shown by T1.

Next, the shift register 3 is shifted one bit by each pulse of clock φ into state T2. Further, when the shift register 3 is shifted by the sequential pulses of clock φ, 2-bit continuous "1" data T3, T4, . . . are shifted sequentially inside the shift register 3.

Under this condition, assume that an active reload request signal is supplied anew from an external source before the data "1" is shifted to the bit b1 of the shift register 3 being the reload permit bit 40, i.e., before the state T6 in FIG. 3 is taken. The negative logic input terminal of the AND gate 42 is supplied with data "0" of the reload permit bit (b1) and the other input with "1" of the reload request signal. Therefore, the short-cycle interrupt signal being an output signal thereof assumes "1", i.e., it becomes active. This operation detects that a reload request was issued before the lapse of a predetermined time length. In other words, the fact is detected that the monitor signal is shorter in period than it would be under normal conditions, i.e., that a short-cycle runaway has occurred.

Under the state T6 or T7 shown in FIG. 3, i.e., during a reloadable period, the data "1" is shifted to the reload permit bit (b1) 40. The data "1" thus shifted to the reload permit bit (b1) 40 is given to the negative logic input terminal of the AND gate 42. Even when an active reload request signal is supplied from an external source, therefore, the output signal of the AND gate 42, i.e., the short-cycle interrupt signal fails to become active. Since the data "1" held by the reload permit bit (b1) 40 is given also to one of the inputs of the AND gate 43 during the reloadable period, in the case where "1" level reload request signal is supplied, the reload signal being an output signal of the AND gate 43 becomes active ("1"), so that the data is reloaded from the reload register 2 to the shift register 3.

Further, in the case where an active reload request signal is not inputted during the above-mentioned reloadable period and the state T8 in FIG. 3 is reached directly, the data "1" is shifted to the bit b0 of the shift register 3 and the data "0" to the reload permit bit (b1) 40. The data "1" thus shifted to bit b0 is given to an input of the AND gate 41, the other negative logic input of which is supplied with the data "0" shifted to the reload permit bit (b1) 40. The long-cycle interrupt signal being an output signal of the AND gate 41 thus becomes active.

This operation detects the fact that no reload request has been issued after the lapse of a predetermined length of time. In other words, the fact is detected that the monitor signal has a longer period than under normal conditions, namely, that a long-cycle runaway has occurred.

According to the first embodiment, a reload signal assumes H level and the reload is executed only when a reload request signal is given while the data "1" is held in the reload permit bit 40 which is the bit b1 of the shift register 3. In other words, the reload request signal is received (accepted) only when the data "1" is held in the reload permit bit 40, and an operation is deemed normal only when a reload request signal is issued during the reloadable period.

This is equivalent to say that in the system to be monitored by the circuit shown in FIG. 2, the normal condition is the one in which a reload request signal is generated at the rate of one for each eight cycles of clock φ. As a result, a short-cycle runaway is considered to have occurred when an active reload request signal is issued before the data "1" is shifted to the reload permit bit (b1) 40 of the shift register 3. On the other hand, in the case where the reload request signal is not given while the data "1" is held in the reload permit bit (b1) 40, a long-cycle runaway is considered to have occurred.

Also, the length of the reloadable period can be set as desired according to the time length during which the data "1" is held in the reload permit bit 40, i.e., according to the number of bits of "1" existing continuously in the data reloaded on the shift register 3 from the reload register 2.

By the way, the reload permit signal, unlike in the first embodiment described above, is not necessarily made active in the state of "1", and the number of bits of the registers 2 and 3 is not necessarily limited to eight.

[Embodiment 2]

Figure 4:
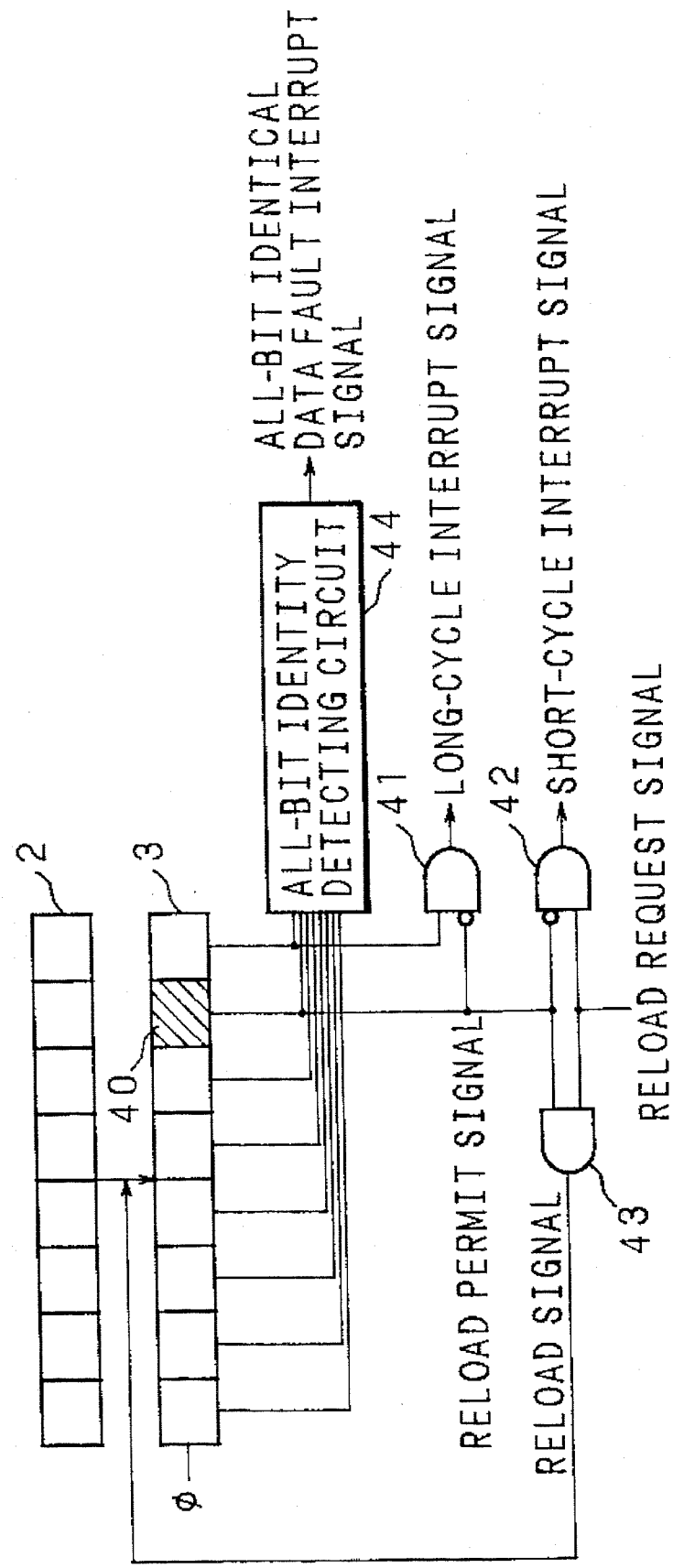
FIG. 4 is a circuit diagram showing a configuration example of the watch dog timer according to a second embodiment of the invention.

FIG. 4 is a circuit diagram showing an configuration example of the watch dog timer according to a second embodiment of the invention.

In the watch dog timer according to the first embodiment of the invention shown in FIG. 2, the system is operated in accordance with whatever data when the data is reloaded in the shift register 3 from the reload register 2, or in accordance with even an erroneous data which may be reloaded. Nonetheless, a normal monitoring operation is impossible, for example, when all of the bits of data reloaded in the shift register 3 from the reload register 2 are active ("1") or all of the bits are non-active ("0").

In view of this situation, the second embodiment shown in FIG. 4 is additionally equipped with a function for generating an interrupt signal upon detection of a case in which all of the bits of the data reloaded in the shift register 3 from the reload register 2 are active or in which all of the bits are non-active.

Specifically, the circuit shown in FIG. 4 additionally includes an all-bit identity detecting circuit designated by reference numeral 44 in the circuit shown in FIG. 2.

Figure 5:
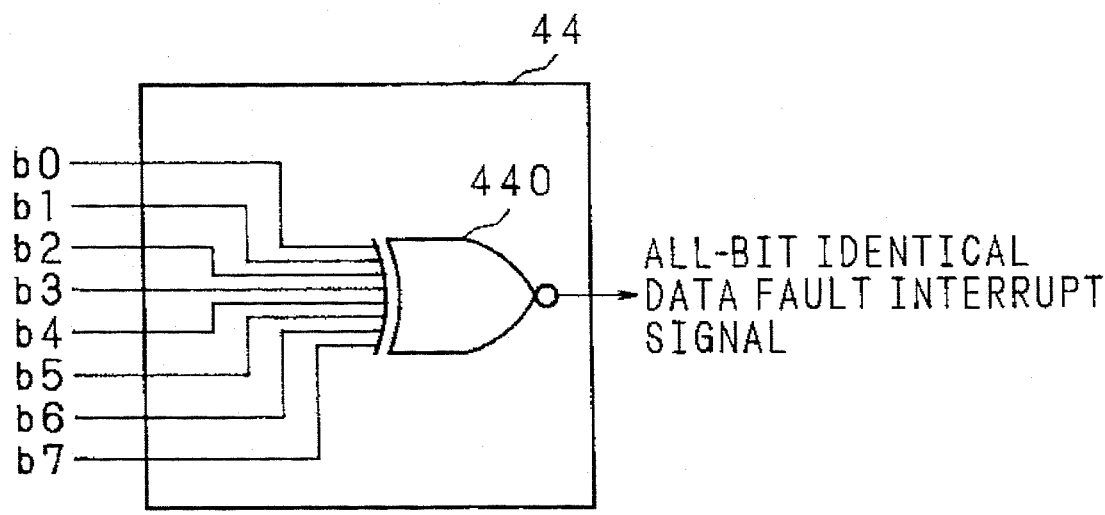
FIG. 5 is a circuit diagram showing a specific example of the configuration of an all-bit identity detecting circuit of the watch dog timer according to the second embodiment of the invention.

This all-bit identity detecting circuit 44 is connected with all of the bits b7 to b0 of the shift register 3, and comprises, for example, of an exclusive NOR gate 440 shown in the circuit diagram of FIG. 5.

In the watch dog timer according to the second embodiment of the invention shown in FIG. 4, in the case where "1" or "0" is written in all of the bits of the shift register 3 from the reload register 2, an H level signal (all-bit identical data fault interrupt signal) is outputted from the exclusive NOR gate 440 of the all-bit identity detecting circuit 44. As a consequence, in the case where an H level signal is outputted from the exclusive NOR gate 440, an appropriate process such as rewriting of data into the reload register 2 is preferably effected.

Figure 6:
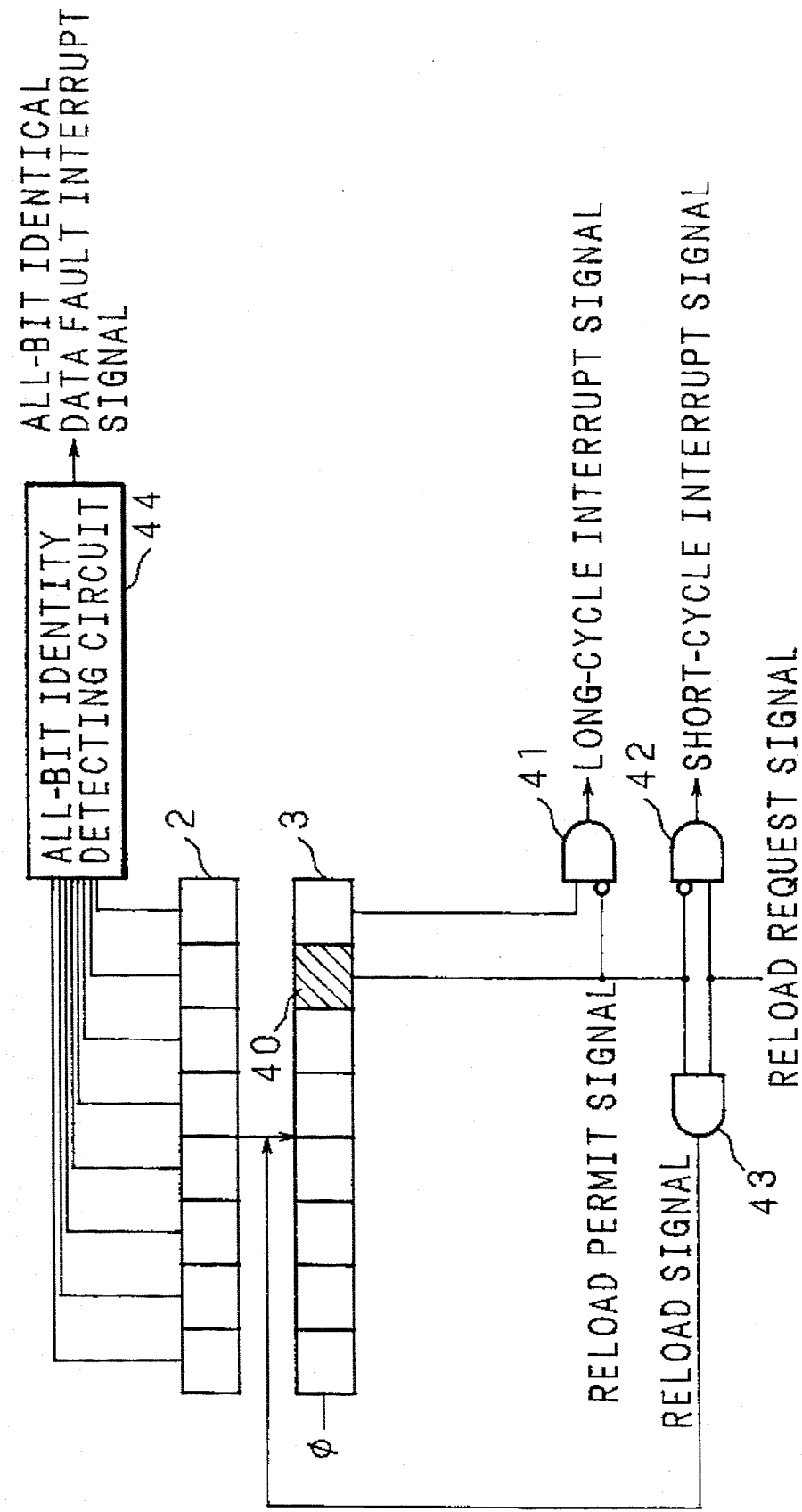
FIG. 6 is a circuit diagram showing another configuration example of the watch dog timer according to the second embodiment of the invention.

FIG. 6 is a circuit diagram showing still another configuration example according to the second embodiment. In this example, all of the bits b7 to b0 of the reload register 2 are connected to the all-bit identity detecting circuit 44 constructed in the same way as shown in FIG. 5 above.

In this way, with still another configuration example of the watch dog timer according to the second embodiment of the invention shown in FIG. 6, in the case where "1" or "0" is written in all of the bits of the reload register 2 as data to be reloaded in the shift register 3 from the reload register 2, an H level interrupt signal (all-bit identical data fault interrupt signal) is outputted from the exclusive NOR gate 440 of the all-bit identity detecting circuit 44.

As explained above, in the watch dog timer according to the second embodiment of the invention, the all-bit identity detecting circuit 44 as shown in FIG. 5 is connected in the manner as shown in FIG. 4 or FIG. 6, so that when the all of the bits of the data reloaded from the reload register 2 to the shift register 3 become "1" or "0", the fact can be detected.

[Embodiment 3]

Figure 7:
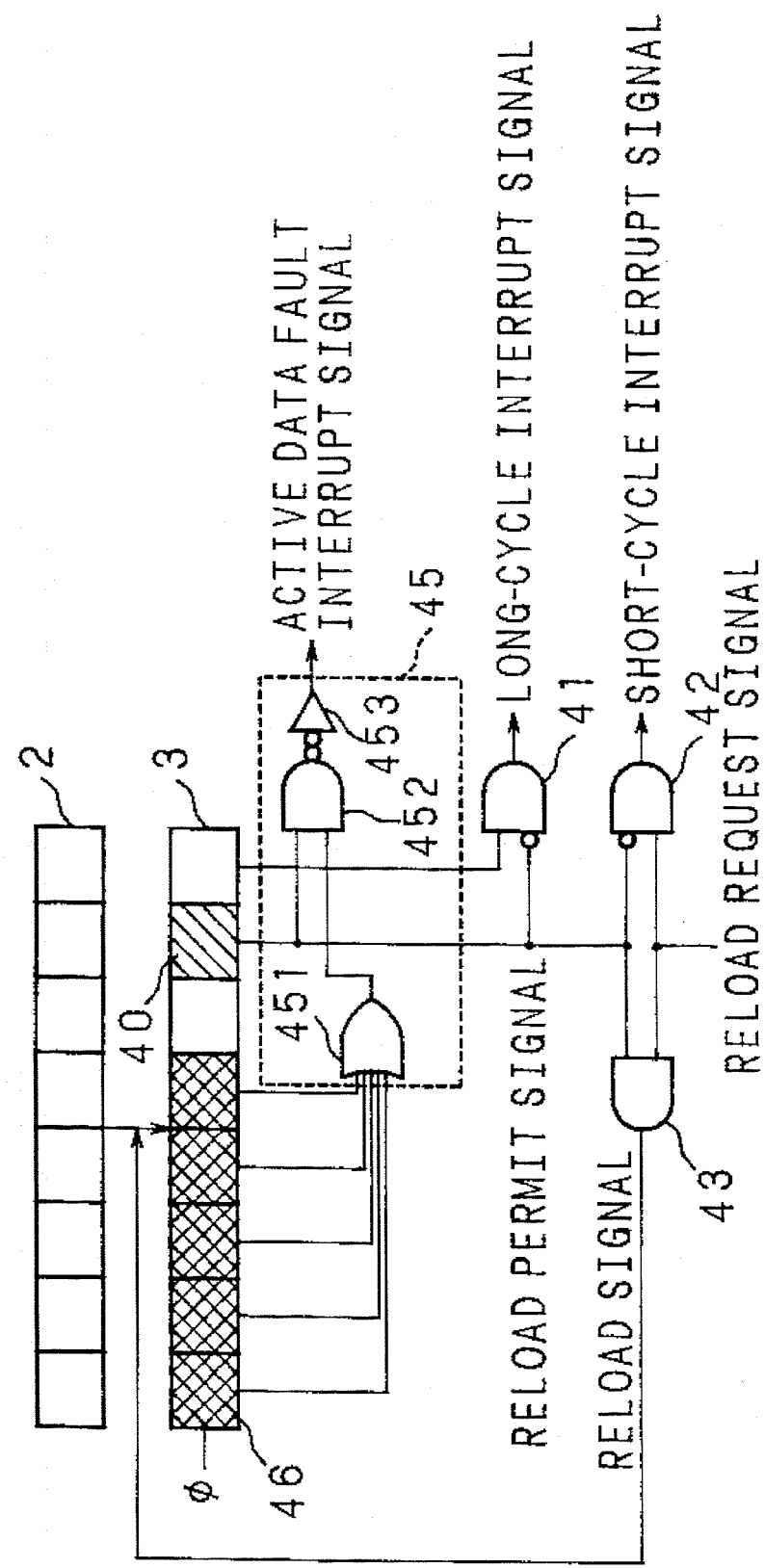
FIG. 7 is a circuit diagram showing a configuration example of the watch dog timer according to a third embodiment of the invention.

FIG. 7 is a circuit diagram showing a configuration example of the watch dog timer according to a third embodiment of the invention.

In the watch dog timer according to the third embodiment of the invention, in the case where the data for activating the reload permit bit (b1) 40 is intermittently written in the shift register 3, or in the case where more than a predetermined number of such data are written, they are detected to generate an interrupt signal.

By the way, in the description that follows, the reloadable period corresponding to two clocks of the clock φ is considered normal and the data representing the other conditions referred to as faulty, as described above.

The circuit depicted in FIG. 7 additionally includes an active data fault detecting circuit designated by reference numeral 45 in the circuit shown in FIG. 2.

This active data fault detecting circuit 45 is connected with bits designated as an active data fault detecting bit group 46 among the all of the bits b7 to b0 of the shift register 3.

By the way, according to the third embodiment, the most significant side five bits of the shift register 3 indicated by the cross hatching in FIG. 7 are designated as the active data fault detecting bit group 46. The reason is described later.

The active data fault detecting circuit 45 is constructed of an OR gate 451 whose input is connected to all of the bits of the active data fault detecting bit group 46, a NAND gate 452 whose input is connected to the output of the OR gate 451 and the reload permit bit (b1) 40, and an inverter 453 for inversely outputting an output of the NAND gate 452.

Figure 8:
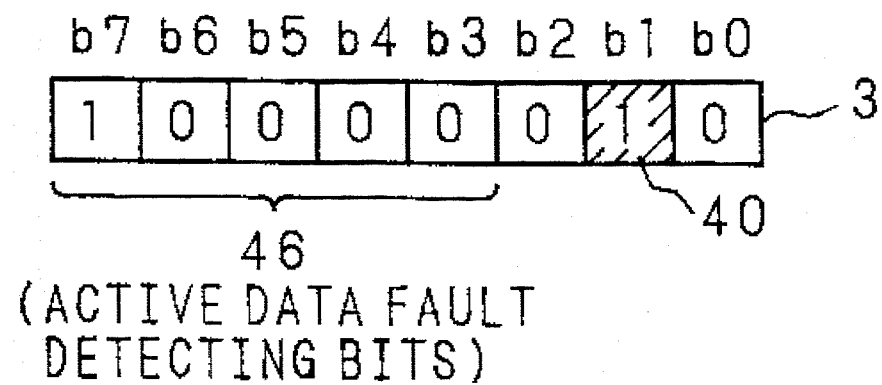
FIG. 8 is a schematic diagram showing a specific example of faulty data set in the shift register of the watch dog timer according to the third embodiment of the invention.
Figure 9:
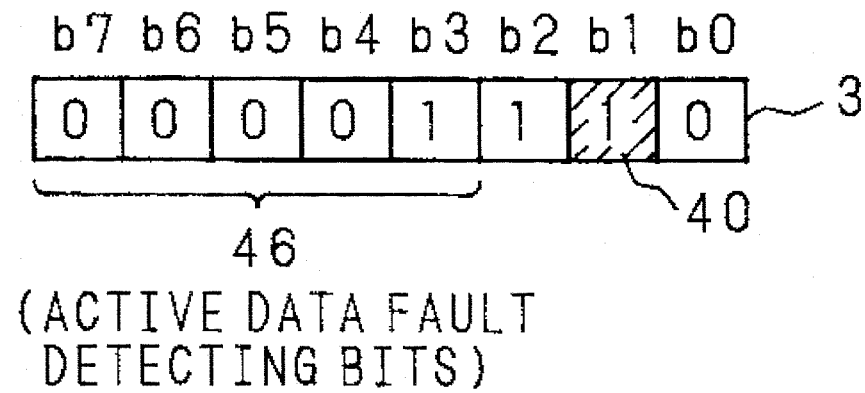
FIG. 9 is a schematic diagram showing a specific example of the faulty data set in the shift register of the watch dog timer according to the third embodiment of the invention.

FIG. 8 and FIG. 9 are schematic diagrams showing specific examples of the faulty data set in the shift register 3.

FIG. 8 shows faulty data causing a reloadable period to be set twice, in which the data "1" is written in the bit b7 in spite of the fact that the data "1" is written also in the reload permit bit 40 being the bit b1 of the shift register 3.

Also, FIG. 9 shows such faulty data that the data "1" is written in the reload permit bit 40 being the bit b1 of the shift register 3 and the data "1" is also written in the continuous bits b2 and b3, thereby the reloadable period covering three clocks of the clock φ.

The operation of the watch dog timer according to the third embodiment of the invention is described below.

In the case where the faulty data as shown in FIG. 8 and FIG. 9 are held in the shift register 3, for instance, the data "1" is held in the reload permit bit (b1) 40, while at the same time the data "1" is held in any of the bits included in the active data fault detecting circuit 46 designated as the most significant side five bits of the shift register 3. The output of the OR gate 451 of the active data fault detecting circuit becomes "1". As a result, both inputs to the NAND gate 452 become "1", and the output thereof becomes "0". Therefore, the output of the inverter 453, i.e., the output of the active data fault detecting circuit 45 (the active data fault interrupt, signal) turns to H level.

As described above, in the watch dog timer according to the third embodiment of the invention, the most significant side five bits b7 to b3 of the shift register 3 are designated as the active data fault detecting bit group 46, and the reload permit bit 40 as the bit b1. Thus, the number of bits up to the reload permit bit (b1) 40 when counted from the least significant bit b3 of the active data fault detecting bit group 46 is three. The result is that it is possible to detect a fault occurring in the case where three or more bits of active data ("1") are successively written in the shift register 3, i.e., in the case where such data as involving three or more clocks are written in spite of the fact that the normal reloadable period covers two clocks of the clock φ, or in the case where active data are intermittently written in the shift register 3, i.e., in the case where such data as to set two or more reloadable periods during one period of monitoring operation are written in the shift register 3.

Figure 10:
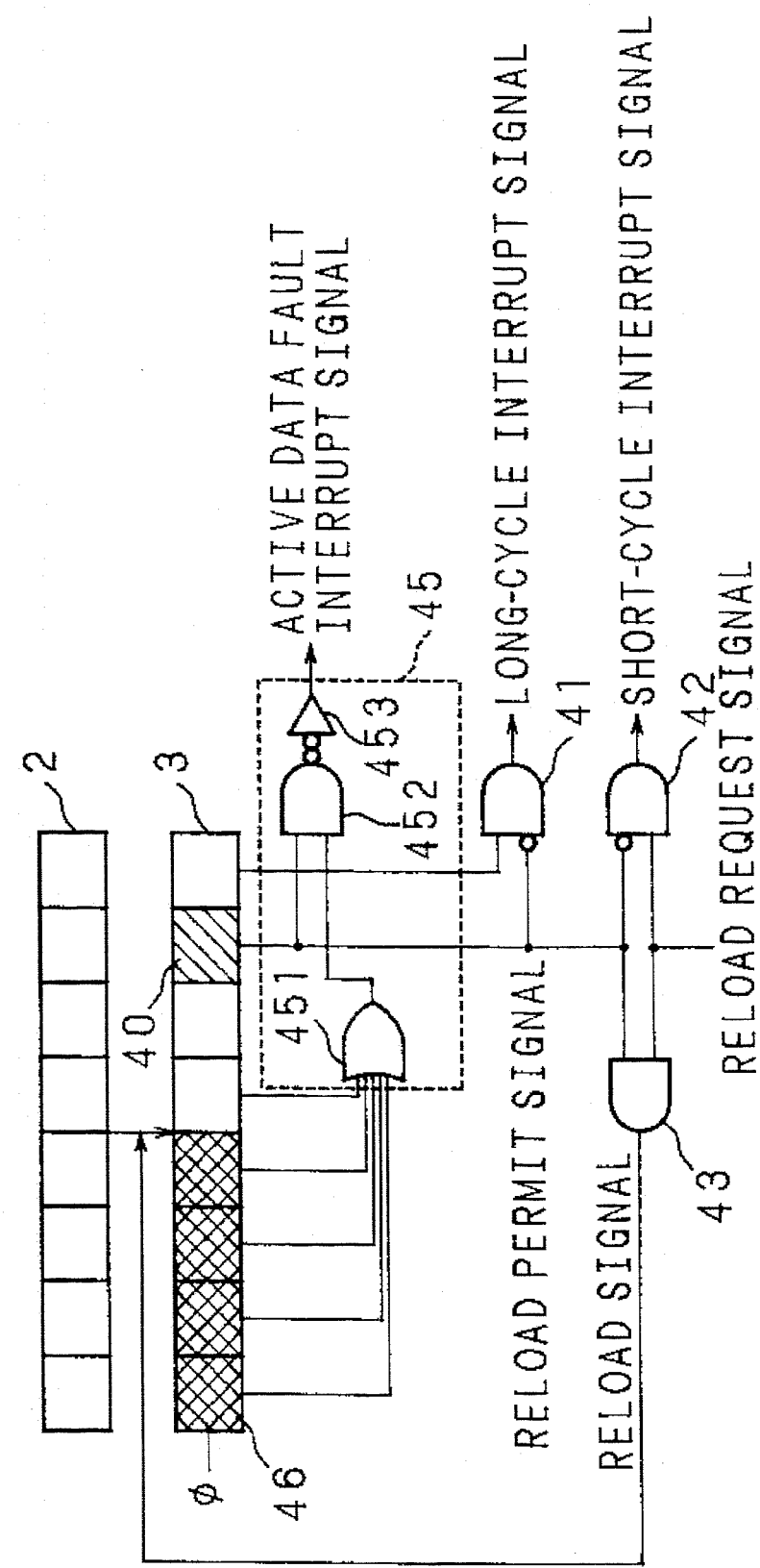
FIG. 10 is a circuit diagram showing a configuration example in which the faulty bits detected as active data are the most significant side four bits in the watch dog timer according to the third embodiment of the invention.

The circuit diagram of FIG. 10 shows a configuration example with the active data fault detecting bit group 46 constructed as the most significant side four bits b7 to b4 in the watch dog timer according to the third embodiment of the invention.

In this case, the configuration is same as that shown in FIG. 7, except that the bits connected to the input to the OR gate 451 of the active data fault detecting circuit 45 make up the most significant side four bits b7 to b4 of the shift register 3.

The configuration example shown in FIG. 10 as described above is the one in which the normal reloadable period covers three clocks of the clock φ.

As a result, the configuration example shown in FIG. 10 is such that the number of bits up to the reload permit bit (b1) 40 when counted from the least significant bit b3 of the active data fault detecting bit group 46 is four. Thus, in the case where the active data of four more bits are written successively in the shift register 3, that is, in the case where four or more clocks are involved in spite of the fact that the normal reloadable period covers three clocks of the clock φ, or in the case where the active data are intermittently written in the shift register 3, then such faults can be detected.

Other operations are same as those for the configuration shown in FIG. 7.

As described above, in the watch dog timer according to the third embodiment of the invention, the upper limit of the reloadable period can be set by determining the ordinal number of bit of the least significant bit of the active data fault detecting bit group 46 when counted from the reload permit bit (b1) 40.

[Embodiment 4]

Figure 11:
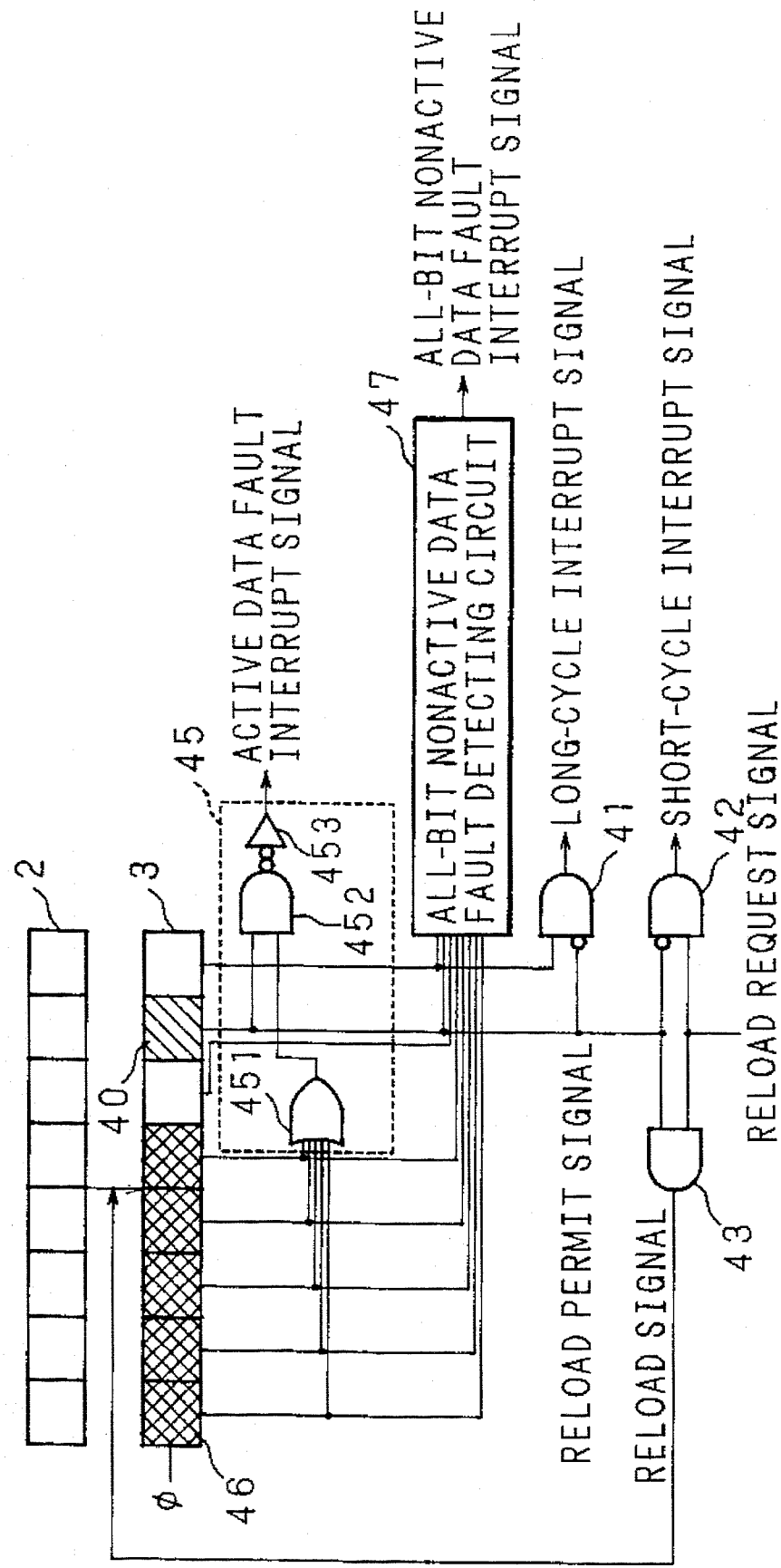
FIG. 11 is a circuit diagram showing a configuration example of the watch dog timer according to a fourth embodiment of the invention.

Next, a fourth embodiment of the watch dog timer according to the invention is described below with reference to the circuit diagram of FIG. 11 showing a configuration example thereof.

In the watch dog timer according to the fourth embodiment of the invention, the function for detecting the fault that an active data, i.e., data "1" is not reloaded at all in the shift register 3 from the reload register 2 is added to the third embodiment shown in FIG. 7 and FIG. 10 described above.

Specifically, the circuit shown in FIG. 11 has an all-bit nonactive data fault detecting circuit designated by reference numeral 47 added to the circuit shown in FIG. 7 (FIG. 10). This all-bit nonactive data fault detecting circuit 47 is connected with all of the bits b7 to b0 of the shift register 3, thus comprising an AND gate 470 with all the inputs thereto constituting a negative logic as shown in the circuit diagram of FIG. 12, as an example.

In the watch dog timer according to the fourth embodiment of the invention as shown in FIG. 11, in the case here "0" is reloaded in all of the bits b7 to b0 of the shift register 3 from the reload register 2, an H level signal (all-bit nonactive data fault interrupt signal) is outputted from the AND gate 470 of the all-bit nonactive data fault detecting circuit 47.

The other operations are similar to those of the third embodiment shown in FIG. 7 or FIG. 10.

As a result, in the case where an H level signal is outputted from the all-bit nonactive data fault detecting circuit 47, an appropriate processing such as writing data again in the reload register 2 is taken.

Figure 12:
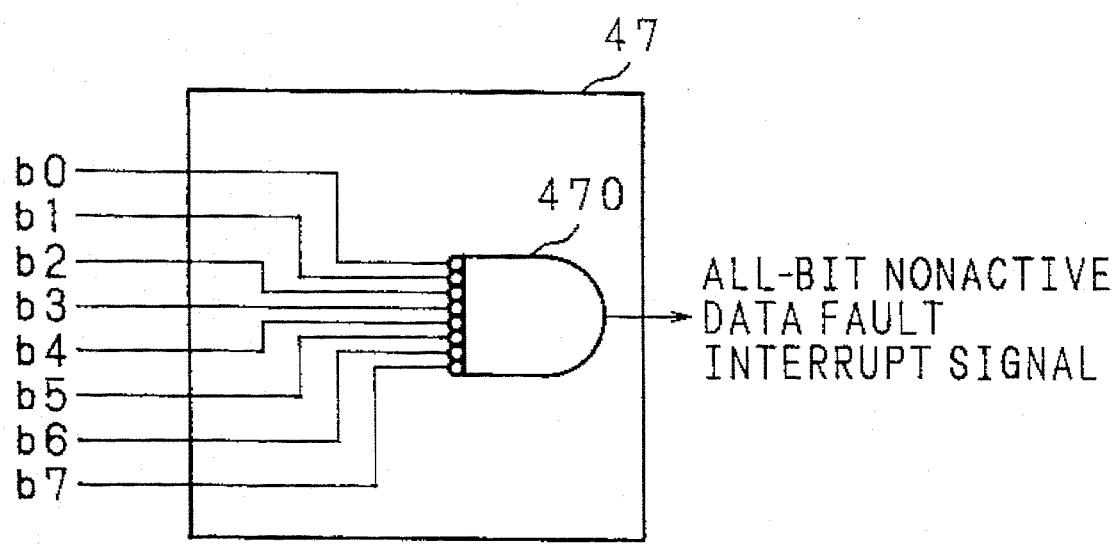
FIG. 12 is a circuit diagram showing a specific configuration example of a all-bit non-active data fault detecting circuit of the watch dog timer according to the fourth embodiment of the invention.
Figure 13:
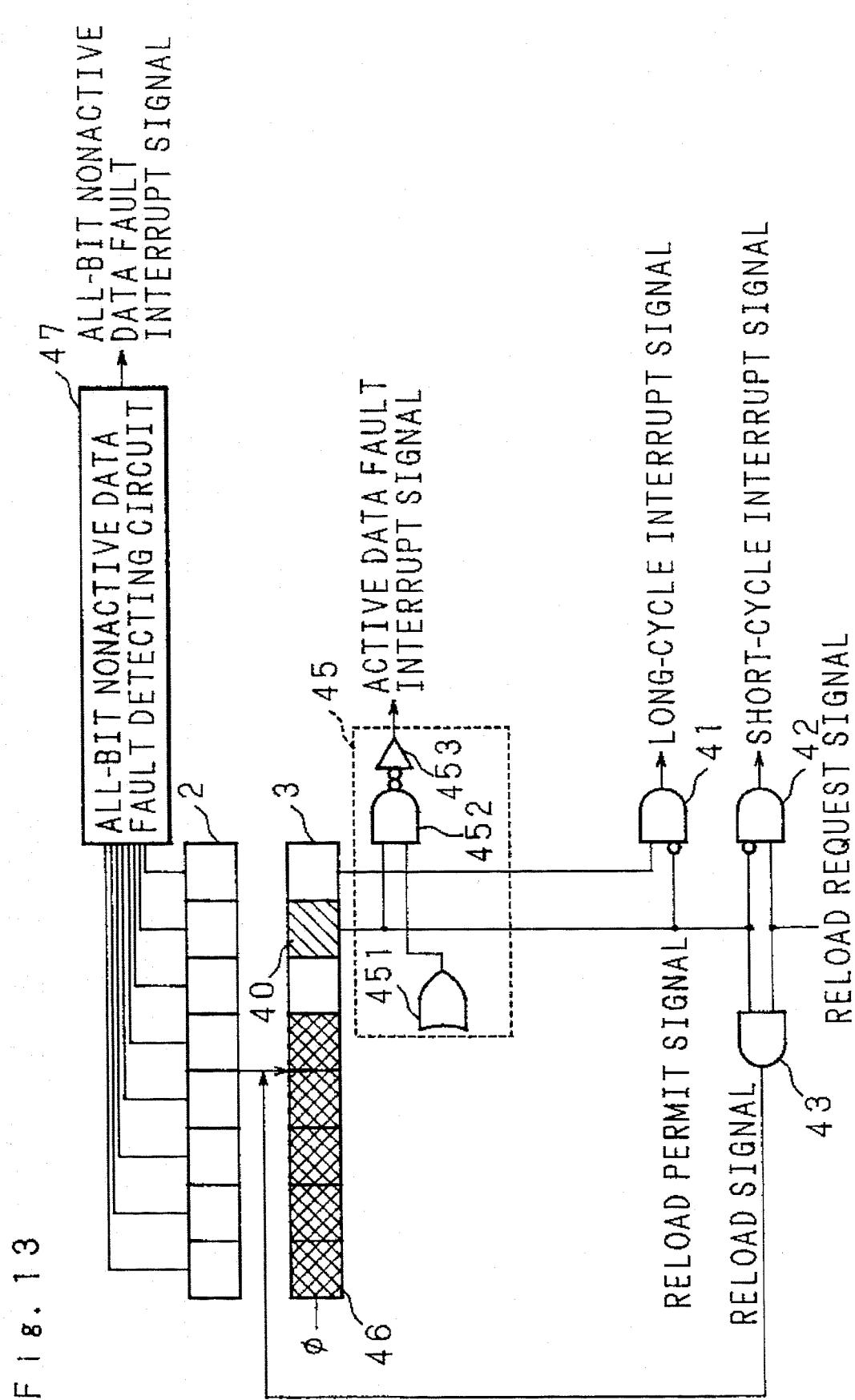
FIG. 13 is a circuit diagram showing another configuration example of the watch dog timer according to the fourth embodiment of the invention.

FIG. 13 is a circuit diagram showing still another configuration example according to the fourth embodiment. In this example, an all-bit nonactive data fault detecting circuit 47 constructed in a manner similar to FIG. 12 is connected with all of the bits b7 to b0 of the shift register 2.

In this configuration example of the watch dog timer according to the fourth embodiment of the invention shown in FIG. 13, in the case where "0" is written in all of the bits b7 to b0 of the reload register 2 as data to be reloaded in the shift register 3, a "1" level signal (all-bit nonactive data fault interrupt signal) is outputted from the AND gate 470 of the all-bit nonactive data fault detecting circuit 47.

As described above, with the watch dog timer according to the fourth embodiment of the invention, the configuration shown in FIG. 11 or FIG. 13 makes it possible to detect "0" state when "0" is written in all of the bits of the data reloaded in the shift register 3 from the reload register 2.

[Embodiment 5]

Figure 14:
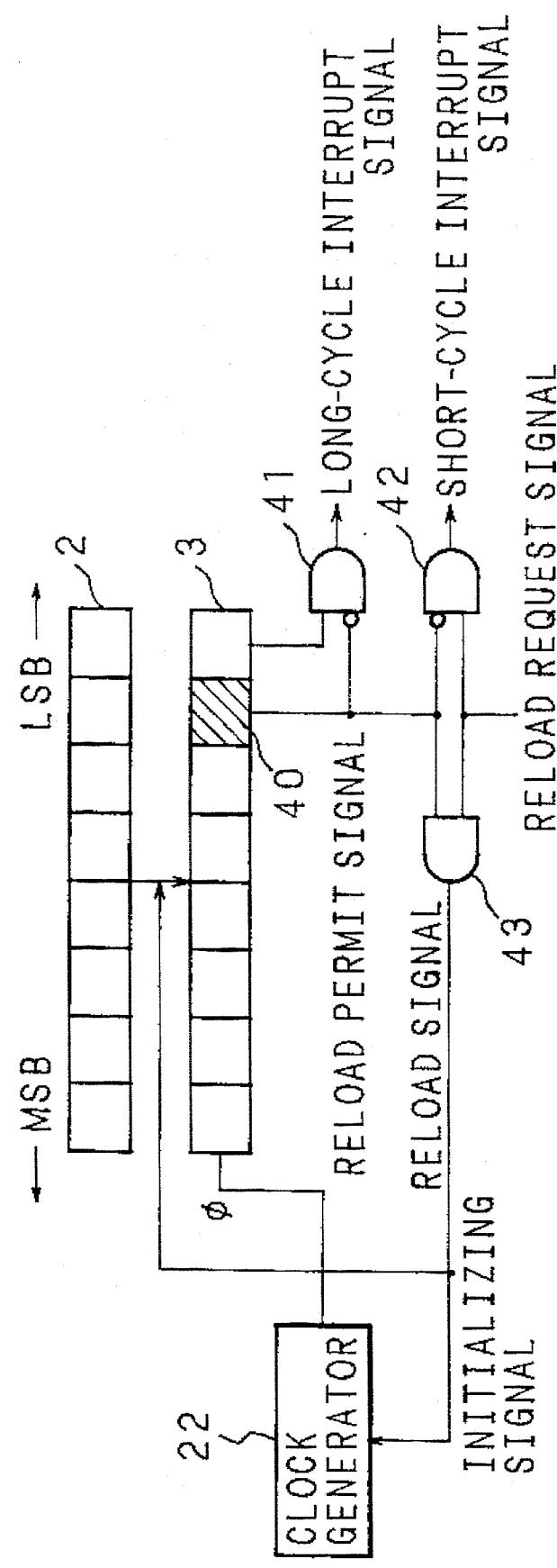
FIG. 14 is a circuit diagram showing a configuration example of the watch dog timer according to a fifth embodiment of the invention.

Next, the watch dog timer according to a fifth embodiment of the invention will be explained with reference to the circuit diagram of FIG. 14 showing a configuration example thereof.

In the watch dog timer according to the fifth embodiment of the invention, a reload signal is given as an initializing signal to a clock generator 22 constituting means for generating clock $\phi$, so that the clock generator 22 making up the clock $\phi$ generating means is initialized in synchronism with the rising from low level (hereinafter referred to as "L level") to H level of the reload signal.

The configuration of the remaining components is similar to that of the first embodiment shown in FIG. 2 and will not be described again.

In the watch dog timer according to the fifth embodiment of the invention such as shown in FIG. 14, transfer of the reload signal from L level to H level initializes the clock generator 22 and causes the clock $\phi$ to assume a rising edge at the particular time point. As a consequence, in the configuration according to the fifth embodiment shown in FIG. 14, the time length between the time point of reloading data on the shift register 3 from the reload register 2 and the next reloadable time is uniquely determined in accordance with the period of clock $\phi$.

[Embodiment 6]

Next, explanation will be made about a sixth embodiment of the invention which has been extended from the watch dog timer having the above-mentioned basic configuration as shown in FIG. 2.

Figure 15:
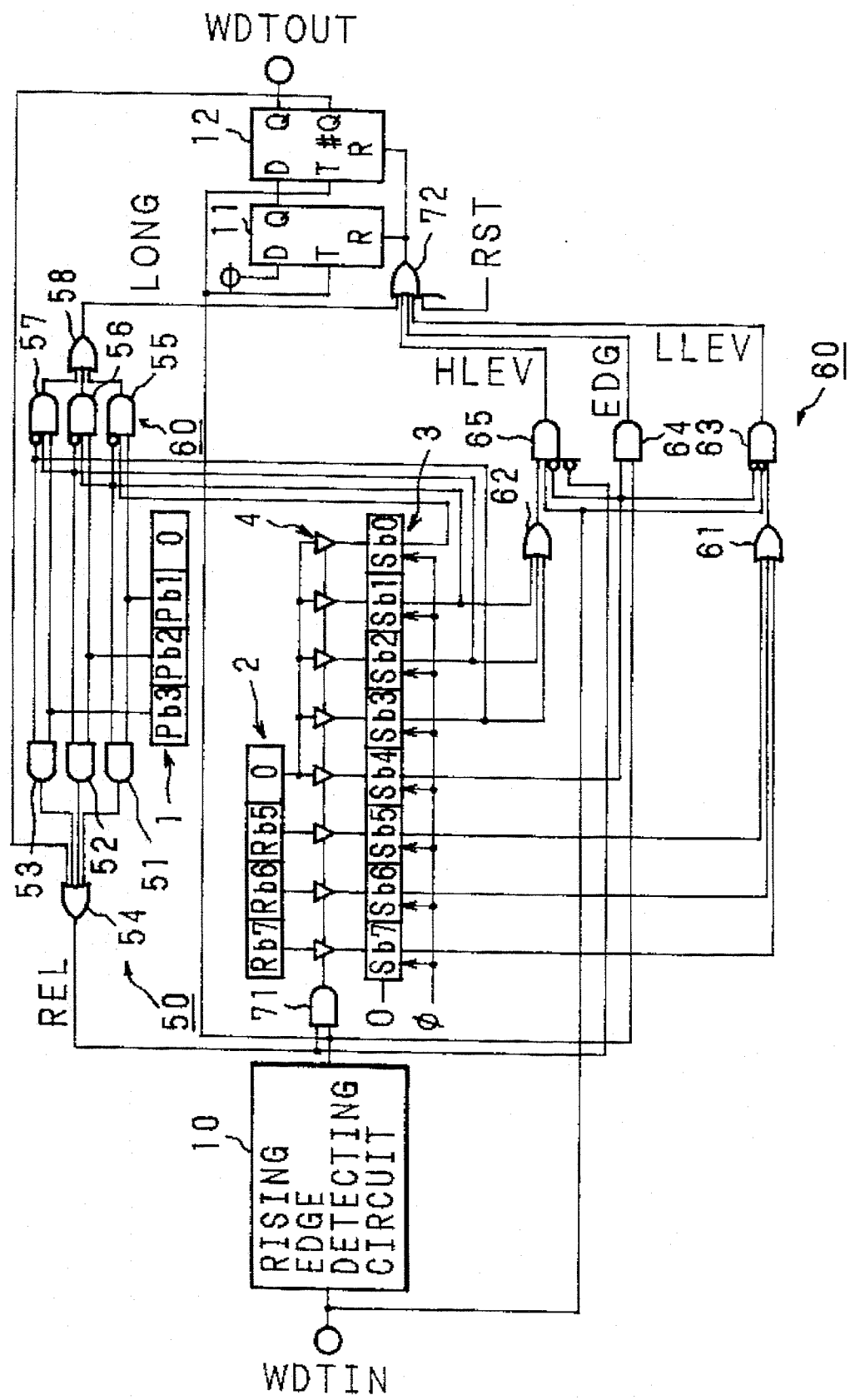
FIG. 15 is a circuit diagram showing a configuration example of the watch dog timer according to a sixth embodiment of the invention.

FIG. 15 is a circuit diagram showing a configuration example of the watch dog timer according to the sixth embodiment of the invention.

In FIG. 15, reference numeral 1 designates a pattern register making up monitoring pattern setting means composed of four bits of b3 to b0. By the way, the LSB b0 of the pattern register 1 is fixed to "0". In the description that follows, the bits b3 to b1 of the pattern register 1 are referred to as bits Pb3 to Pb1 respectively.

Reference numerals 51, 52, 53 designate two-input AND gates whose output signals are given to a four-input OR gate 54. By the way, the output signal of this OR gate 54 at H level makes up an active reload permit signal REL.

Also, reference numerals 56, 57 designate a three-input AND gate, one of the three inputs being in negative logic. These output signals are given to a three-input OR gate 58. In addition, the output signal of the OR gate 58 at H level constitutes an active long-cycle monitor signal LONG.

Reference numeral 2 designates a reload register composed of four bits b7 to b4. By the way, the LSB b4 of the reload register 2 is fixed to "0". The bits b7 to b5 of the reload register 2 are hereinafter referred to as Rb7 to Rb5 respectively.

Reference numeral 3 designates a shift register composed of eight bits b7 to b0. The bits b7 to b0 of the shift register 3 are hereinafter referred to as bits Sb7 to Sb0 respectively.

To the shift register 3, "0" is inputted from the MSB side thereof with shifting in synchronism with clock $\phi$.

Reference numeral 4 designates a reload circuit for reloading with the value held by the reload register 2 to the shift register 3. More specifically, each of the bits Rb7 to Rb5 of the reload register 2 is reloaded into the corresponding bits Sb7 to Sb5 of the shift register 3, and the value of the bit Rb4 of the reload register 2 fixed to "0", i.e., the value "0", is reloaded into the bits Sb4 to Sb0 of the shift register 3, respectively.

This reloading operation of each value from the reload register 2 into the shift register 3 by the reload circuit 4 is carried out at the time point when an H level pulse signal is outputted from the two-input AND gate 71 as reloading means.

By the way, one of the inputs of the AND gate 51 described above is supplied with the value of bit Pb1, and the other input with the value of bit Sb1. One input of the AND gate 52 is supplied with the value of bit Pb2, and the other input with the value of bit Sb2. One input of the AND gate 53 is supplied with the value of bit Pb3, and the other input with the value of bit Sb3.

Also, the negative logic input of the AND gate 55 is supplied with the value of bit Sb1, and the other two inputs with the values of bits Sb0 and Pb1, respectively. The negative logic input of the AND gate 56 is supplied with the value of bit Sb2, and the other two inputs with the values of bits Sb1 and Pb2 respectively. The negative logic input of the AND gate 57 is supplied with the value of bit Sb3, and the other two inputs with the values of bits Sb2 and Pb3 respectively.

Reference numeral 10 designates a rising edge detecting circuit supplied with a signal to be monitored, i.e., a monitor input signal WDTIN. The rising edge from L to H level of this signal is detected. The rising edge detecting circuit 10, upon detection of the rising of the monitor input signal WDTIN, gives an H level pulse signal to the AND gate 71, the T-input terminal of D flip-flops 11, 12 described later and an AND gate 64. By the way, the monitor input signal WDTIN is supplied from a system to be monitored by the circuit shown in FIG. 15, so that as long as the particular system is in normal operation, the pulse signal rises to H level from L level cyclically and falls from H level to L level cyclically.

As explained above, the reload circuit 4 operates in such a manner that the value held in each of the bits Rb7 to Rb5 of the reload register 2 is reloaded into each bit of Sb7 to Sb0 of the shift register 3 in synchronism with the pulse signal outputted from the rising edge detecting circuit 10.

One input of the AND gate 71 is supplied with the output of the rising edge detecting circuit 10 and the other input with the reload permit signal REL, i.e., the output signal of the OR gate 54, as described above.

As a result, in the case where a pulse signal is outputted from the rising edge detecting circuit 10 during the period when the reload permit signal REL is at H level (rising permit period), i.e., in the case where the monitor input signal WDTIN rises from L level to H level, the AND gate 71 outputted an H level signal to trigger the reload operation of the reload circuit 4.

Reference numerals 61, 62 designate three-input OR gates. The three inputs of the OR gate 61 are supplied with the values of bits Sb7, Sb6 and Sb5 of the shift register 3 respectively. Also, the three inputs of the OR gate 62 are inputted with the values of bits Sb3, Sb2 and Sb1 of the shift register 3 respectively.

Reference numeral 63 designates a three-input AND gate, two inputs of the three inputs being in negative logic. The two negative logic inputs are supplied with the value of bit Sb4 of the shift register 3 and the monitor input signal WDTIN, and the other input with the output signal of the OR gate 61. In addition, the output signal of the AND gate 63 at H level is given to the OR gate 72 as an active L level monitor signal LLEV as described later.

Reference numeral 64 designates a two-input AND gate, whose one input terminal is inputted with the value of the bit Sb4 of the shift register 3, and the other input thereof with the output signal of the rising edge detecting circuit 10. In addition, the output signal of the AND gate 64 at H level is given to the OR gate 72 as an active rising edge monitor signal EDG as described later.

Reference numeral 65 designates a four-input AND gate, two inputs of the four inputs being in negative logic. The positive logic first input and the positive logic second input are supplied with the output signal of the OR gate 62 and the monitor input signal WDTIN respectively, and the negative logic third input and the negative logic fourth input with the value of bit Sb4 of the shift register 3 and the reload permit signal REL making up the output signal of the OR gate 54 respectively. In addition, the output signal of the AND gate 65 is given at H level to an OR gate 72 as an active H level monitor signal HLEV to be described later.

The output signals of these AND gates 63, 64, 65 are given to a five-input OR gate 72 as described above. The other two input terminals of the OR gate 72 are supplied with a long-cycle monitor signal LONG being the output signal of the above-mentioned OR gate 58 and a reset signal RST from an external source, respectively. In addition, the output signal of the OR gate 72 is given to the reset terminal R of the D flip-flops 11, 12 as signal outputting means.

The trigger terminal T of the flip-flops 11, 12 making up signal outputting means is supplied with the output signal of the rising edge detecting circuit 10 as described above. Also, the data terminal D of the first flip-flop 11 is inputted with the power potential ("1"), and the data terminal D of the second flip-flop 12 with the output signal from the output terminal Q of the first flip-flop 11. The output signal from the output terminal Q of the second flip-flop 12 is a monitor output signal WDTOUT of the watch dog timer according to the sixth embodiment of the invention. The output signal from the output terminal #Q (# indicates an inverted signal, which is referred to as the "inverted output terminal #Q" in the description that follows), is given to the OR gate 54.

Now, explanation will be made about the reason why the embodiment includes two flip-flops, the first flip-flop 11 and the second flip-flop 12.

As described later, under the condition where the system to be monitored by the circuit shown in FIG. 15 is in normal operation, i.e., where the monitor input signal WDTIN rises from L level to H level in a predetermined period and falls from H level to L level cyclically, the two flip-flops 11, 12 output an H level signal from the output terminals Q thereof respectively. As a consequence, the monitor output signal WDTOUT being an output signal from the output terminal Q of the second flip-flop 12 keeps H level. Under the condition where something abnormal is caused in the system to be monitored, however, an H level signal is outputted from the OR gate 72 and the two flip-flops 11, 12 are both reset, so that the monitor output signal WDTOUT outputted from the output terminal Q of the second flip-flop 12 is turned to L level.

Under such abnormal conditions, an H level signal is outputted from the inverted output terminal #Q of the second flip-flop 12. This H level signal is given to the OR gate 54, so that the reload permit signal REL making up an output signal of the OR gate 54 turns to H level (active). After that, when the monitor input signal WDTIN turns to H level with the flip-flops 11, 12 failing to be reset again, then an H level pulse signal is outputted from the rising edge detecting circuit 10 in synchronism with the rising edge of the monitor input signal WDTIN, thus effecting the reloading from the reload register 2 to the shift register 3.

In the process, the pulse signal outputted from the rising edge detecting circuit 10 is given also to the T input terminals of the flip-flops 11, 12. Therefore, the first, flip-flop 11 is triggered in the first place and a signal "1" is fetched from the D input terminal, and the output signal from the output terminal Q thereof turns to H level. Since the input signal to the D input terminal of the second flip-flop 12 is still "0" at the time point when a pulse signal is outputted from the rising edge detecting circuit 10, however, the second flip-flop 12 is not triggered nor an H level signal is outputted from the output terminal Q thereof.

Consequently, under this condition, the reload permit signal REL is kept at H level. And, when the monitor input signal WDTIN rises to H level again with the two flip-flops 11, 12 failing to be reset, the second flip-flop 12 is triggered at the time point when the pulse signal outputted from the rising edge detecting circuit 10 is given to the T input terminal of the second flip-flop 12. As a result, the H level signal given from the output terminal Q of the first flip-flop 11 to the D input terminal of the second flip-flop 12 is fetched into the second flip-flop 12, arid therefore, the monitor output signal WDTOUT being the output signal from the output terminal Q of the second flip-flop 12 turns to H level.

At the same time, the output signal from the inverted output terminal #Q of the second flip-flop 12 turns to L level, so that the reload permit signal REL being an output signal from the OR gate 54 turns to L (nonactive) level. As a result, in the watch dog timer according to the sixth embodiment shown in FIG. 15, after the monitor output signal WDTOUT has turned to L level upon detection of something abnormal, the monitor output signal WDTOUT is returned to H level, i.e., a normal state, only when the monitor input signal WDTIN rises to H level twice under normal conditions.

FIG. 16 is a schematic diagram showing the monitoring condition to be held, i.e., the monitoring period involved when the bits Sb7 to Sb0 of the shift register 3 are held at "1". FIG. 16 also shows the corresponding bits of the pattern register 1 and the reload register 2. In the embodiment described bellow, a normal case is assumed to be such that the period of the monitor input signal WDTIN covers eight, clocks of the clock φ, the H level width of the monitor input signal WDTIN one clock or more but not more than three clocks, and the L level width thereof two clocks or more but not more than three clocks.

In the case where "1" is held in any of the bits Sb7 to Sb5 of the shift register 3, an L level monitoring condition is selected. During this L level monitoring period, the contents of monitoring are such that the monitor input signal WDTIN lacks L level. Specifically, an abnormal state is assumed when L level is detected under the conditions where no L level section must be included in the monitor input signal WDTIN. In such a case, the AND gate 63 outputs the L level monitor signal LLEV which is active at H level.

In the case where "1" is held in the bit Sb4 of the shift register 3, the monitoring of the rising edge is selected. During this rising edge monitoring period, the lack of a rising edge of the monitor input signal WDTIN is monitored.

In other words, an abnormal condition is assumed when a rising edge is detected under the condition where the monitor input signal WDTIN is prohibited from rising to H level from L level, and in that case the AND gate 64 outputs the rising edge monitor signal EDG which is active at level.

In the case where "1" is held in any of the bits Sb3 to Sb1 of the shift register 3, the initialization (reloading) of the shift register 3 is permitted as a reloadable period when it is assumed as far as the period of the monitor input signal WDTIN is normal (covering eight clocks of th clock φ according to the sixth embodiment under consideration). More specifically, in the case where the bit "1" set in the pattern register 1 coincides with the bit, "1" in the shift register 3, the OR gate 54 outputs the reload permit signal REL which is active at H level.

During other than the reloadable period described above, the H level monitoring is selected. During this H level monitoring period, the absence of the H level period in the monitor input signal WDTIN is monitored. More specifically, an abnormal condition is assumed when H level is detected under the condition where the monitor input signal WDTIN is prohibited from having an H level section, and in that case the AND gate 65 outputs the H level monitor signal HLEV which is active at H level.

In the case where "1" is held in any of the bits Sb2 to Sb0 of the shift register 3, a long-cycle monitoring condition is selected. More specifically, in the case where all of the bits positions of "1" set in the shift register 3 are on LSB side as from the bit positions of "1" set in the pattern register 1, the detection is a long-cycle abnormality, i.e., that one period of the monitor input signal WDTIN is more than a predetermined clock equivalence. In addition, in the case where something abnormal is detected during this long-cycle monitoring period, the OR gate 58 outputs the long-cycle monitor signal LONG which is active at H level.

By the way, as shown in FIG. 15, according to the sixth embodiment, AND gates 51, 52, 53 and the OR gate 54 make up reload permitting means 50. AND gates 55, 56, 57, OR gates 58, 61, 62 and AND gates 63, 64, 65 make up monitoring pattern changing means 60.

Next, explanation will be made on the operation of the watch dog timer according to the sixth embodiment of the invention shown in FIG. 15.

FIG. 18 to FIG. 23 are timing charts representing the normal and abnormal operating conditions in which, as shown in FIG. 17, "0010" (2H) is set in the bits Pb3, Pb2, Pb1, Pb0, of the pattern register 1 and "0100" (4H) in the bits Rb7, Rb6, Rb5, Rb4 of the reload register 2. A fixed value "0" is set in the bit Pb0 of the pattern register 1 and the bit Rb4 of the reload register 2.

By the way, in FIG. 18 to FIG. 23, the shift clock φ inputted to the shift register 3, the values of the bits Sb7 to Sb0 of the shift register 3, the conditions of the monitor input signal WDTIN to be monitored, the monitoring condition selected, and the condition of the monitor output signal WDTOUT are shown in that order downward.

FIG. 18 is a timing chart showing the operating conditions of a normal monitor input signal WDTIN being a signal to be monitored.

At the rising point of the monitor input signal WDTIN, the rising edge detecting circuit 10 detects the rising and outputs an H level pulse signal to an AND gate 71, flip-flops 11, 12 and an AND gate 64. As a result, the values held in the bits Rb7 to Rb5 of the reload register 2 are reloaded into the shift register 3 by a reload circuit 4, so that "1" is held only in the bit Sb6 of the shift register 3. By the way, in FIG. 18 and FIG. 19 to FIG. 23, "0" held in the shift register 3 is depicted in blank. Also, the output signals from the output terminal Q of the flip-flops 11, 12 are assumed to be at H level. As a consequence, the monitor output signal WDTOUT making up an output signal from the output terminal Q of the second flip-flop 12 assumes H level from the start.

Since "1" is held only in the bit Sb6 of the shift register 3, an L level monitoring mode is effective. During this L level monitoring period, the contents held in the bits of the shift register 3 continue to be shifted by the shift clock φ, until "1" is completely shifted to the bit Sb4. During this L level monitoring period, "1" is inputted to one of the three inputs of the OR gate 61, and therefore the output thereof assumes "1" which is inputted to the AND gate 63. The other two inputs to the AND gate 63 are the values of the monitored input signal WDTIN and the bit Sb4 of the shift register 3. During the period before the bit Sb4 becomes "1", therefore, the L level monitor signal LLEV keeps L level as far as the monitor input signal WDTIN is under normal H level condition.

By the way, although the output of the AND gate 63 is inputted to the OR gate 72 of five inputs, the other four inputs thereto include the long-cycle monitor signal LONG being the output of the OR gate 58, the monitor output signal WDTOUT being the output of the AND gate 65, the rising edge monitor signal EDG being the output of the AND gate 64 and the reset signal RST.

These signals other than the reset signal RST assume the following conditions during the period before the bit Sb4 of the shift register 3 becomes "1".

The rising edge monitor signal EDG being the output of the AND gate 64, regardless of the output signal of the rising edge detecting circuit 10 being one of the inputs to the AND gate 64, keeps L level until the "0" state of the shift register 3 being the other input turns to "1".

The L level monitor signal LLEV being the output of the AND gate 65 keeps L level regardless of the other inputs, since the bits Sb3 to Sb1 of the shift register 3 are "0" and the output of the OR gate 62 keeps L level.

The long-cycle monitor signal LONG making up the output of the OR gate 58 keeps L level, since the values of the bits Pb3 and Pb2 of the pattern register i inputted to the AND gates 56, 57 respectively are "0" and the bit Sb0 of the shift register 3 inputted to the AND gate 55 is also "0".

As a result, the output of the OR gate 72 keeps L level during the period before the bit Sb4 of the shift register 3 becomes "1", so that the flip-flops 11, 12 are not reset and the monitor output signal WDTOUT keeps H level.

By the way, the abnormal condition during the L level period is defined by the fact that the monitor input signal WDTIN becomes L level. In such a case, one of the negative logic inputs to the AND gate 63 becomes L level (the other input is at L level since the bit Sb4 is in "0" state), and the L level monitor signal LLEV being the output becomes H level. As a result, an H level signal is outputted from the OR gate 72 thereby to reset the flip-flops 11, 12.

Next, the rising edge monitoring condition will be explained.

When the values of the bits Sb7 to Sb0 of the shift register 3 are shifted by the shift clock φ until the bit Sb4 soon becomes "1", the rising edge monitoring condition is achieved. This rising edge monitoring period continues only while the bit Sb4 remains in "1" state. During this rising edge monitoring period, one of the inputs to the AND gate 64 is supplied with "1" held in the bit Sb4 of the shift register 3, while under the normal condition lacking the rising edge in the monitor input signal WDTIN, the output signal of the rising edge detecting circuit 10 being the other input keeps 1 level, and the rising edge monitor signal EDG being the output of the AND gate 64 keeps L level as a result.

This is also the case with other signals, the H level monitor signal HLEV and the long-cycle monitor signal LONG are as same as the L level monitoring period described above. Also, since the values of the bits Sb7, Sb6 and Sb5 of the shift register 3 making up the three inputs to the OR gate 61 assume "0" and therefore the output of the OR gate 61 is at L level, the L level monitor signal LLEV being the output signal of the AND gate 63 keeps the L level. In the case where something abnormal occurs during the rising edge monitoring period, i.e., in the case where a rising edge occurs in the monitor input signal WDTIN, an H level signal is given from the rising edge detecting circuit 10 to the AND gate 64. As a result, the rising edge monitor signal EDG being the output signal of the AND gate 64 becomes H level, which resets the flip-flops 11, 12 through the OR gate 72. The monitor output signal WDTOUT being the output signal from the output terminal Q of the second flip-flop 12 thus turns to L level thereby giving a warning on an occurrence of abnormality.

Next, when the values of the bits Sb7 to Sb0 of the shift register 3 are shifted by the shift clock φ and the bit Sb3 or Sb2 turns to "1", an H level monitoring condition is effected. The rising of H level monitoring period continues until the bit S11 becomes "1". During this H level monitoring period, the output of the OR gate 62 is inputted to the first input of the AND gate 65. Since one of the bits Sb3, Sb2, Sb1 of the shift register 3 being the input to the OR gate 62 is "1", however, the output of the OR gate 62 keeps H level. And, the second input to the AND gate 65, which is the monitor input signal WDTIN, turns to L level under normal conditions. The bit Sb4 of the shift register 3 being the third input to the AND gate 65 is "0". Further, in view of the fact that one of the bits Pb3, Pb2 of the pattern register 1 being one input to the AND gates 52, 53 is "0" and keeps L level, the reload permit signal REL outputted from the OR gate 54 as the fourth input to the AND gate 65 keeps L level.

As a consequence, the H level monitor signal HLEV being the output of the AND gate 65 keeps L level. This is also the case with the other signals including the L level monitor signal LLEV and the long-cycle monitor signal LONG regarding the rising edge monitoring period. The rising edge monitor signal EDG keeps L level since the bits Sb4 of the shift register 3 being the input to the AND gate 64 is "0".

In the case where something abnormal occurs during this H level monitoring period, i.e., in the case where the monitor input signal WDTIN has become H level earlier than the normal period, however, the second input to the AND gate 65 becomes H level. As a result, the H level monitor signal HLEV being the output of the AND gate 65 becomes H level, which resets the flip-flops 11, 12 through the OR gate 72. Thus, the monitor output signal WDTOUT being the output signal from the output terminal Q of the second flip-flop 12 turns to L level, thereby giving a warning on possible occurrence of an abnormality.

When the bit Sb1 of the shift register 3 becomes "1", the reload permit signal REL is generated to enter a reloadable period. This reloadable period continues only during the time when the bit Sb1 remains "1".

Specifically, when the bit Sb1 of the shift register 3 becomes "1", the reload permit signal REL being the output of the OR gate 54 becomes H level since the other input to the AND gate 51 to which the bit Sb1 is given is supplied with the value "1" of the bit Pb1 of the pattern register 1. This reload permit signal REL is given to the fourth input to the AND gate 65, and therefore the H level monitor signal HLEV being the output of the AND gate 65 becomes L level regardless of the other inputs. Also, in this case, a reloadable period is involved, since the L level monitor signal LLEV, the rising edge monitor signal EDG and the long-cycle monitor signal LONG also keep L level.

By the way, by the rising to H level of the monitor input signal WDTIN during the above-mentioned reloadable period, reloading is effected from the reload register 2 into the shift register 3. In the event of an abnormality in which the monitor input signal WDTIN fails to rise to H level during the reloadable period, however, the shift register 3 is further shifted and the bit Sb0 thereof becomes "1". As a result, the output of the AND gate 55 becomes H level and is given to the OR gate 58. Therefore, the long-cycle monitor signal LONG being the output signal thereof also becomes H level, which works to reset the flip-flops 11, 12 through the OR gate 72. As a consequence, the monitor output, signal WDTOUT being the output signal from the output terminal Q of the second flip-flop 12 turns to L level, thereby giving a warning on possible occurrence of an abnormality.

In addition, as described later, in the case where the monitor output, signal WDTOUT outputted from the output terminal Q of the second flip-flop 12 turns to L level due to the detection of an abnormality, the H level signal outputted from the inverted output terminal #Q of the second flip-flop 12 is given to the OR Rate 84, so that the reload permit signal REL being the output signal thereof is forcibly made H level. In this case, when the monitor input signal WDTIN rises to H level, the reloading operation is immediately executed from the reload register 2 into the shift register 3.

Next, the operation upon detection of a fault or an abnormality will be explained specifically with reference to a timing chart depicted on each particular occasion. In the description that follows, a normal condition is assumed when the H level width of the monitor input signal WDTIN is from one to three clocks inclusive and the L level width thereof from two to three clocks inclusive.

As made apparent already, the fault conditions to be detected are of the following four types:
(1) The H level pulse width is shorter than a predetermined length (See FIG. 19).
   Detection occurs during the L level monitoring period, and the L level monitor signal LLEV becomes H level.
(2) The H level pulse width is longer than a predetermined length (See FIG. 20).
   Detection occurs during the H level monitoring period, and the H level monitor signal HLEV becomes H level.
(3) The L level pulse width is shorter than a predetermined length ( See FIG. 21 and FIG. 22).
   Detection occurs during the rising edge detecting period so that the rising edge monitor signal becomes H level, or detection occurs during the H level monitoring period so that the H level monitor signal HLEV becomes H level.
(4) The L level pulse width is longer than a predetermined length (See FIG. 23).
   Detection occurs during the long-cycle monitoring period so that the long-cycle monitor signal LONG becomes H level.

FIG. 19 is a timing chart for explaining the operation by which a fault condition is detected during the L level monitoring period when the H level pulse width is shorter than a predetermined length as designated in the above case (1). In this case, a fault condition is detected in which the monitor input signal WDTIN becomes L level while the bit Sb5 of the shift register 3 remains "1", i.e., in which the H level width of the monitor input signal WDTIN is shorter than a predetermined length.

Upon detection by the rising edge detecting circuit 10 of the rising point of the monitor input signal WDTIN, as described above, the values held in the bits Rb7 to Rb5 of the reload register 2 are reloaded into the shift register 3 by the reload circuit 4, so that "1" is held only in the bit Sb6 of the shift register 3. Also, the output signals of the AND gates 63, 64, 65 and the OR gates 54, 58 are all at L level as described above. Also, it is assumed that the monitor output signal WDTOUT being the output signal from the output terminal Q of the second flip-flop 12 is at H level from the very beginning.

Under this condition, when the monitor input signal WDTIN becomes L level earlier than the normal period, one of the negative logic inputs to the AND gate 63 becomes L level. As a result, the L level monitor signal LLEV being the output of the AND gate 63 turns to It level, which resets the flip-flops 11, 12 through the OR gate 72, and the monitor output signal WDTOUT turns to L level as a result, indicating the occurrence of a fault.

FIG. 20 is a timing chart for explaining the operation by which a fault condition with the H level pulse width longer than a predetermined length is detected during the H level monitoring period in the above case (2). In this case, a fault condition is detected in which the monitor input signal WDTIN fails to become L level even when the bit Sb3 of the shift register 3 becomes "1", i.e., in which the H level width of the monitor input signal WDTIN is longer than a predetermined length.

Assume that the condition was normal before the bit Sb3 of the shift register 3 became "1". In the case where the bit Sb3 of the shift register 3 becomes "1" and the monitor input signal WDTIN given to the second input of the AND gate 65 still remains at H level, the H level monitor signal HLEV being the output signal of the AND gate 65 turns to H level. The resulting signal resets the flip-flops 11, 12 through the OR gate 72, and therefore the monitor output signal WDTOUT turns to L level, notifying the occurrence of a fault.

FIG. 21 is a timing chart for explaining the operation by which the fault condition associated with the L level pulse width shorter than a predetermined length is detected during the rising edge monitoring period in the above case (3). In this case, the fault condition detected is that the monitor input signal WDTIN has risen again immediately after falling with the bit Sb4 of the shift register 3 in "1" state, i.e., that the L level width of the monitor input signal WDTIN is shorter than a predetermined length.

In the case where the monitor input signal WDTIN rises again immediately after a temporary fall during the period in which the bit Sb4 of the shift register 3 is "1", an H level pulse signal is output ted from the rising edge detecting circuit 10 and is given to the AND gate 64. As a result, the edge monitor signal EDG being the output signal of the AND gate 64 becomes H level, though instantaneously. This signal resets the flip-flops 11, 12 through the OR gate 72, so that the monitor output signal WDTOUT turns to L level and notifies that a fault has occurred.

FIG. 22 is a timing chart for explaining the operation by which a fault condition with the L level pulse width shorter than a predetermined length in the above case (4) is detected during the H level monitoring period. In the case involved, a fault is detected in which the monitor input signal WDTIN has risen to H level during the period when the bit Sb3 of the shift register 3 remains "1", i.e., in which the level width of the monitor input signal WDTIN is shorter than a predetermined length.

Assume that the condition was normal before the bit Sb3 of the shift register 3 became "1". During the period when the bit Sb3 of the shift register 3 is "1", the monitor input signal WDTIN inputted to the second input of the AND gate 65 is normally at L level, while when this signal rises abnormally to H level, the H level monitor signal HLEV being the output signal of the AND gate 65 turns to H level. This signal resets the flip-flops 11, 12 through the OR gate 72, so that the monitor output signal WDTOUT turns to L level, thereby warning on a fault.

FIG. 23 shows a timing chart for explaining the operation by which a fault condition associated with the L level pulse width shorter than a predetermined length in the above case (4) is detected during the long-cycle monitoring period. In this case, a fault condition is detected in which the shift register 3 fails to be reloaded while the monitor input signal WDTIN also fails to rise to H level during the period when the bit Sb1 of the shift register 3 is "1".

A normal condition is assumed before the bit Sb1 of the shift register 3 becomes "1". In the case where the monitor input signal WDTIN fails to rise during the period when the bit Sb1 of the shift register 3 is "1", the reload permit signal REL being the output signal of the OR gate 54 is not outputted. Therefore, the bits of the shift register 3 are further shifted to the extent that the bit Sb0 becomes "1". The "1" held in the bit Sb0 of the shift register 3 is given to the AND gate 55, and therefore the long-cycle monitor signal LONG being the output thereof turns to H level. This signal resets the flip-flops 11, 12 through the OR gate 72, with the result that the monitor output signal WDTOUT turns to L level thereby to give a warning on an abnormal condition.

According to the sixth embodiment described above, a normal condition is assumed when the H level width of the monitor input signal WDTIN is between one clock and three clocks inclusive and the L level width is between two clocks and three clocks inclusive. In the watch dog timer according to the sixth embodiment, the H level and L level widths of the monitor input signal WDTIN can be changed under normal conditions.

Explanation will be made specifically below with reference to the drawings.

Figure 25:
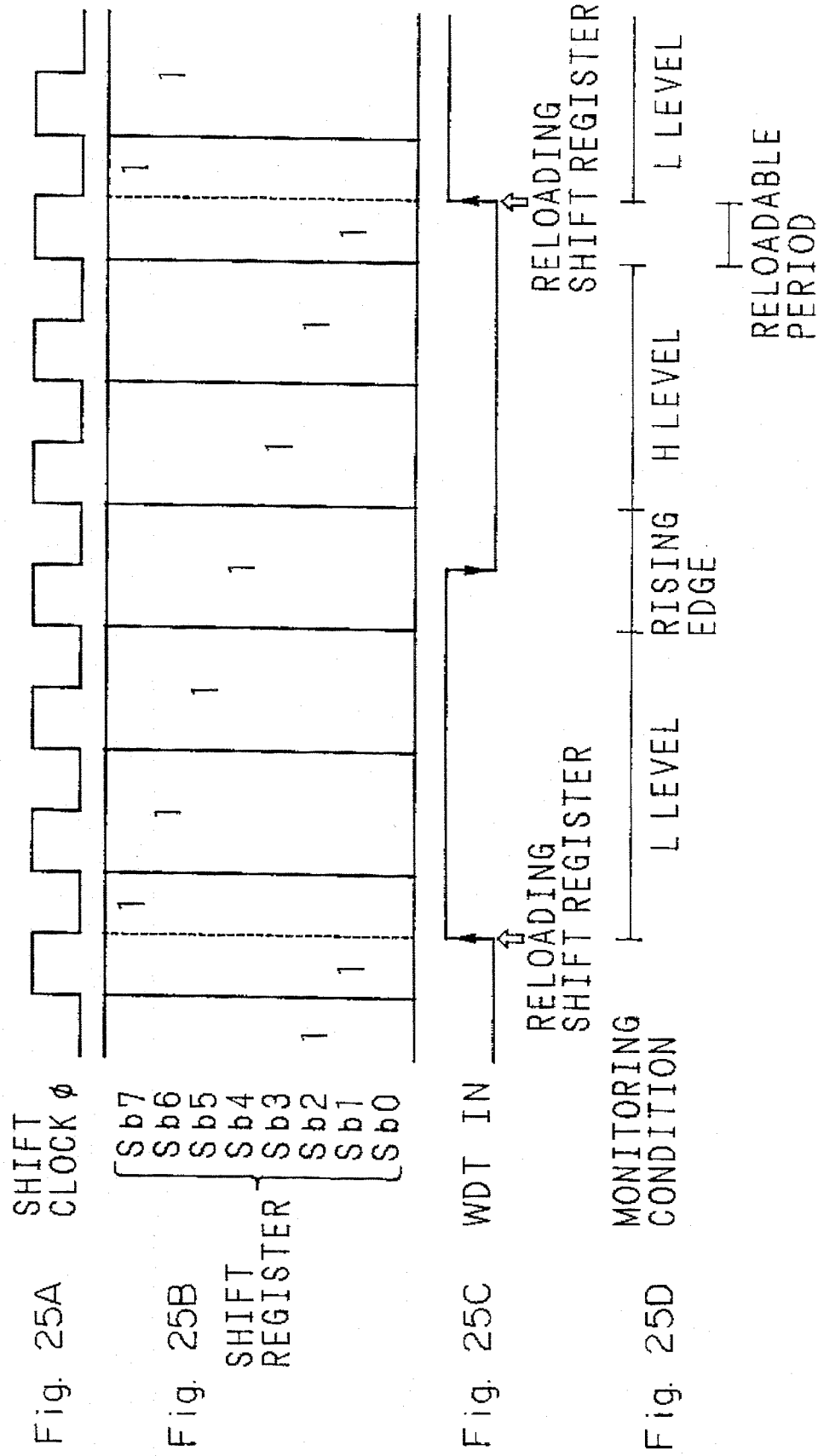
FIGS. 25(a)–25(d) are a timing chart showing the operating conditions of the watch dog timer for a setting example of each bit of the reload register and each bit of the pattern register shown in FIG. 24 according to the sixth embodiment of the invention.

As already obvious from the foregoing description, by changing the set value of each bit of the reload register 2, the length of the period of monitoring the H level pulse width of the monitor input signal WDTIN, or more specifically, the number of corresponding clocks of the shift clock $\phi$ can be changed. As shown in the schematic diagram of FIG. 24, for example, in the case where the bits Rb7 to Rb4 of the reload register 2 are set to "1000" ("8H" in hexadecimal notation) and the bits Pb3 to Pb0 of the pattern register 1 to "0010" (2H) in the same way as in the above-mentioned case, it is seen from the timing chart of FIG. 25 that the L level monitoring period is extended to the four clocks covering the bits Sb7 to Sb4 of the shift register 3.

In other words, as shown in FIG. 24, assume that "1" is set in the bit Rb7 of the reload register 2. At the time point when this state is reloaded into the shift register 3, "1" is held in the bit Sb7 of the shift register 3. Therefore, the period covering four clocks of the shift clock $\phi$ with "1" held by the bits Sb7 to Sb4 of the shift register 3 covers an L level monitoring period. Conversely, when the set value of the reload register 2 is "0010" (2H), the period covering two clocks of the clock φ with "1" held by the bits Sb5 to Sb4 of the shift register 3 makes up an L level monitoring period.

Also, it is possible to change the H level monitoring period of the monitor input signal WDTIN by changing the set values of the bits Pb3 to Pb0 of the pattern register 1. As shown by the schematic diagram of FIG. 26 described above, for example, assume that the set values of the bits Pb3 to Pb0 of the pattern register 1 are "0100" (4H) and the set values of the bits Rb7 to Rb4 of the reload register 2 "0100" (4H) as in the case shown in FIG. 17. It is seen from the timing chart of FIG. 27 that the H level monitoring period is compressed to the length covering two clocks of the bits Sb3 and Sb2 of the shift register 3.

Figure 26:
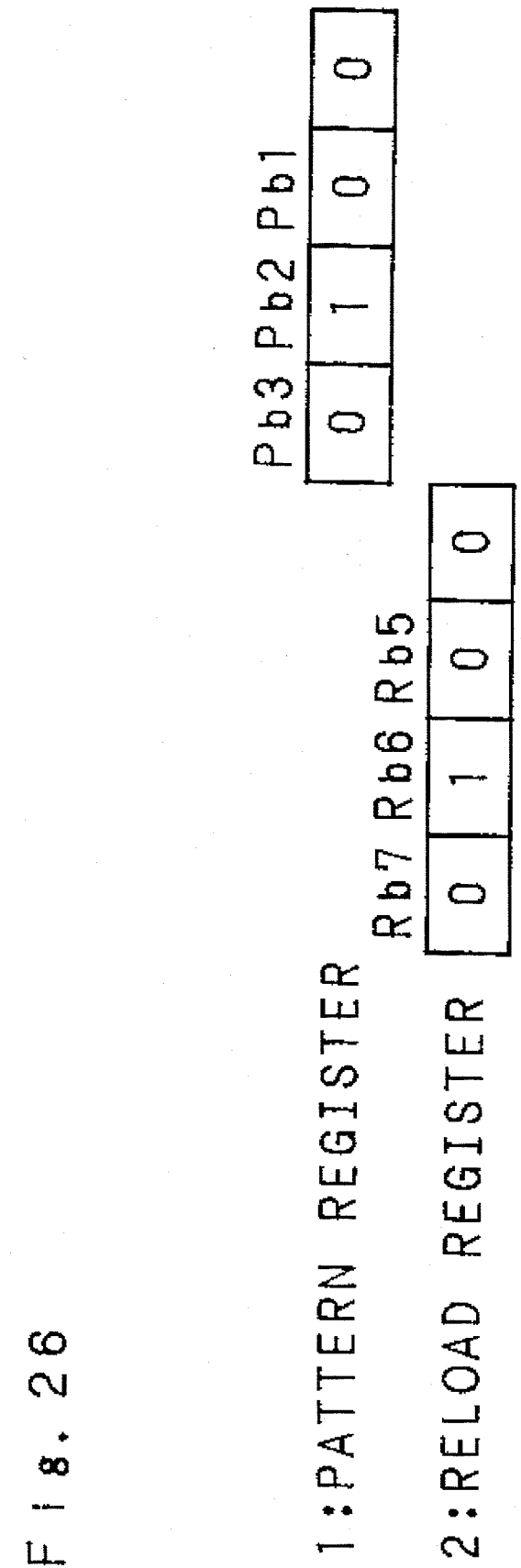
FIG. 26 is a schematic diagram showing another setting example of each bit of the reload register and each bit of the pattern register of the watch dog timer according to the sixth embodiment of the invention.

Specifically, as shown in FIG. 26, as far as "1" is set at the bit Pb2 of the pattern register 1, the two inputs to the AND gate 52 become "1" when "1" is shifted to the bit Sb2 of the shift register 3, so that an H level reload permit signal REL is outputted to enter a reloadable period. As a result, the It level monitoring period is terminated at that time point, and only the period covering one shift clock φ makes up an H level monitoring period.

As described above, in the watch dog timer according to the invention, the H level monitoring period can be changed by changing the set value of the pattern register 1, and the L level monitoring period by changing the value set in the reload register 2.

Also, by setting two successive bits of "1" in the Pb3 to Pb0 of the reload register 2, it is possible to extend the reloadable period and the rising edge monitoring period of the monitor input signal WDTIN. As shown in the schematic diagram of FIG. 28, for instance, assume that the bits Rb7 to Rb4 of the reload register 2 are set to "0110" (6H) and the bits Pb3 to Pb0 of the pattern register 1 to "0010" (2H) as in the case shown by FIG. 17 described above. It is seen from the timing chart of FIG. 29 that the rising edge monitoring period is extended to two clocks and the reloadable period to two clocks.

More specifically, in the case where "1" is set in the bits Rb6 and Rb5 of the reload register 2 as shown in FIG. 28, "1" is held in the bits Sb6 and Sb5 of the shift register 3 at the time point when the bits Rb6 and Rb5 are reloaded into the shift register 3. Upon shifting by one bit by the shift clock φ, therefore, "1" is held in the bit Sb4, so that even upon shifting of another bit by the shift clock φ, the "1" state is held in the bit Sb4. As a result, the rising edge monitoring period is sustained over two clocks of the shift clock φ. Also, as shown in FIG. 28, assuming that "1" is set in the bit Pb1 of the pattern register 1, the two inputs to the AND gate 52 turn to "1" when "1" is shifted to bit Sb1 of the shift register 3. An H level reload permit signal REL is outputted to enter a reloadable period. Therefore, even with further shifting of one bit by the shift clock φ, "1" is held in the bit Sb1. The reloadable period thus continues over two clocks of the shift clock φ.

As explained above, with the watch dog timer according to the sixth embodiment of the invention, it is possible to programmably set normal values of the pulse width and the period of the signal to be monitored, and the shared range thereof.

Although the shift register according to the sixth embodiment is constructed of eight bits, the use of a shift register, a pattern register or a reload register with more bits permits a more flexible and versatile setting.

[Embodiment 7]

According to the sixth embodiment described above, the timing of starting the L level monitoring period corresponds to that of reloading into the shift register 3 from the reload register 2. This timing is not necessarily in synchronism with the period of the shift clock φ. The resultant problem is that the L level monitoring period is not always a constant time length.

Figure 30:
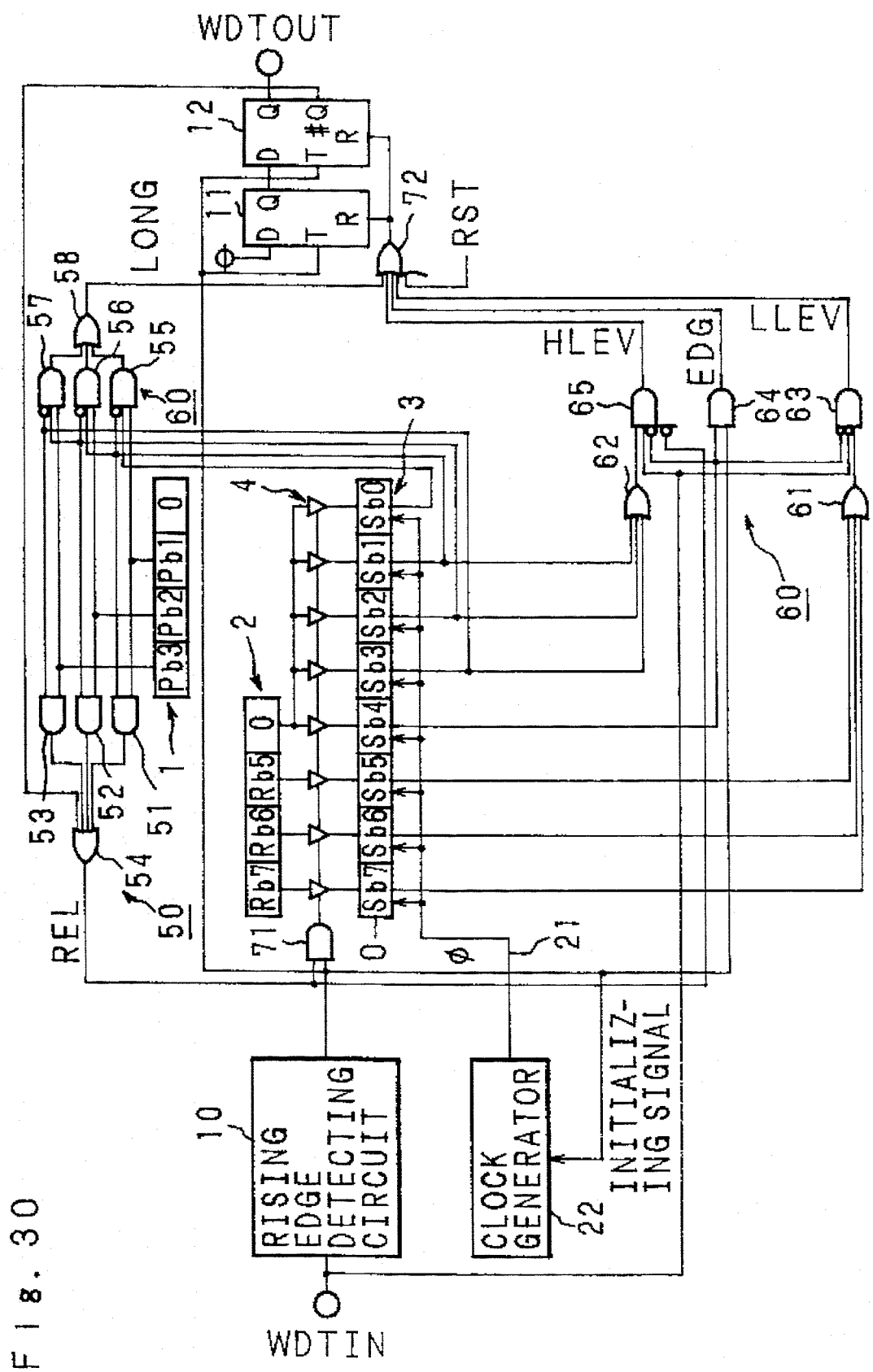
FIG. 30 is a circuit diagram showing a configuration example of the watch dog timer according to a seventh embodiment of the invention.

FIG. 30 is a circuit diagram showing a configuration example of the watch dog timer according to a seventh embodiment of the invention for solving the above-mentioned problems. Specifically, this embodiment is constructed to initialize a clock generator 22 being means for generating clock φ in response to a pulse signal outputted from a rising edge detecting circuit 10 in synchronism with the rising to H level of a monitor input signal WDTIN. The remaining components are similar to the corresponding ones included in the sixth embodiment shown in FIG. 15 and therefore will not be described.

In addition, as shown in FIG. 30, according to the seventh embodiment, the reload permitting means 50 includes AND gates 51, 52, 53, and an OR gate 54, and the monitoring pattern changing means 60 includes AND gates 55, 56, 57, OR gates 58, 61, 62 and AND gates 63, 64, 65.

Figure 31:
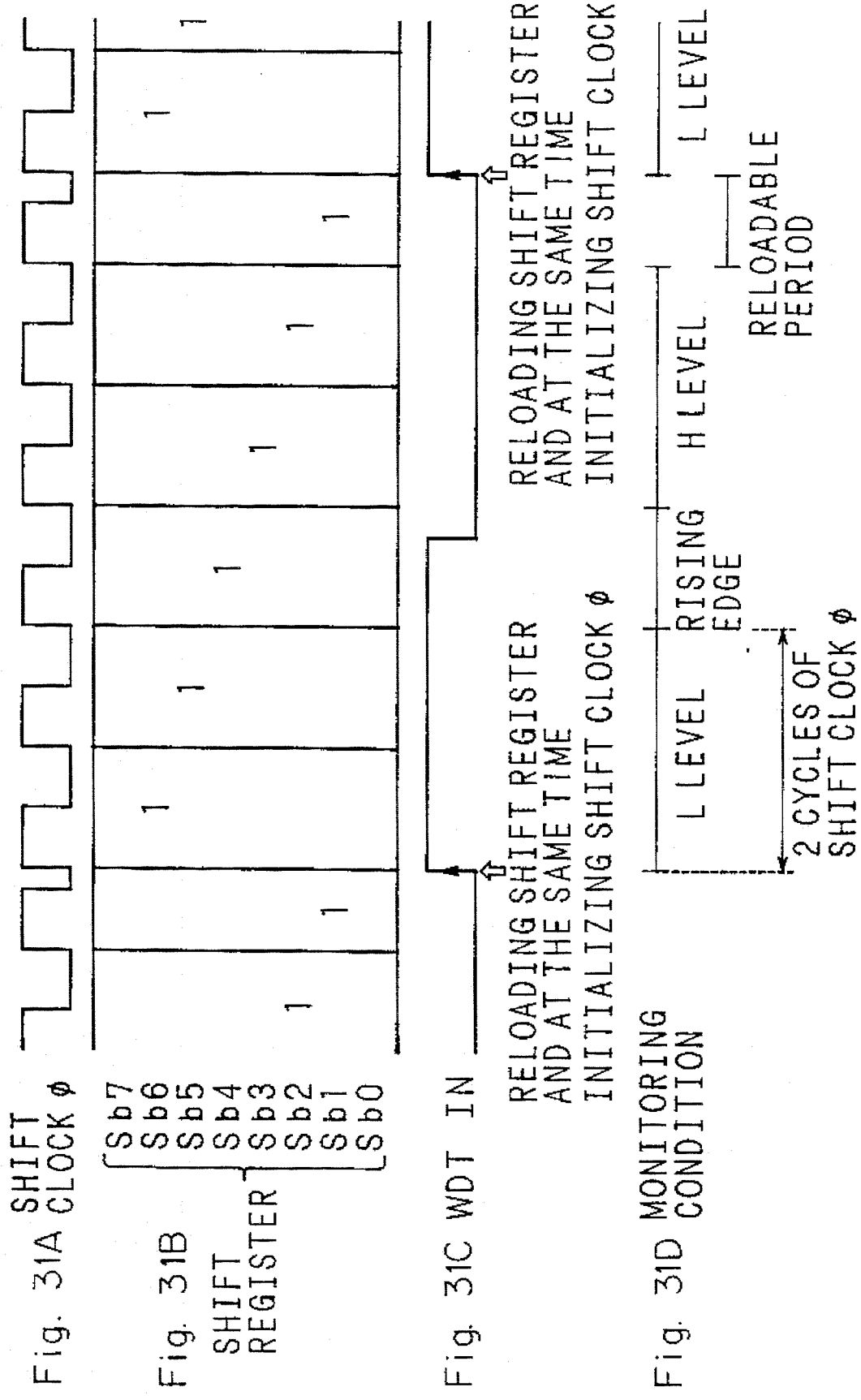
FIGS. 31(a)–31(d) are a timing chart showing the operating conditions of the watch dog timer according to the seventh embodiment of the invention.

The operation of the watch dog timer according to the seventh embodiment of the invention shown in FIG. 30 will be explained with reference to the timing chart of FIG. 31. The setting of the bits on the pattern register 1 and the reload register 2 is assumed to be identical with that for the sixth embodiment, shown in FIG. 17. As a result, the operation shown in the timing chart of FIG. 31 is basically the same as that of the sixth embodiment shown in FIG. 17.

When the monitor input, signal WDTIN turns to H level, the rising edge detecting circuit 10 outputs an H level pulse signal, so that the contents of the reload register 2 are reloaded into the shift register 3 thereby to start an L level monitoring period. At the same time, the clock generator 22 is initialized and the clock φ immediately assumes a rising edge. Thus, according to the seventh embodiment constructed as shown in FIG. 30, the L level monitoring period starts in synchronism with the clock φ, and the period thereof is uniquely determined in accordance with the period of the clock φ as a result.

[Embodiment 8]

Also, according to the sixth and seventh embodiments described above, the H level monitoring period is determined depending on which pattern register 1 is used to set in a bit "1". Nevertheless, a function similar to that of the sixth and seventh embodiments can be realized by introducing the programmability of the shift clock φ given to the shift register 3 by a frequency divider 23 instead of fixing the width of the H level monitoring period by deleting the pattern register 1.

Figure 32:
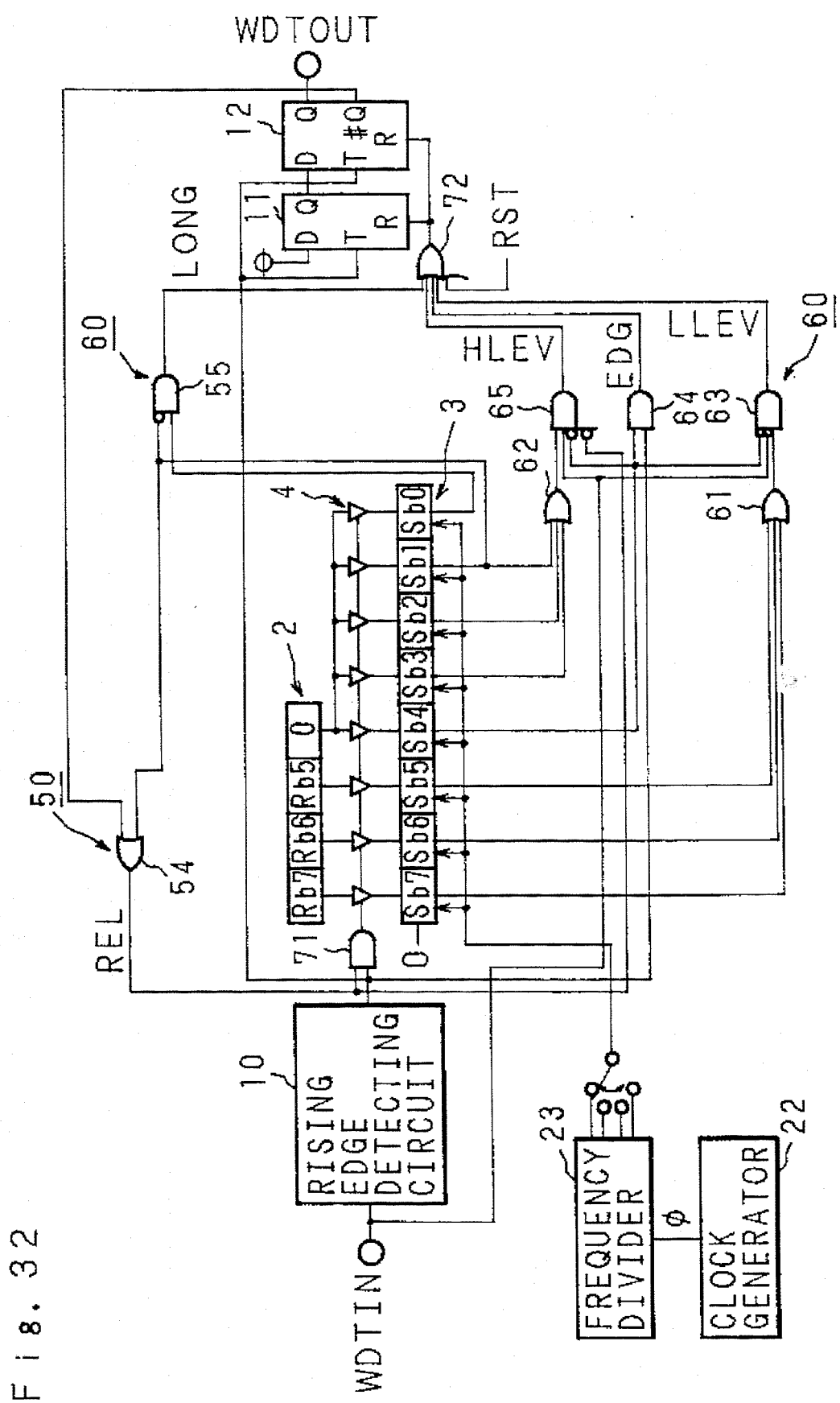
FIG. 32 is a circuit diagram showing a configuration example of the watch dog timer according to an eighth embodiment of the invention.

FIG. 32 is a circuit diagram showing a configuration example of the watch dog timer according to an eighth embodiment of the invention. Specifically, a clock φ outputted from a clock generator 22 similar to the corresponding one in the seventh embodiment shown in FIG. 30 above mentioned is given to a frequency divider 23 where it is frequency-divided into several stages, and a desired one of which is given as a shift clock to the shift register 3 Also, the embodiment does not include the pattern register 1. An OR gate 54 has two inputs to which the bit Sb1 of the shift register 3 and an inverted output terminal #Q of the second flip-flop 12 are connected. The output signal of the OR gate 54 is a reload permit signal REL as in the sixth and seventh embodiments. The AND gate 55 also has two inputs including a negative logic one input connected with the bit Sb1 of the shift register 3 and the other input, connected with the bit Sb0. The output of the AND gate 55 is given to the OR gate 72 as a long-cycle monitor signal LONG. The other components have a configuration similar to that of the seventh embodiment shown in FIG. 30 and therefore will not be described again.

In other words, according to the eighth embodiment, which lacks the pattern register 1 as monitoring pattern setting means with a desired value settable therein according to the seventh embodiment, the width of the H level monitoring period is fixed by a circuit including the OR gate 54 and the AND gate 55.

in addition, in the eighth embodiment, as shown in FIG. 32, the reload permitting means 50 includes an OR gate 54 and monitoring pattern changing means 60 has an AND gate 55, OR gates 61, 62, and AND gates 63, 64, 65.

The operation of the watch dog timer according to the eighth embodiment shown in FIG. 32 will be explained below with reference to the timing charts of FIG. 33 and FIG. 34. In the timing chart of FIG. 33, the set values of the bits Rb7 to Rb4 of the reload register 2 are "0100 (4H)" in the same manner as shown in the case of FIG. 24. As a result, the operation specified by the timing chart of FIG. 33 is basically identical with that of the timing chart of FIG. 25.

Figure 33:
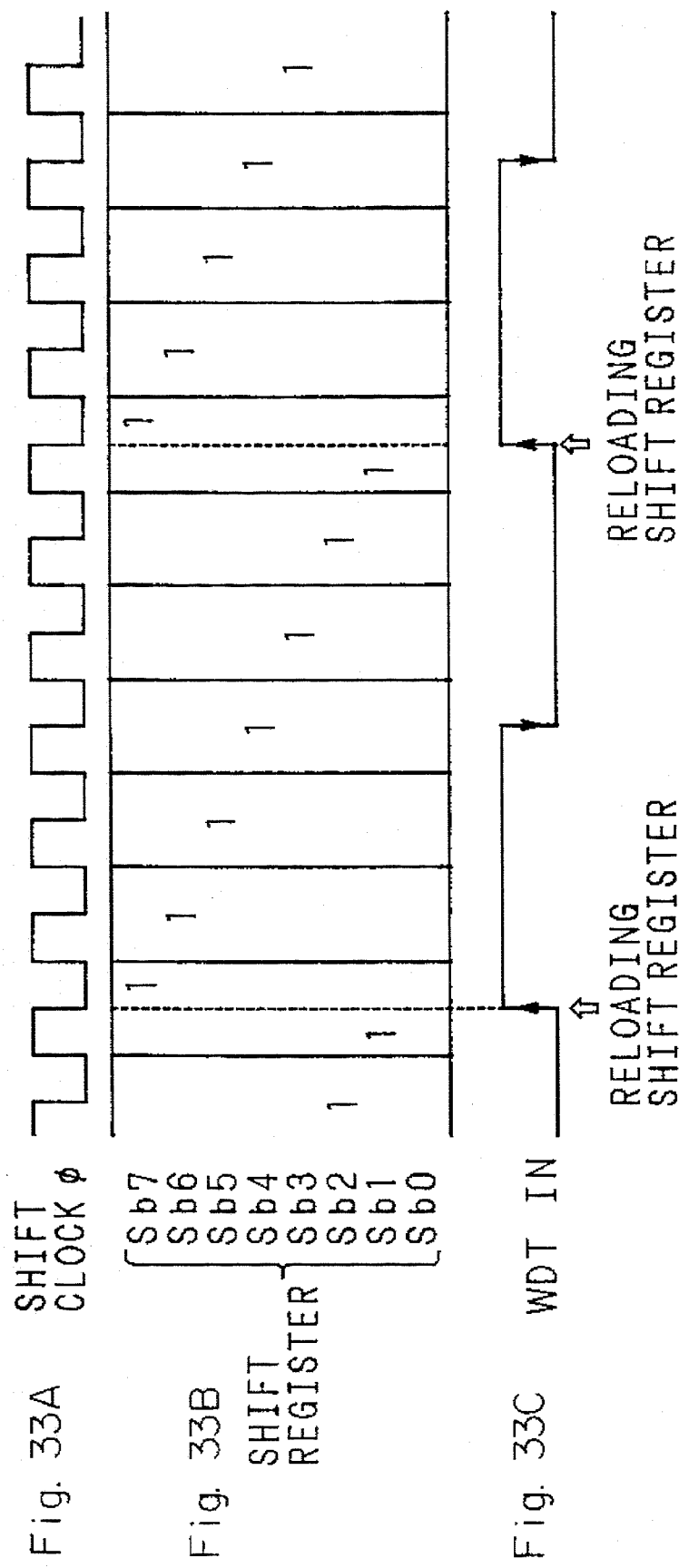
FIGS. 33(a)–33(c) are a timing chart showing the operating conditions of the watch dog timer according to the eighth embodiment of the invention.
Figure 34:
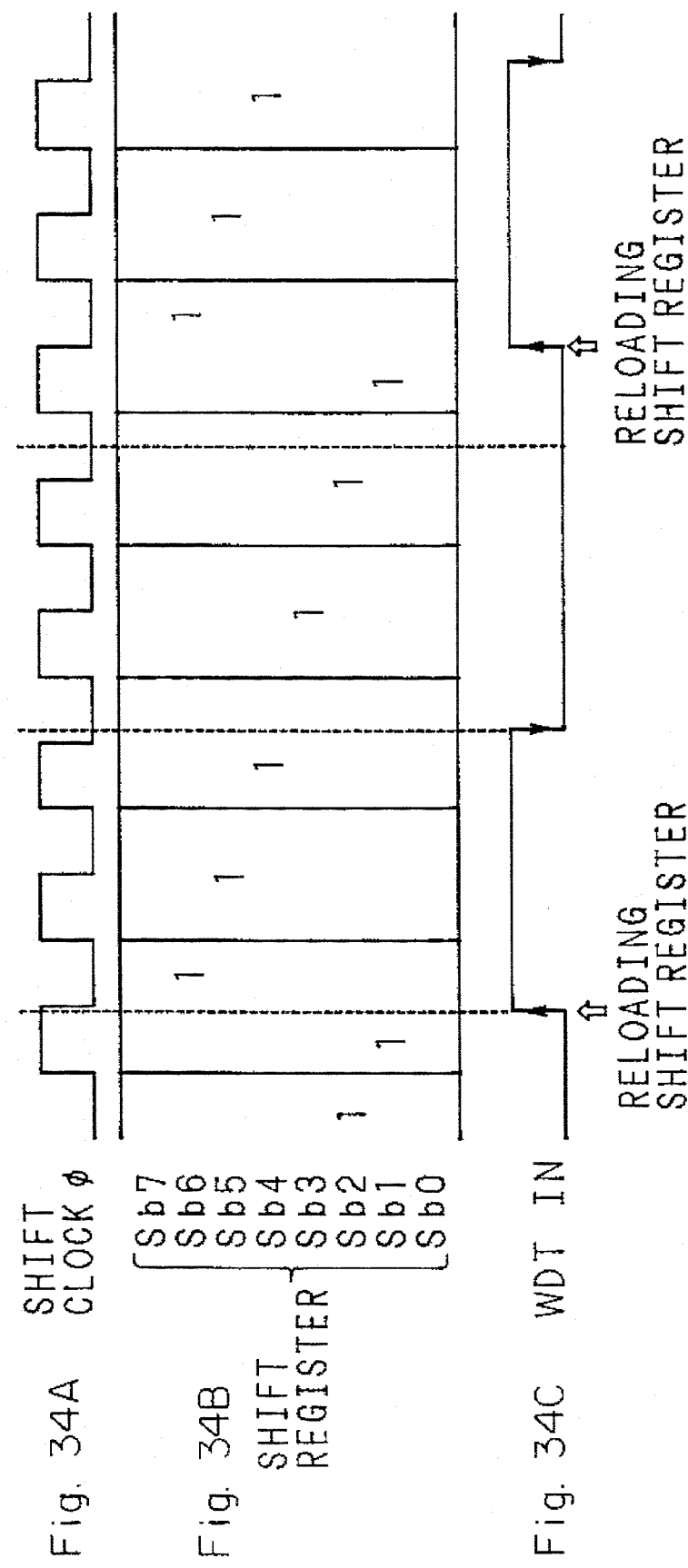
FIGS. 34(a)–34(c) are a timing chart showing the operating conditions of the watch dog timer according to the eighth embodiment of the invention.

In the timing chart shown in FIG. 34, on the other hand, the set values of the bits Rb7 to Rb4 of the reload register 2 are determined as "0010 (2H)" as in the case of FIG. 17 described above. The shift clock φ is set to have a longer period in this case than in the case of the timing chart of FIG. 33 by a frequency divider 23. As a consequence, the timing charts of FIG. 33 and FIG. 34 define basically the same operation as the timing shown in FIG. 18.

By the way, "1" is set in the bit Sb7 of the shift register 3 in FIG. 33 and the bit Sb6 of the shift register in FIG. 34 respectively at the time point when the set value of the reload register 2 is reloaded into the shift register 3. As a result, the first L level monitoring period is shorter by one clock for FIG. 34 than for FIG. 33. Since the shift clock φ is longer for FIG. 34 than for FIG. 33, however, the H level monitoring period is substantially the same for the two cases. The L level monitoring period, however, is extended by the difference of the shift clock φ between FIG. 33 and FIG. 34 in view of the fact that the number of clocks is the same for both cases.

As described above, according to the eighth embodiment of which the configuration is shown in FIG. 32, the H level monitoring period alone can be extended while the H level monitoring period is kept the same by selecting the set value of the reload register 1 appropriately even when the pattern register 2 and the related circuits are deleted.

[Embodiment 9]

Figure 35:
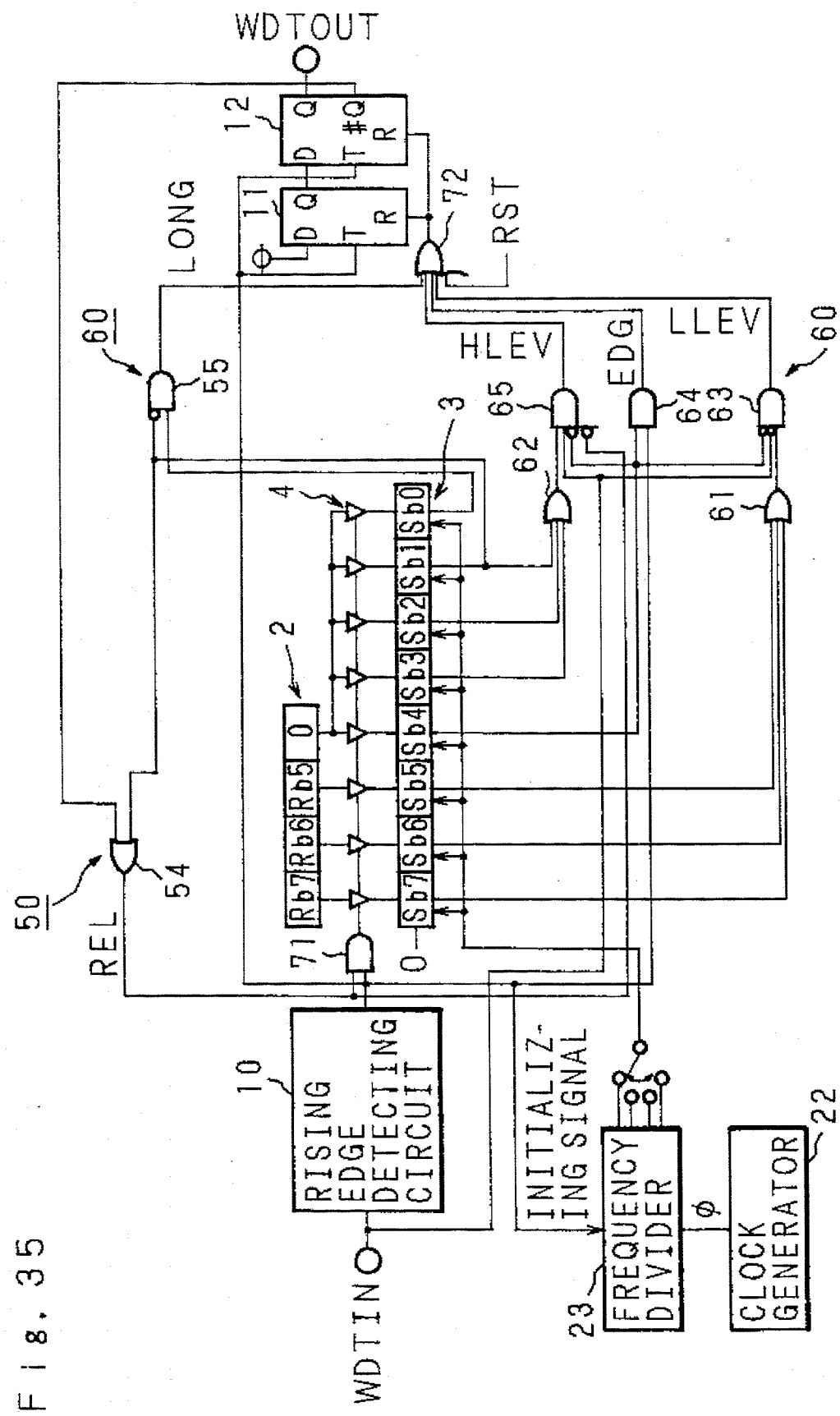
FIG. 35 is a circuit diagram showing a configuration example of the watch dog timer according to a ninth embodiment of the invention.

FIG. 35 is a circuit diagram showing a configuration of a ninth embodiment in which as in the seventh embodiment shown in FIG. 30, in order to initialize the shift clock φ, an H Level pulse signal of the rising edge detecting circuit 10 is given to the frequency divider 23. This configuration of the watch dog timer according to the ninth embodiment of the invention shown in FIG. 35 makes possible accurate monitoring in synchronism with the clock φ.

By the way, in the ninth embodiment of the invention, as shown in FIG. 35, the reload permitting means 50 includes an OR gate 54, and the monitoring pattern changing means 60 includes an AND gate 55, OR gates 61, 623, and AND gates 63, 64, 65.

[Embodiment 10]

Figure 36:
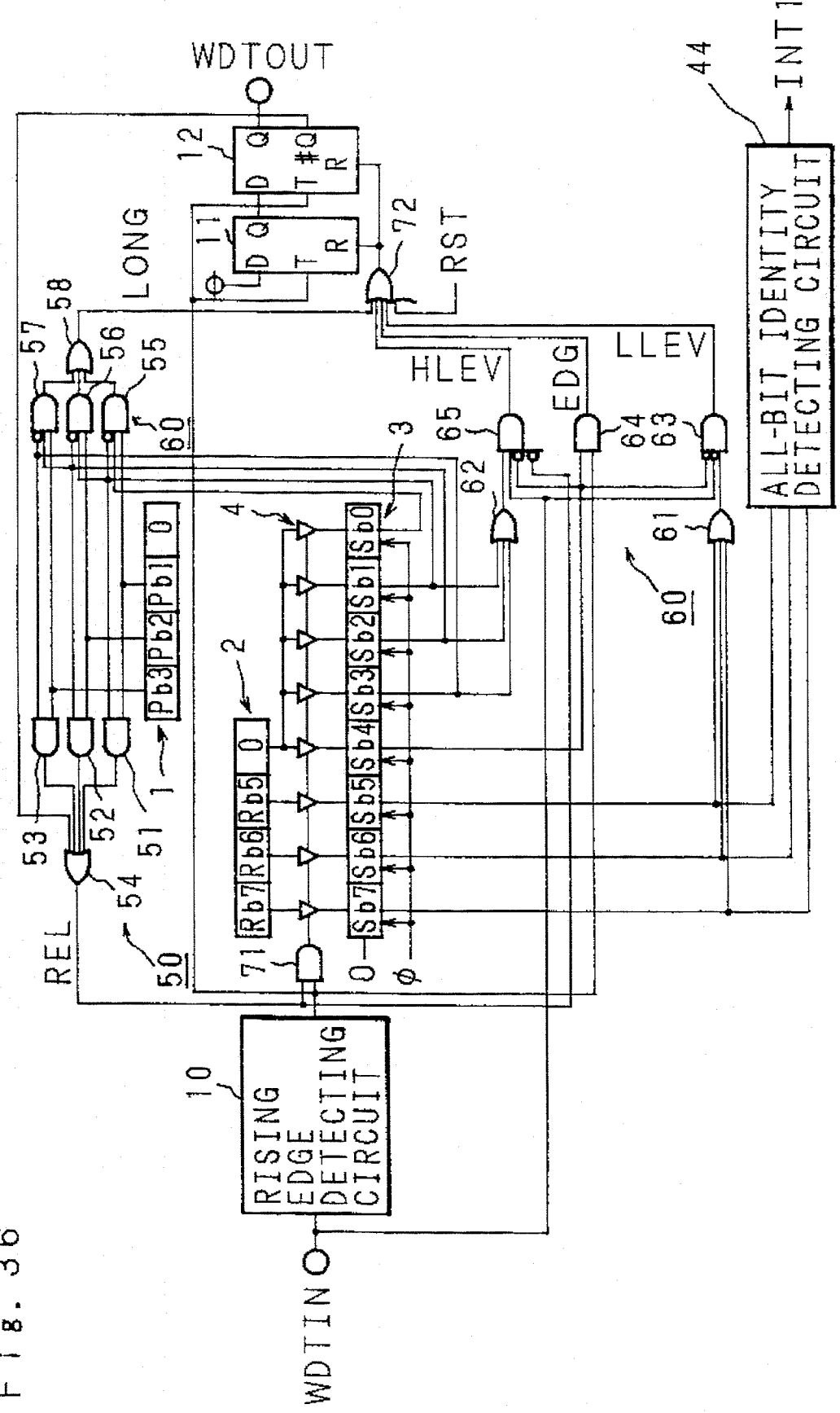
FIG. 36 is a circuit diagram showing a configuration example of the watch dog timer according to a tenth embodiment of the invention.

FIG. 36 is a circuit diagram showing a configuration of the watch dog timer according to a tenth embodiment of the invention.

As in the first embodiment shown in FIG. 2, the sixth embodiment described above operates in accordance with any data, or even an erroneous data, which may be reloaded from the reload register 2 into the shift register 3. A normal monitoring operation is impossible, however, when all of the bits of the data reloaded from the reload register 2 into the shift register 3 are active ("1") or nonactive ("0").

In view of the above-mentioned situation, the tenth embodiment shown in FIG. 36, as in the second embodiment of FIG. 4 described above, has an added function of generating an interrupt signal by detecting the possible case where all of the bits of data are reloaded from the reload register 2 into the shift register 3 or where all of the bits are non-active, i.e., an all-bit identity detecting circuit 44.

Figure 37:
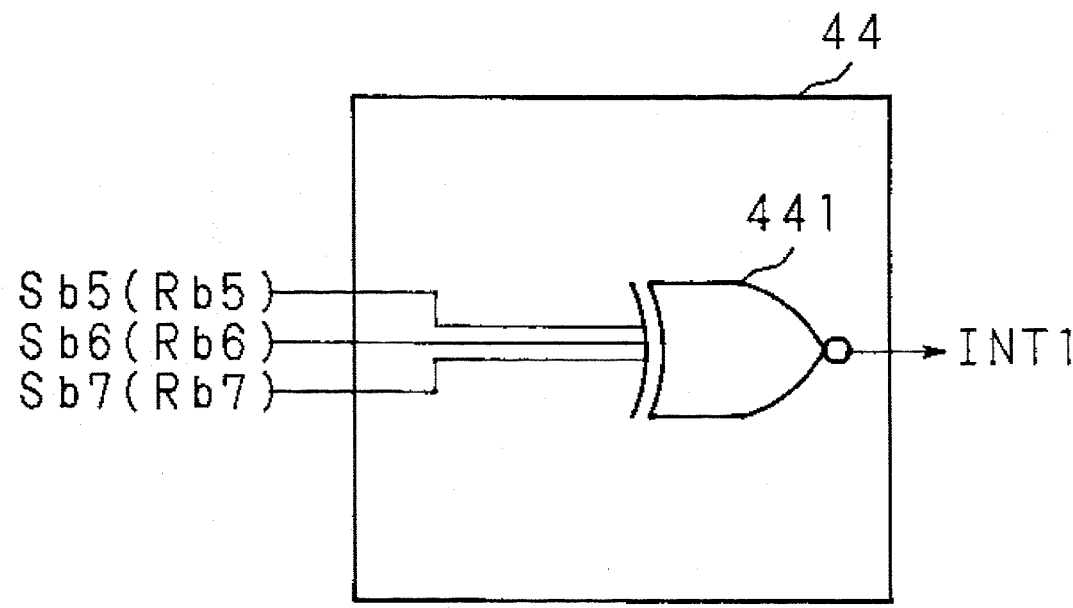
FIG. 37 is a circuit diagram showing a specific configuration example of a all-bit identity detecting circuit of the watch dog timer according to the tenth embodiment of the invention.

More specifically, as shown in FIG. 36, the all-bit identity detecting circuit 44 is connected with the bits Sb7, Sb6, Sb5 of the shift register 3. By the way, a specific configuration of the all-bit identity detecting circuit 44 is basically same as that shown in FIG. 5, and includes a three-input exclusive NOR gate 441 having three bits Sb7, Sb6, Sb5 of the shift register 3 as input bits as shown in FIG. 37.

By the way, as shown in FIG. 36, according to the tenth embodiment, the reload permitting means 50 includes AND gates 51, 52, 53, and an OR gate 54, and the monitoring pattern changing means 60 is composed of AND gates 55, 56, 57, OR gates 58, 61, 62 and AND gates 63, 64, 65.

With the watch dog timer according to the tenth embodiment of the invention as shown in FIG. 36, in the case where either "0" or "1" is written in all of the bits Sb5, Sb6, Sb7 of the shift register 3 from the reload register 2, an H level signal (the all-bit identical data fault interrupt signal for all of bits) INT1 is outputted from the exclusive NOR gate 441 of the all-bit identity detecting circuit 44. As a result, in the case where an H level signal is outputted from the exclusive NOR gate 441, an appropriate step is taken such as by writing data again in the reload register 2.

Figure 38:
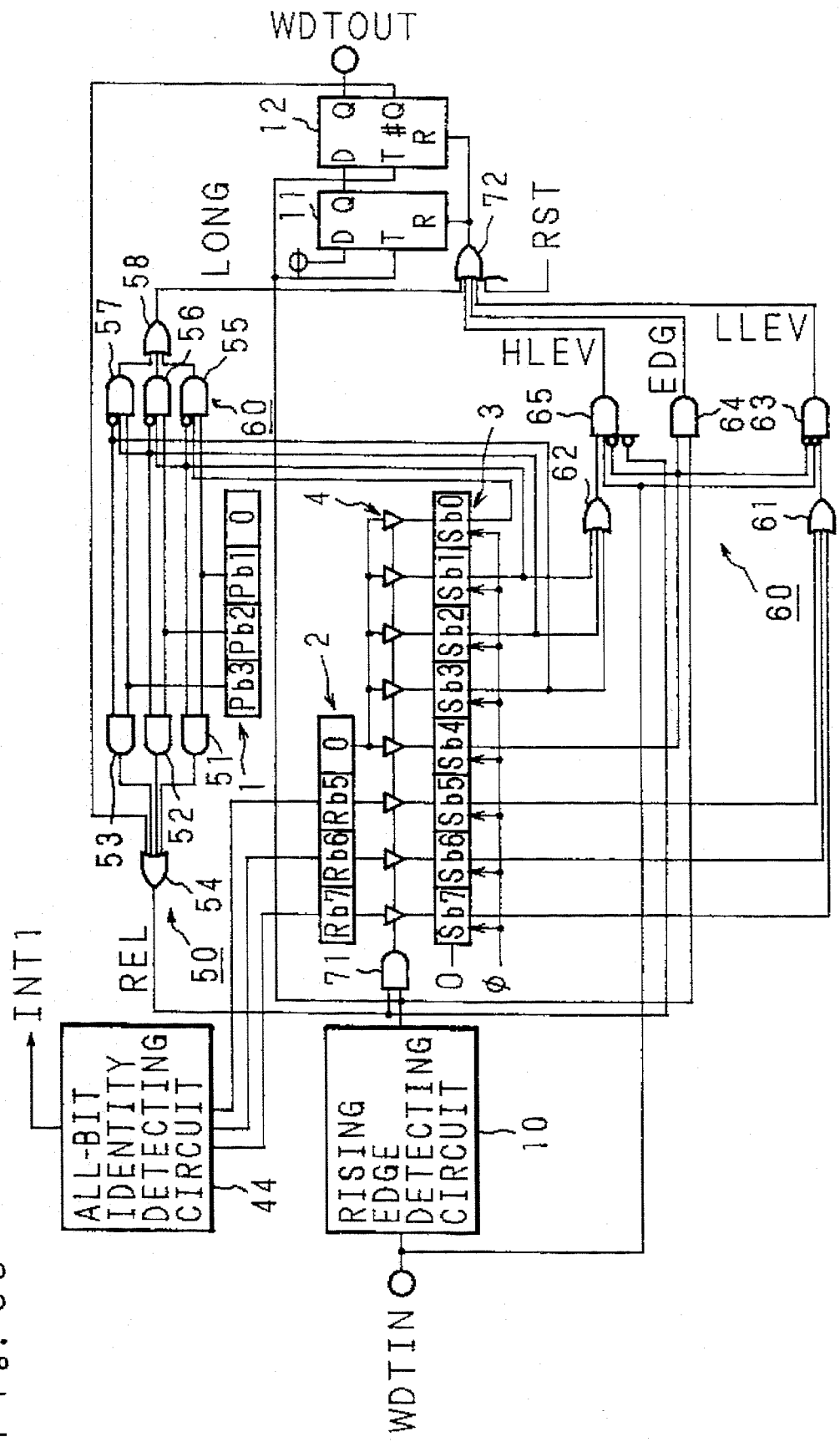
FIG. 38 is a circuit diagram showing a further configuration example of the watch dog timer according to the tenth embodiment of the invention.

FIG. 38 is a circuit diagram showing another configuration example of the tenth embodiment. In this example, the all-bit identity detecting circuit 44 constructed in the same way as that shown in FIG. 36 is connected with bits Rb7, Rb6, Rb5 of the reload register 2.

In this another configuration example of the tenth embodiment of the watch dog timer according to the invention shown in FIG. 38, in the case where either "1" or "0" is written into all of the bits Rb7, Rb6, Rb5 of the reload register 2 as data to be reloaded into the shift register 3 from the reload register 2, an 1.1 level interrupt signal (the all-bit identical data fault interrupt signal for all of bits) INT1 is outputted from the exclusive NOR gate 441 of the all-bit identity detecting circuit 44.

As explained above, in the watch dog timer according to the tenth embodiment of the invention, with the all-bit identity detecting circuit 44 as shown in FIG. 37 connected in such a manner as specified in FIGS. 36 or 38, detection is made possible of any case in which all of the bits of the data reloaded from the reload register 2 into the shift register 3 may become "1" or "0".

[Embodiment 11]

Figure 39:
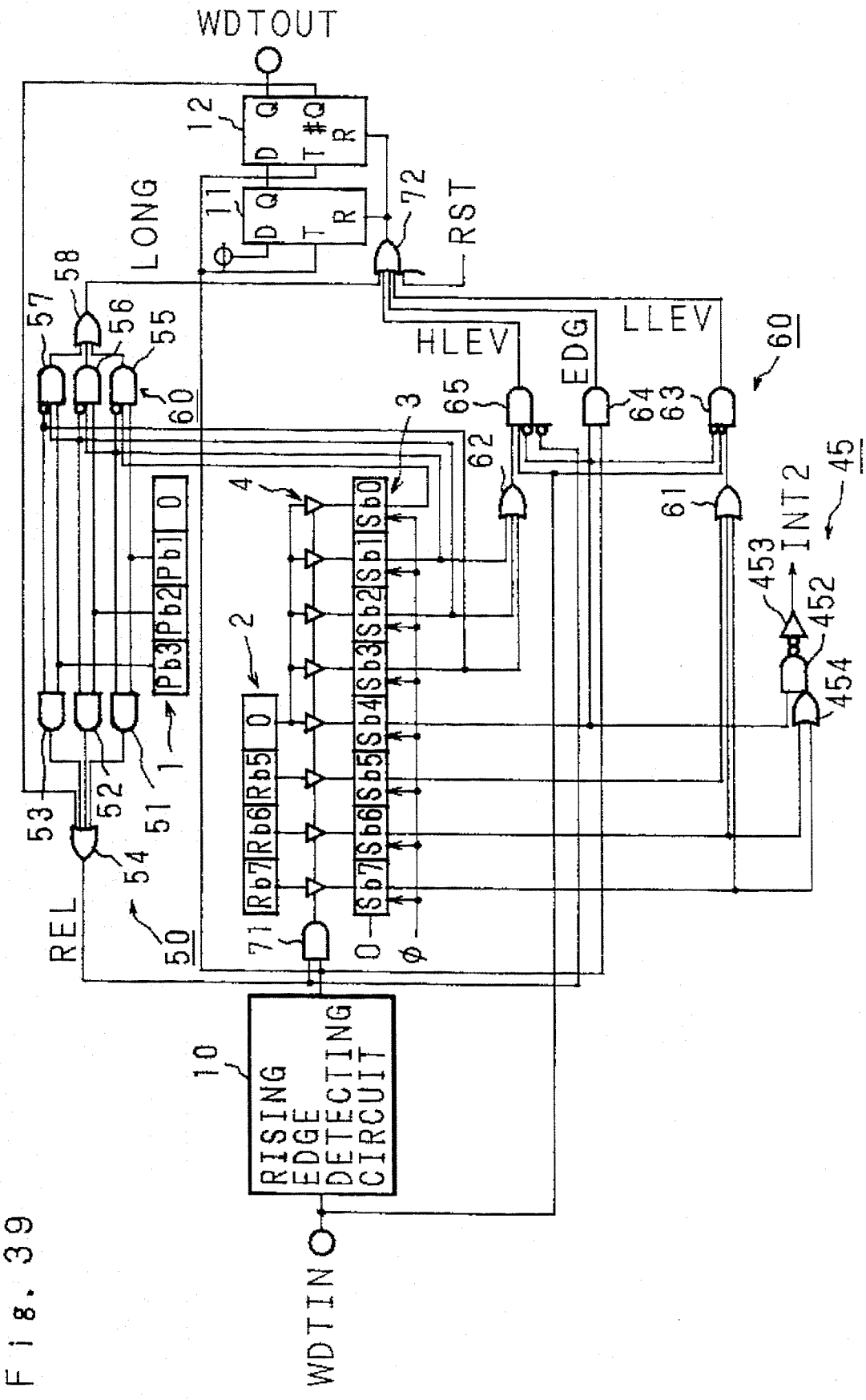
FIG. 39 is a circuit diagram showing a configuration example of the watch dog timer according to an 11th embodiment of the invention.

FIG. 39 is a circuit diagram showing a configuration example of an 11th embodiment of the watch dog timer according to the invention.

The watch dog timer according to the 11th embodiment of the invention is constructed in such a way that in the case where "1" is written in the bit Sb4 of the shift register 3, whether at least one of the bits Sb7 and Sb6 is "1" is detected and an interrupt signal is generated. The object is that during the period when the bit Sb4 of the register 3 contains "1", a read operation is permitted as mentioned above, but when the particular period is abnormally long, the fact is detected.

The construction according to the 11th embodiment shown in FIG. 39 additionally includes an active data fault detecting circuit designated by reference numeral 45 in the configuration according to the sixth embodiment shown in FIG. 15. This active data fault detecting circuit 45, which basically has the same configuration as that of the third embodiment shown in FIG. 7, comprises an OR gate 454 supplied with the bits Sb7, Sb6 of the shift register 3, a NAND gate 452 whose input thereof is connected to the output of the OR gate 454 and the bit Sb4 of the shift register 3 and an inverter 453 for outputting an inverted output of the NAND gate 452.

According to the 11th embodiment constructed as mentioned above, as in the third embodiment, in the case where "1" is written in the bit Sb7 or Sb6 in addition to the bit Sb4 of the shift register 3, the output of the OR gate 454 of the active data fault detecting circuit 45 becomes "1". As a result, both inputs to the NAND gate 452 become "1" with the output thereof assuming "0" state, so that the output of the inverter 453, i.e., the output INT2 (active data fault interrupt signal) of the active data fault detecting circuit 45 becomes H level.

As described above, in the watch dog timer according to the 11th embodiment of the invention, in the possible event that "1" is stored in the bit Sb4 of the shift register 3 with "1" also in the bits Sb7 and Sb6, i.e., when such data as to define two or more reloadable periods are set during one period of monitoring operation is written in the shift register 3, such a fault can be detected.

[Embodiment 12]

Figure 40:
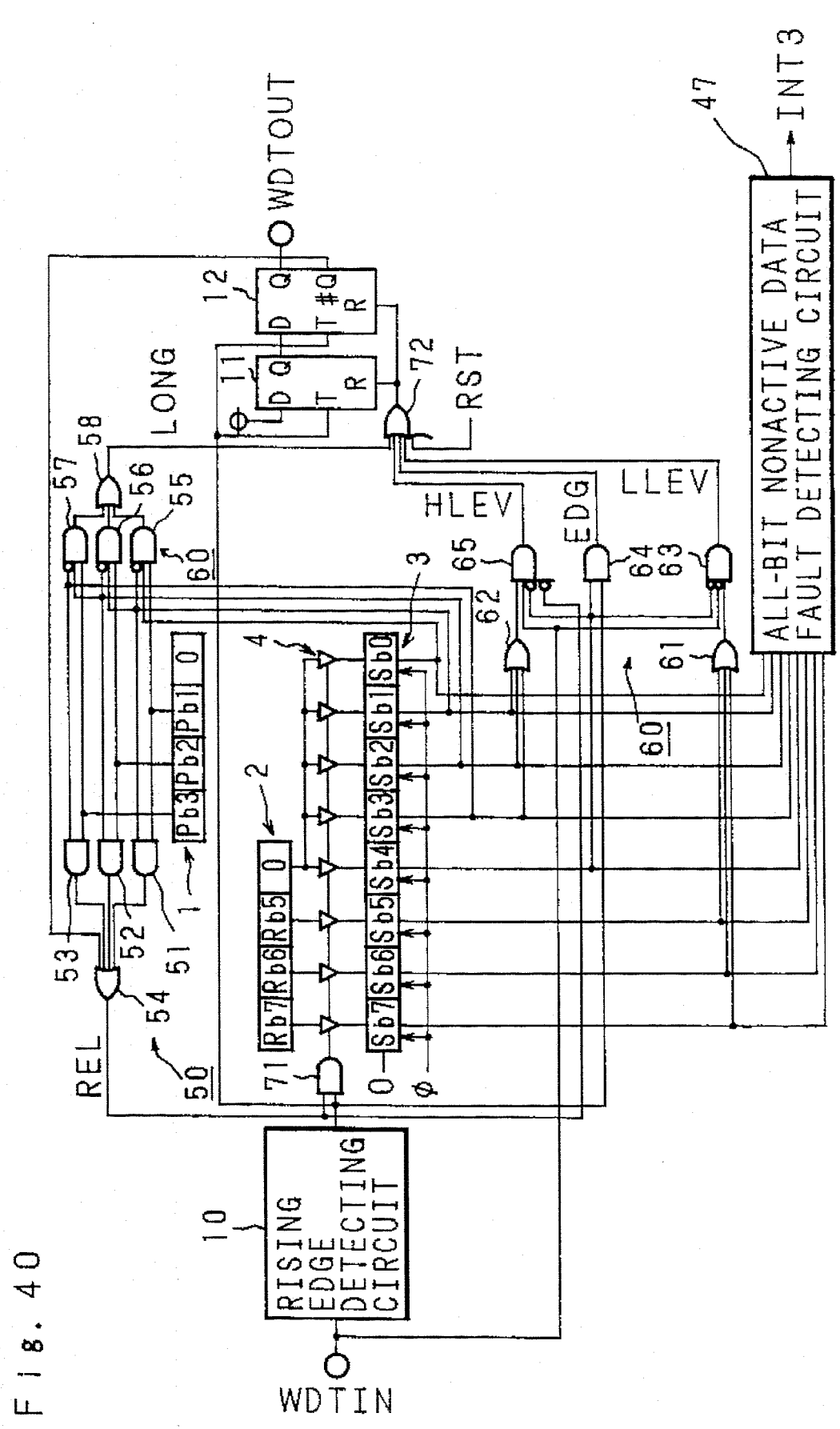
FIG. 40 is a circuit diagram showing a configuration example of the watch dog timer according to a 12th embodiment of the invention.

Next, a 12th embodiment of the watch dog timer according to the invention will be explained with reference to the circuit diagram of FIG. 40 showing a configuration example thereof.

The watch dog timer according to the 12th embodiment of the invention is equipped with a function for detecting a fault in which active data, i.e., data "1" is not reloaded in the least into the shift register 3 from the reload register 2 according to the sixth embodiment shown in FIG. 15.

Specifically, the circuit shown in FIG. 40 includes an all-bit nonactive data fault detecting circuit designated by reference numeral 47 included in the circuit of FIG. 15. This all-bit nonactive data fault detecting circuit 47 is connected with all of the bits Sb7 to Sb0 of the shift register 3, and is composed of an AND gate 471 with all the inputs thereof in negative logic as shown in the circuit diagram of FIG. 41, as an example.

In the watch dog timer according to the 12th embodiment of the invention shown in FIG. 40, in the case where "0" is reloaded in all of the bits Sb7 to Sb0 of the shift register 3 from the reload register 2, an H level signal (all-bit nonactive data fault interrupt signal) is outputted from the AND gate 471 of the all-bit nonactive data fault detecting circuit 47. The other operations are same as those of the sixth embodiment shown in FIG. 15.

As a consequence, in the case where an H level signal is outputted from the all-bit nonactive data fault detecting circuit 47, an appropriate action is taken such as writing data again in the reload register 2.

Figure 41:
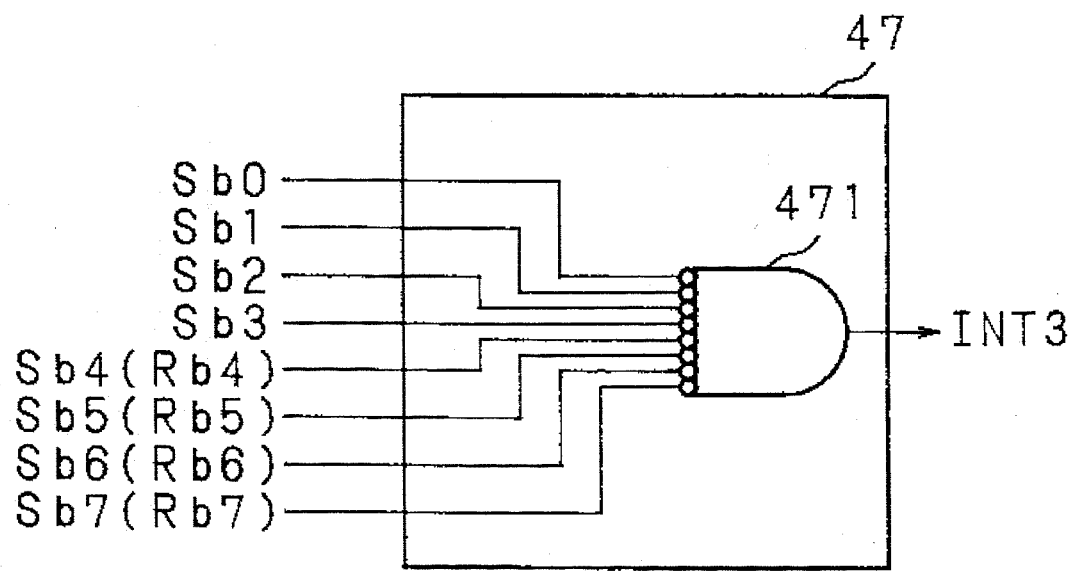
FIG. 41 is a circuit diagram showing a specific configuration example of a all-bit non-active data fault detecting circuit of the watch dog timer according to the 12th embodiment of the invention.

In addition, FIG. 40 and FIG. 41 show a configuration in which the values of all of the bits Sb7 to Sb0 of the shift register 3 are checked by the all-bit nonactive data fault detecting circuit 47. In view of the Fact that "0" is reloaded in bits Sb4 to Sb0 of the shift register 3 from bit Rb4 fixed to "0" of the reload register 2, however, an alternative is to cause the all-bit nonactive data fault detecting circuit 47 to check only the values of the three bits Sb7, Sb6, Sb5 of the shift register 3.

Figure 42:
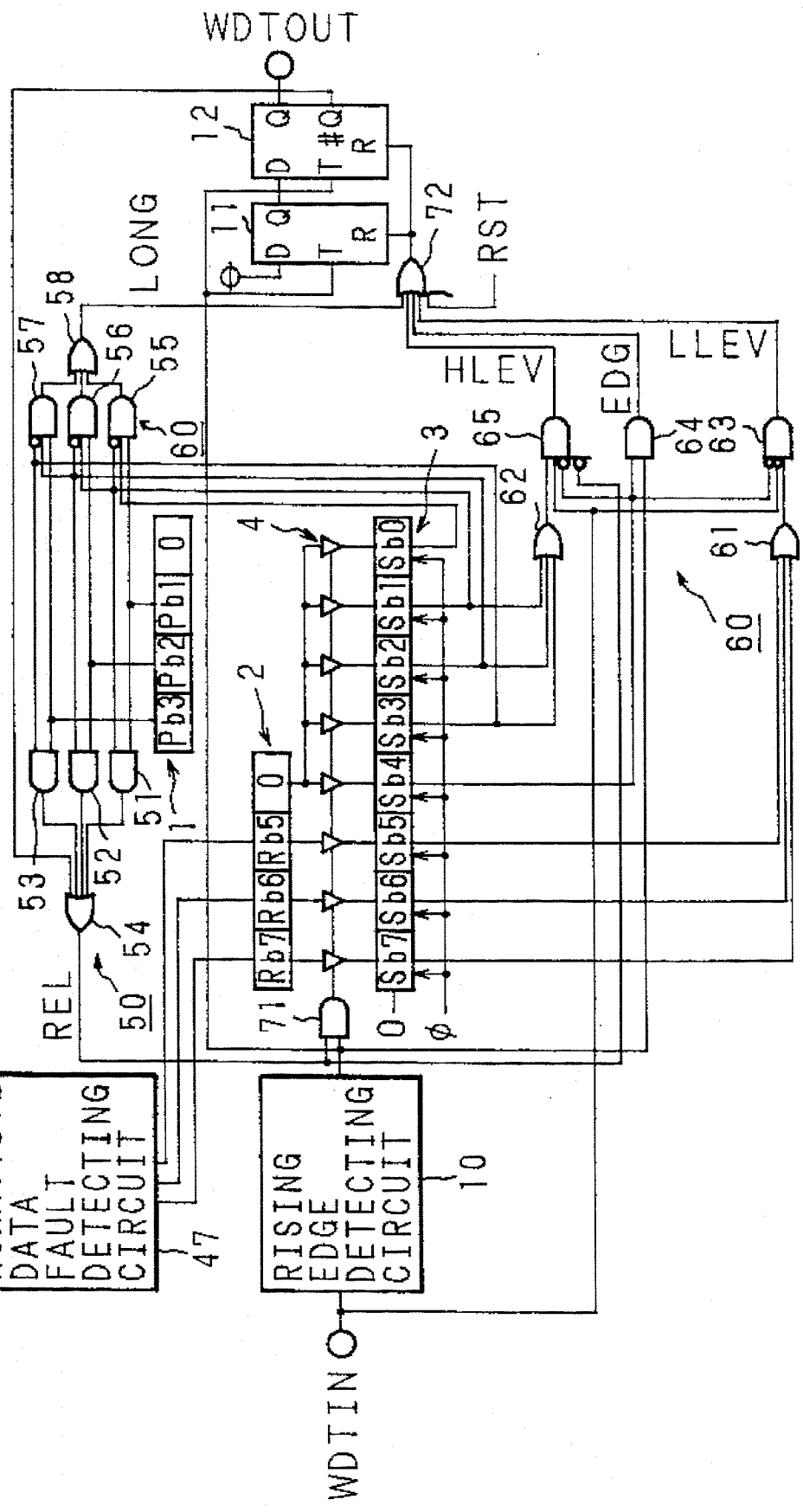
FIG. 42 is a circuit diagram showing a configuration example of the watch dog timer according to the 12th embodiment of the invention.

FIG. 42 is a circuit diagram showing another configuration example according to the 12th embodiment. In this example, an all-bit nonactive data fault detecting circuit 47 constructed the same way as in FIG. 41 is connected with all of the bits Rb7 to Rb4 of the reload register 2.

In this another configuration example of the watch dog timer according to the 12th embodiment of the invention shown in FIG. 42, suppose that "0" has been written in all of bits Rb7 to Rb4 of the reload register 2 as data to be reloaded into the shift register 3 (where bit Rb4 is fixed to "0" under normal conditions). A "1" level signal (all-bit nonactive data fault interrupt signal) INT3 is outputted from the AND gate 471 of the all-bit nonactive data fault detecting circuit 47.

In FIG. 42, the values of all of the bits Rb7 to Rb4 of the reload register 2 are adapted to be checked by the all-bit nonactive data fault detecting circuit 47. Since bit Sb4 of the reload register 2 is fixed to "0", however, only the values of the three bits Rb7, Rb6, Rb5 of the reload register 2 are alternatively checked at the all-bit nonactive data fault detecting circuit 47.

As described above, in the watch dog timer according to the 12th embodiment of the invention, the configuration shown in FIG. 40 or FIG. 42 permits "0" to be detected, when written in all of the bits of the data reloaded into the shift register 3 from the reload register 2.

[Embodiment 13]

By the way, in the watch dog timer according to the sixth embodiment of the invention shown in FIG. 15, by the use of two-stage flip-flops 11, 12, the monitor output signal WDTOUT is adapted to be returned to the normal conditions only when no abnormality is not detected until two times of risings to H level of the monitor input signal WDTIN after a provisional detection of the abnormality. The employment of the configuration shown in the circuit diagram of FIG. 43, for instance, makes it possible to set as desired the time taken until return after abnormality detection. Such a watch dog timer according to the 13th embodiment of the invention will be explained below with reference to the accompanying drawing.

Figure 43:
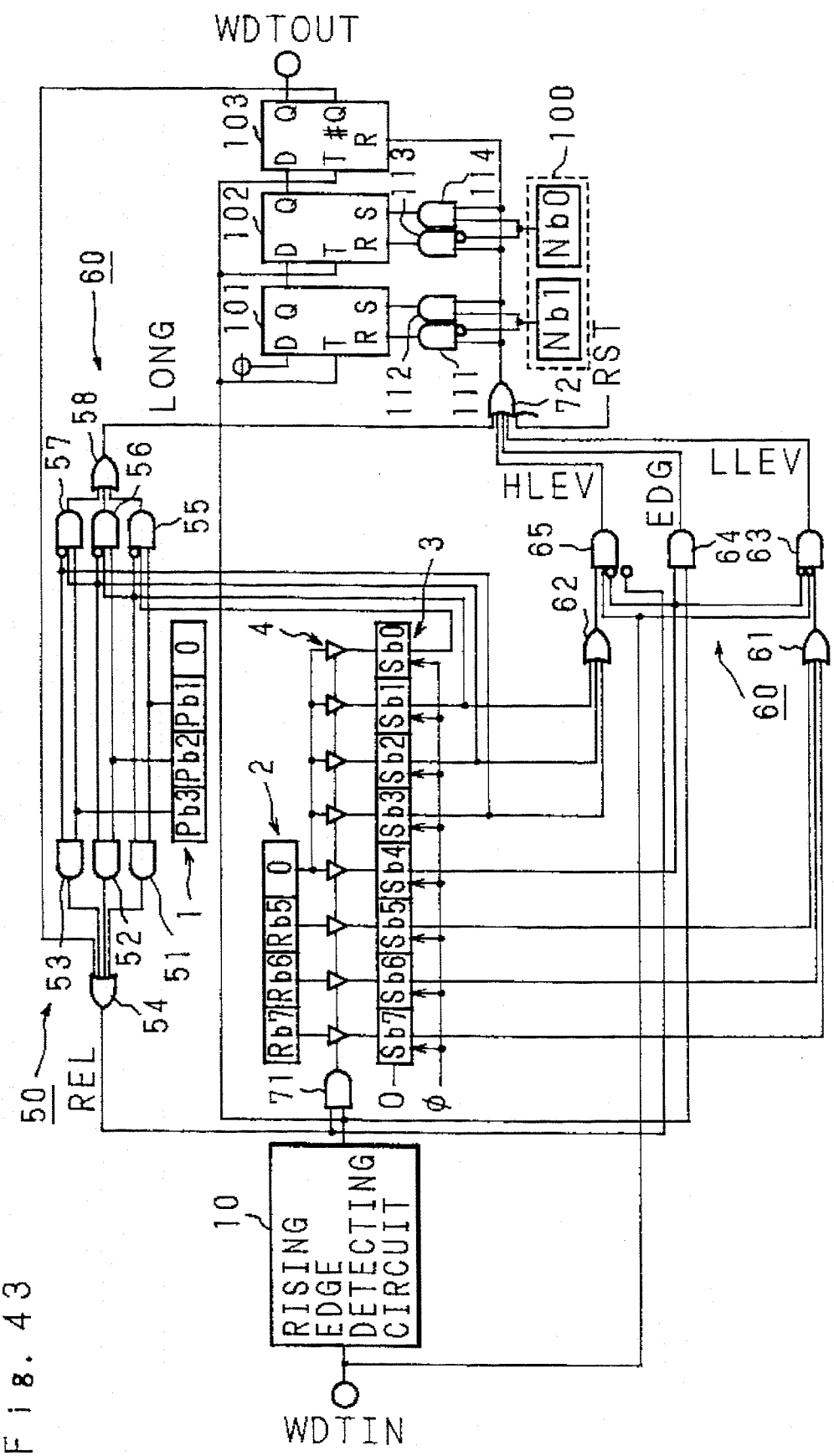
FIG. 43 is a circuit diagram showing a configuration example of the watch dog timer according to a 13th embodiment of the invention.

The 13th embodiment shown in FIG. 43 comprises three stages of D flip-flops (including first, second and third flip-flops designated by 101, 102 and 103 respectively), and a two-bit (Nb1, Nb0) normal output confirmation frequency register 100 and four two-input, AND gates 111 to 114. In addition, one of the inputs to the AND gates 111, 113 is in positive logic, and the other input in negative logic.

A specific circuit configuration is described below. One of the inputs of each of the AND gates 111 to 114 is connected with the output of the OR gate 72, and the other negative logic input of the AND gate 111 and the other input of the AND gate 112 are connected with Nb1 of the normal output confirmation frequency register 100. Also, Nb0 of the normal output confirmation frequency register 100 is connected with the other negative input of the AND gate 113 and the other input of the AND gate 114.

The output of the AND gate 111 is connected to the reset terminal R of the first flip-flop 101, and the output of the AND gate 112 to the set terminal S of the first flip-flop 101. The output of the AND gate 113 is connected to the reset terminal R of the second flip-flop 102, and the output of the AND gate 114 to the set terminal S of the first flip-flop 101. In addition, the third flip-flop 103 has only the reset terminal v connected to the output of the OR gate 72.

The configuration of the other components than those described above is similar to that of the sixth embodiment shown in FIG. 15 and will not be described again.

Next, the operation of the 13th embodiment shown in FIG. 43 will be explained.

Figure 44:
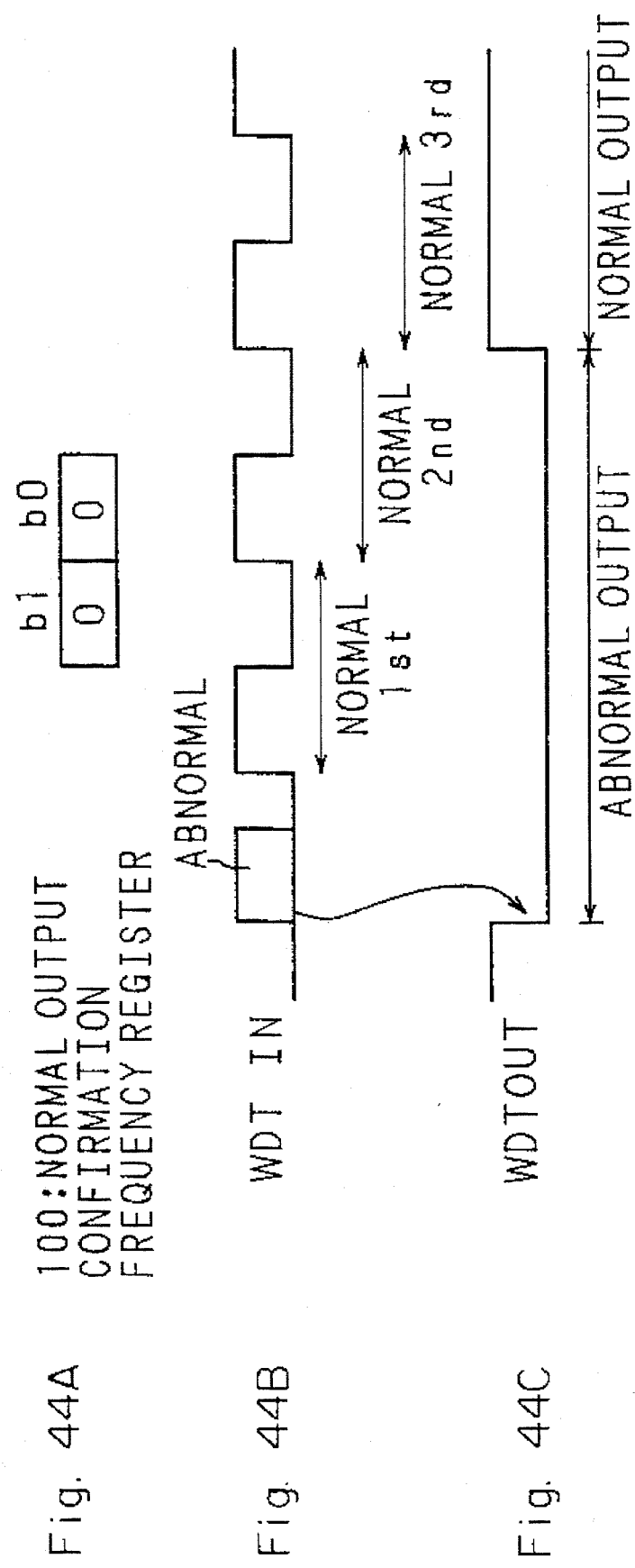
FIGS. 44(a)–44(c) are a timing chart showing the operating conditions in the case where "00" is set in each bit of a normal output confirmation frequency register of the watch dog timer according to the 13th embodiment of the invention.

As shown in the timing chart of FIG. 44, assuming that "00" is set in the bits Nb1, Nb0 of the normal output confirmation frequency register 100, the output of any of the AND gates 111 to 114 keeps L level as long as the monitor output signal WDTOUT being an output signal of the OR gate 72 is at normal L level. Therefore, the first flip-flop 101 and the second flip-flop 102 are neither set nor reset. Also, the third flip-flop 103 is not reset either.

Upon occurrence of an abnormality, the monitor output signal WDTOUT being an output signal of the OR gate 72 turns to H level, and therefore the output of the AND gates 111, 113 turns to H level, thereby resetting the first flip-flop 101 and the second flip-flop 102. At the same time, the third flip-flop 103 is also reset, so that the reload permit signal REL making up the output signal of the OR gate 54 turns to H level as in the sixth embodiment described above.

After that, when the monitor input signal WDTIN rises to H level without occurrence of any abnormality, the first flip-flop 101 is triggered and only the output from the output terminal Q thereof turns to H level. When the monitor input signal WDTIN rises again to H level without any abnormal condition, the second flip-flop 102 is triggered and the output from the output terminal Q thereof also turns to H level. Finally, upon rising of the monitor input signal WDTIN to H level for the second time, the third flip-flop 103 is triggered with the output from the output terminal Q thereof turning to H level.

As described above, according to the 13th embodiment having a configuration as shown in FIG. 43, when a "00" is set in the normal output confirmation frequency register 100, the monitor output signal WDTOUT is returned to normal condition that the rising to H level of the monitor input signal WDTIN occurs three times without repeated occurrence of an abnormal condition after the previous abnormality.

Figure 45:
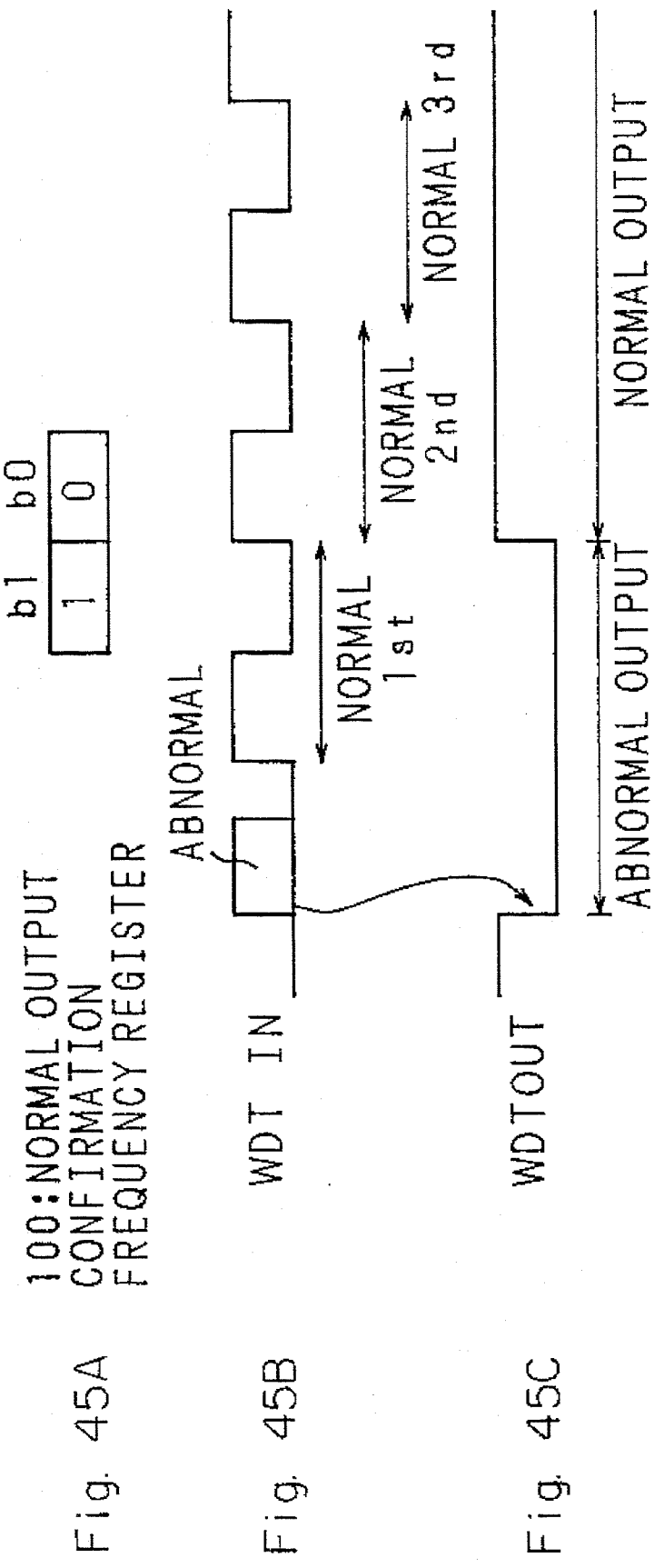
FIGS. 45(a)–45(c) are a timing chart showing the operating conditions in the case where "10" is set in each bit of a normal output confirmation frequency register of the watch dog timer according to the 13th embodiment of the invention.
Figure 46:
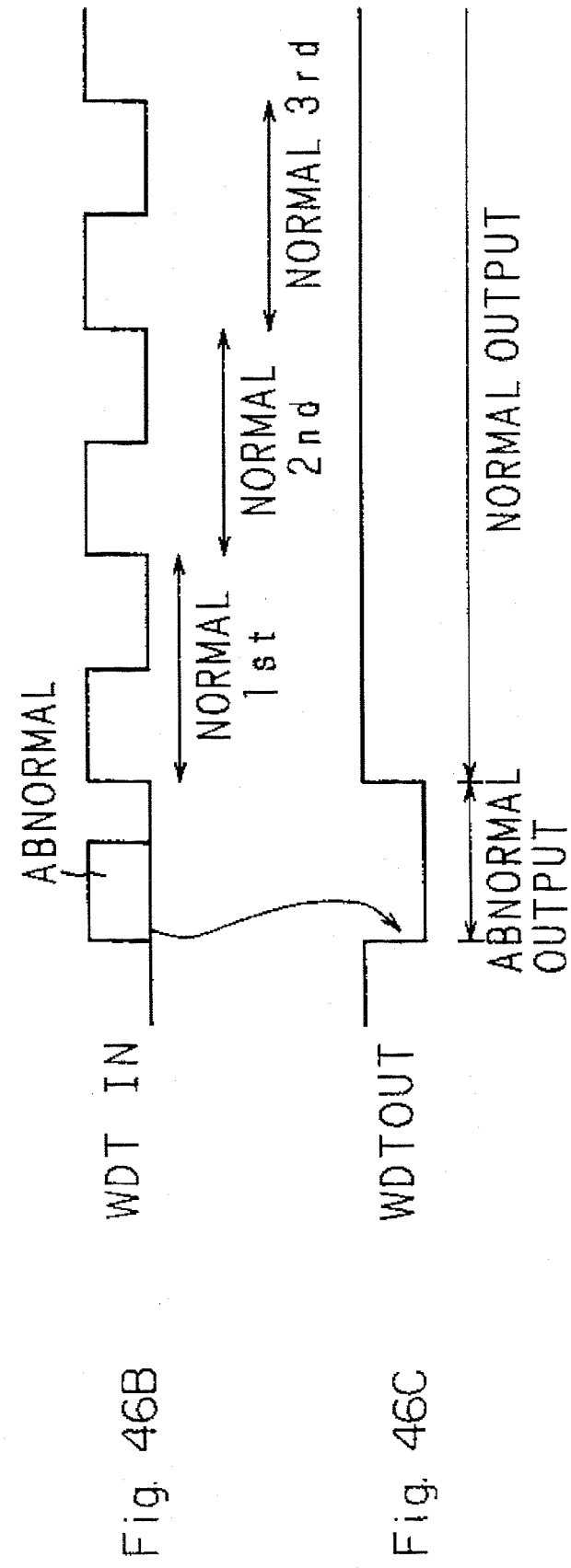
FIGS. 46(a)–46(c) are a timing chart showing the operating conditions in the case where "11" is set in each bit of a normal output confirmation frequency register of the watch dog timer according to the 13th embodiment of the invention.

FIG. 45 is a timing chart showing the operating condition with "10" set in the bits Nb1, Nb0 of the normal output confirmation frequency register 100.

In the example shown in FIG. 45, the second flip-flop 102 and the third flip-flop 103 are reset in the same manner as in the previous case when the output signal of the OR gate 72 turns to H level due to the occurrence of an abnormal condition. The output of the AND gate 111, however, keeps L level, and therefore the first flip-flop 101 is not reset. Accordingly, the D input terminal of the second flip-flop 102 is supplied with H level outputted from the output terminal Q of the first flip-flop 101 at that particular time point. Thus, the monitor output signal WDTOUT being an output signal from the output terminal Q of the third flip-flop 103 is returned to H level at the rising point of the next (second) monitor input signal WDTIN to H level.

FIG. 44 is a timing chart showing the operating conditions with "11" is set in the bits Nb1, Nb0 of the normal output confirmation frequency register 100.

In the example shown in FIG. 44, in the case where the output signal of the OR gate 72 turns to H level from the beginning due to the occurrence of an abnormality, the third flip-flop 103 is reset as in the previous case. Since both outputs of the AND gates 111 and 112 keep L level, however, the first flip-flop 101 and the second flip-flop 102 both are not reset. As a result, the D input terminal of the third flip-flop 103 is supplied with H level from the output terminal Q of the second flip-flop 102 from that particular time point. Therefore, the monitor output signal WDTOUT constituting an output signal from the output terminal Q of the third flip-flop 103 is returned to H level at the immediately succeeding (first) rising point to H level of the monitor input signal WDTIN.

[Embodiment 14]

Although the signal waveform for the watch dog timer is monitored according to the sixth to 13th embodiments described above, it is alternatively possible to monitor the timing and execution speed of two program tasks without mutual interference, when two different instructions are independently executed by two programming tasks, by monitoring the execution process of the two instructions, for example.

Figure 47:
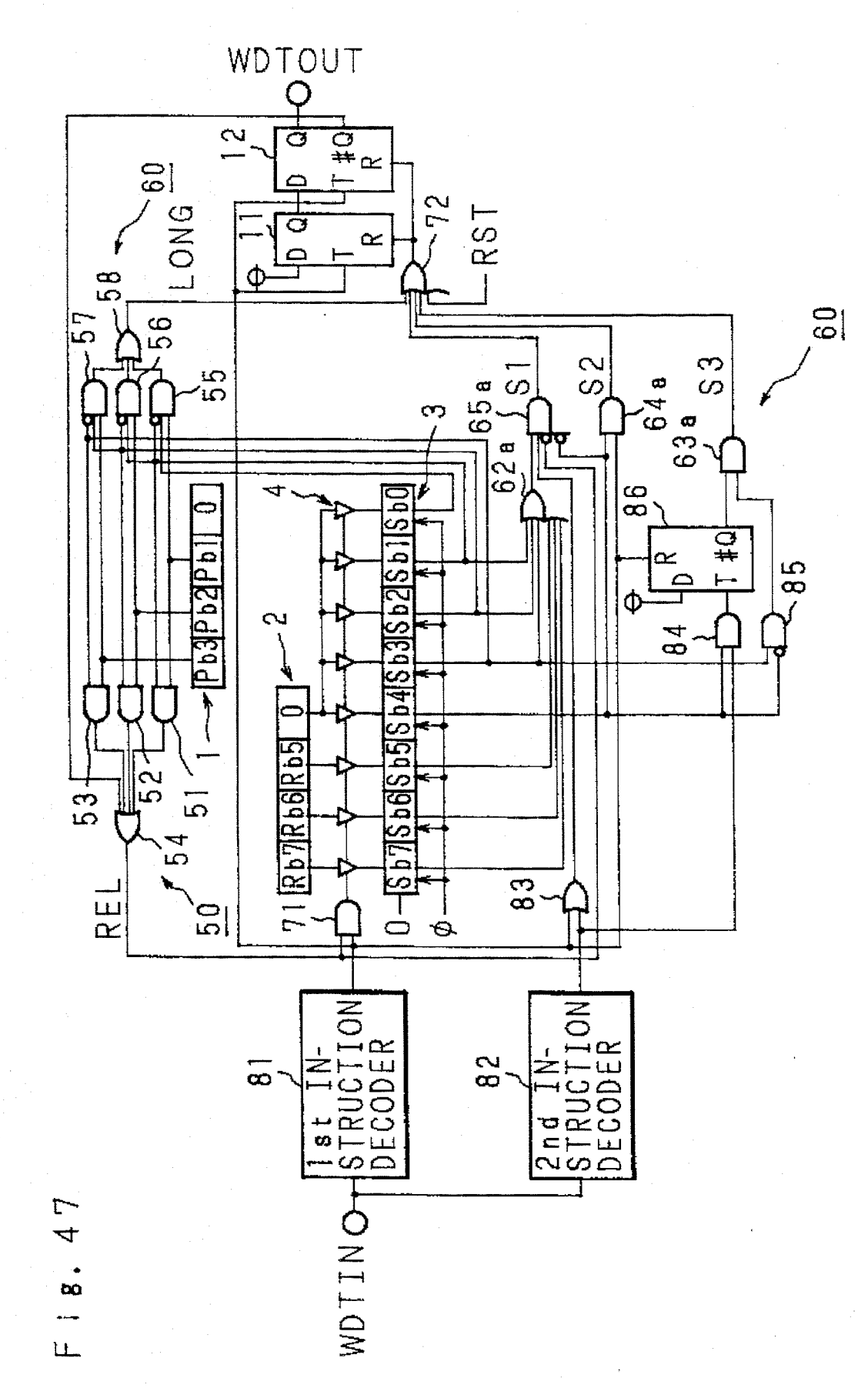

The circuit diagram of FIG. 47 represents an example of circuit configuration according to the 14th embodiment for monitoring the execution condition of two instructions.

The circuit shown in FIG. 47 is basically identical with the configuration of the sixth embodiment shown in FIG. 15. Therefore, the components identical with or equivalent to those in the circuit diagram of FIG. 15 are designated by the same reference numerals as those of the corresponding components in FIG. 115, and only different components are explained below.

The circuit shown in FIG. 47, from which the OR gate 61 in the circuit shown in FIG. 15 is deleted, comprises a first instruction decoder 81 in place of the rising edge detecting circuit 10, a 6-input OR gate 62a in place of the OR gate 62, a two-input AND gate 63a in place of the AND gate 63, a two-input AND gate 64a in place of the AND gate 64a, and a four-input AND gate 65a in place of the AND gate 65. Further, a second instruction decoder 82, an OR gate 83, AND gates 84, 85 and a D flip-flop 86, though not included in the circuit of FIG. 15, comprise the circuit diagram of FIG. 47.

The first instruction decoder 81 is connected at the same position as the rising edge detecting circuit in the circuit diagram shown in FIG. 15. When the first instruction IN1 is executed, the first instruction decoder 81 decodes the code thereof and outputs an H level pulse signal. The output of the first instruction decoder 81, like the output of the rising edge detecting circuit 10 shown in FIG. 15, is inputted to the AND gate 71 and the T input terminals of the flip-flops 11, 12. In addition, the output of the first instruction decoder 81 is connected to one input of the OR gate 83, one input of the AND gate 64a and the reset terminal R of the flip-flop 86.

The second instruction decoder 82 is connected in such a manner that the signal to be monitored is inputted at the same time as the first instruction decoder 81. When the second instruction IN2 is executed, this second instruction decoder 82 decodes the particular code and outputs an H level pulse signal. The output of the second instruction decoder 82 is coupled to the other input of the OR gate 83 and one input of the AND gate 84.

The OR gate 62a is supplied with six bits including Sb7 to Sb5 and Sb3 to Sb1 other than bits Sb4 and Sb0 of the shift register 3, and the output of the OR gate 62a is coupled to the first input of the AND gate 65a.

The second input of the AND gate 65a is connected with the output of the OR gate 83 described above. The third input in negative logic of the AND gate 65a is coupled to the reload permit signal REL being an output signal of the OR gate 54, and the fourth input thereof in negative logic is connected with the bit Sb4 of the shift register 3. The output of the AND gate 65a is coupled to the OR gate 72 as an abnormality detecting signal S1.

One of the input signals to the AND gate 64a is connected with bit Sb4 of the shift register 3, and the other input with the output of the first instruction decoder 81 as described above. The output of the AND gate 64a is coupled to the OR gate 72 as an abnormality detecting signal S2.

One input to the AND gate 63a is connected with the inverted output terminal #Q of the flip-flop 86, and the other input thereto with the output of the AND gate 85. The output of the AND gate 63a is connected with the OR gate 72 as an abnormality detecting signal S3.

The flip-flop 86 has a D input terminal thereof connected with a power potential ("1"), the T input terminal thereof with the output of the AND gate 84, and the reset terminal R thereof with the output of the first instruction decoder 81, as described above.

One input to the AND gate 84 is supplied with the bit Sb4 of the shift register 3, and the other input thereto with the output of the second instruction decoder 82 as described above. Also, one input to the AND gate 85 is connected with bit Pb3 of the shift register 3, and the other negative logic input with bit Sb4.

FIG. 48 is a schematic diagram showing which monitoring condition is selected for the circuit shown in FIG. 47 in the case where "1" is held in bits Sb7 to Sb0 of the shift register 3. In addition, FIG. 48 also shows corresponding bits of the pattern register 1 and the reload register 2. The basic operation of the circuit shown in FIG. 47 with primary emphasis placed on the components different from those shown in FIG. 15 will be explained as to the case where "1" is set in each bit of the shift register 3 shown in FIG. 48.

Upon execution of the first instruction IN1, an H level pulse signal is outputted from the first instruction decoder 81, and as in the configuration shown in FIG. 15 described above, the set content of the reload register 2 is reloaded into the shift register 3 while at the same time triggering the first flip-flop 11 or the second flip-flop 12 is triggered. Also, the flip-flop 86 is reset and an H level signal is outputted from the inverted output terminal #Q thereof.

Under this condition, as long as any one of the bits Sb7 to Sb5 or Sb3 to Sb1 of the shift register 3 is "1" and bit Sb4 is "0", the output of the OR gate 62a, i.e., the first input to the AND gate 65a rises to H level and the fourth input falls to L level. Upon further execution of the first instruction IN1 or the second instruction IN2 with the reload permit signal REL at L level under this condition, the output of the OR gate 83, i.e., the second input to the AND gate 65a becomes H level, so that the abnormality detecting signal S1 being an output thereof also rises to H level. As a result, the two flip-flops 11, 12 are reset.

The situation in which the two flip-flops 11, 12 are reset are when the second instruction IN2 is improperly executed or when the first instruction IN1 is improperly executed while the first instruction IN1 is being executed or the first instruction IN1 is improperly executed or when the second instruction IN2 is improperly executed again while the second instruction IN2 is being executed. In such a case, the monitor output signal WDTOUT making up an output signal from the output terminal Q of the second flip-flop 12 falls to L level.

When only the bit Sb4 of the shift register 3 becomes "1", the particular bit is given to the negative logic fourth input of the AND gate 65a. Even when the first instruction IN1 or second instruction IN2 is executed, therefore, the abnormality detecting signal S1 being an output signal from the AND gate 65a never becomes H level. As long as the bit Sb4 of the shift register 3 remains "1", however, the particular signal is given to one input of the AND gate 64a. Upon execution of the first instruction IN1 under this condition, an H level pulse signal is outputted from the first instruction decoder 81 and given to the other input of the AND gate 64a. As a result, the abnormality detecting signal S2 being an output signal thereof also rises to H level, thereby resetting the flip-flops 11, 12.

The situation in which the flip-flops 11, 12 are reset are when the first instruction IN1 is executed while the bit Sb4 of the shift register 3 remains "1", i.e., when the first instruction IN1 is improperly executed again in spite of the fact that it has already been executed. Also, in such a case, the monitor output signal WDTOUT being an output signal from the output terminal Q of the second flip-flop 12 falls to L level.

In the case where the second instruction IN2 is executed while the bit Sb4 of the shift register 3 remains "1" as mentioned above, on the other hand, the two inputs to the AND gate 84 become H level, and therefore the output thereof also rises to H level, thereby the flip-flop 86 is triggered. As a consequence, the output signal from the inverted output terminal #Q of the flip-flop 86 turns to L level. When the bit Sb4 of the shift register 3 turns to "0" and the Sb3 to "1" by the next shift clock φ from this state, the two inputs to the AND gate 85 rise to H level, with the output thereof becoming H level, and the two inputs to the AND gate 63a rise to H level and the abnormality detecting signal S3 being an output signal thereof also rises to H level. As a result, the flip-flops 11, 12 are reset.

The situation in which the two flip-flops 11, 12 are reset are associated with the case in which the execution of the second instruction IN2 is detected at the time point when the bit Sb3 of the shift register 3 becomes "1" while the bits Sb4 of the shift register 3 remains "1". In such a case, the monitor output signal WDTOUT making up an output signal from the output terminal Q of the second flip-flop 12 falls to L level.

As long as the bit Sb4 of the shift register 3 is "1", execution of only the second instruction IN2 is permitted. In the case where the first instruction IN1 is improperly executed in the process, the monitoring result thereof is indicated immediately with the output signal of the second flip-flop 12 turning to L level. At the same time, whether the second instruction IN2 has been executed or not is monitored, and the result thereof is indicated by the fact that the monitor output signal WDTOUT being an output signal from the second flip-flop 12 turns to L level at the time point when the bit Sb3 of the shift register 3 becomes "1".

Assume that in the case where one of the bits Sb3 to Sb1 of the shift register 3 is "1", any one of the bits Pb3 to Pb0 of the pattern register 1 corresponding to the bit holding the particular "1" state becomes "1". The output of one of the AND gates 51 to 53 supplied with the two bits rises to H level, and the reload permit signal REL being an output signal of the OR gate 54 also becomes H level. This reload permit signal REL is also inputted to the negative logic third input of the AND gate 65a, and therefore the output thereof never rises to H level, thereby permitting the execution of the first instruction IN1. Since the reload permit signal REL is also inputted to the AND gate 71, execution of the first instruction IN1 under this condition raises the output of the AND gate 71 to H level thereby to reload from the reload register 2 into the shift register 3.

In the case where "1" is set in the bits Sb2 to Sb0 of the shift register 3, as long as "1" is set only on the LSB side of corresponding bits Pb3 to Pb1 of the pattern register 1, an abnormal condition is detected including a long-cycle fault, i.e., non-execution of neither the first instruction IN1 nor the second instruction IN2 over a predetermined length of time.

By the way, as shown in FIG. 15, according to the sixth embodiment, the reload permitting means 50 is composed of AND gates 51, 52, 53, an OR gate 54, the monitoring pattern changing means 60 of AND gates 55, 56, 57, OR gates 58, 62a, AND gates 63a, 64a, 65a, 84, 85 and a flip-flop 86.

Figure 50:
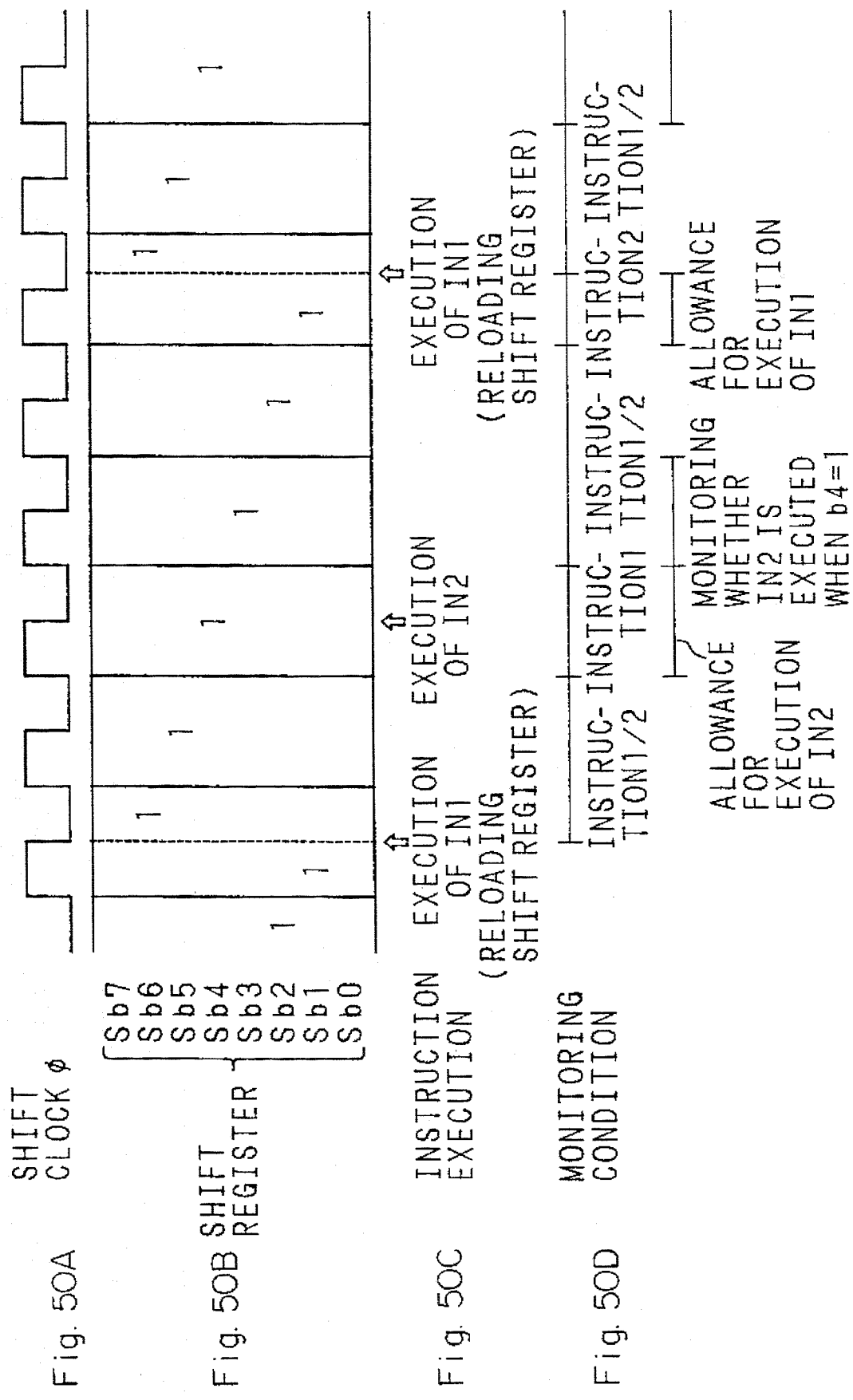
FIGS. 50(a)–50(d) are a timing chart showing the operating conditions of the watch dog timer according to the 14th embodiment of the invention.

Next, explanation will be made with reference to the timing chart of FIG. 50 on the operation in which a "0010" (2H) is set in the bits Pb3, Pb2, Pb1, Pb0 of the pattern register 1 and a "0100" (4H) in the bits Rb7, Rb6, Rb5, Rb4 of the reload register 2, as shown in the schematic diagram of FIG. 49, as an example of actual operation of the circuit of the watch dog timer according to a 14th embodiment of the invention shown in FIG. 47. In FIG. 50, the shift clock φ inputted to the shift register 3, the values of the bits Sb7 to Sb0 of the shift register 3, the execution timing of instructions to be monitored and the type of monitoring period selected are shown in that order from top to bottom.

Under the normal condition where the monitor output signal WDTOUT being an output signal from the output terminal Q of the second flip-flop 12 is "1", the H level output from the inverted output terminal #Q of the second flip-flop 12 is outputted as a reload permit signal REL through the OR gate 54. Upon execution of first instruction IN1, therefore, the contents of the reload register 2 are reloaded into the shift register 3, so that "1" is set only in the bit Sb6 of the shift register 3. As a result, the instruction ½ monitoring period is selected.

During this instruction ½ monitoring period, the negative logic fourth input of the AND gate 65a is supplied with "0" set in the bit Sb4 of the shift register 3, and therefore the fault detecting signal S1 being an output signal thereof falls to L level. The AND gate 64a is similarly supplied with "0" from bit Sb4 of the shift register 3, so that the fault detecting signal S2 making up an output signal thereof falls to L level. One of the inputs to the AND gate 63a is supplied with an H level output of the inverted output terminal #Q of the flip-flop 86 reset. Since the other input thereof is supplied with the output of the AND gate 85 falling to L level by the "0" state set in the bit Sb3 of the shift register 3, however, the fault detecting signal being an output signal thereof falls to L level. As "0" has been set in all of the bits Sb3 to Sb0 of the shift register 3, the long-cycle monitor signal LONG being an output signal of the OR gate 58 falls to L level. As a consequence, the output of the OR gate 72 becomes L level, and the monitor output signal WDTOUT being an output signal from the output terminal Q of the second flip-flop 12 keeps H level because the flip-flops 11, 12 are not reset.

The input of the next clock φ to the shift register 3 turns "1" only the bit Sb5 of the shift register 3. While bit Sb6 or Sb5 remains "1", the instruction ½ monitoring period is involved as described above. Upon improper execution of the second instruction IN2 or upon detection of a fault condition with the first instruction IN1 improperly re-executed, the flip-flops 11, 12 are reset, and the monitor output signal WDTOUT turns to L Level, thereby announcing the occurrence of an abnormal condition.

The next shift clock φ turns only the bit Sb4 of the shift register 3 to "1". Under this condition, the first instruction monitoring mode is selected. During this first instruction monitoring period, the flip-flops 11, 12 are reset and the monitor output signal WDTOUT is turned to L level, only when the first instruction IN1 is re-executed improperly. During the first instruction monitoring period when only the bit Sb4 of the shift register 3 is "1", the flip-flops 11, 12 are not reset by the execution of the second instruction IN2, and the execution thereof is permitted. In the case where the second instruction IN2 is executed, the two inputs to the AND gate 84 rise to "1" state, and therefore the flip-flop 86 is triggered, so that the output signal from the inverted output terminal #Q becomes L level. When the second instruction IN2 is not executed, by contrast, the output signal from the inverted output terminal #Q of the flip-flop 86 keeps H level.

The next shift clock φ raises only the bit Sb3 of the shift register 8 to "1". Under this condition, the instruction ½ monitoring mode is selected. During this instruction ½ monitoring period, one of the inputs to the AND gate 85 is supplied with "1" held in the bit Sb3 of the shift register 3 and the other negative logic input is supplied with "0" held in the bit Sb4, and therefore the output thereof becomes "1". Thus, unless the second instruction IN2 was executed while the only the bit Sb4 of the shift register 3 remains "1", the two inputs to the AND gate 63a assume "1", and therefore the fault detecting signal S3 being an output signal thereof becomes H level. As a result, the flip-flops 11, 12 are reset, so that the monitor output signal WDTOUT becomes L level, thereby announcing that the second instruction IN2 has failed to be executed.

As far as the second instruction IN2 is executed during the period when only the bit Sb4 of the shift register 3 remains "1", the output signal from the inverted output terminal #Q of the flip-flop 86 is at L level, and therefore the fault detecting signal S3 being an output signal of the AND gate 63a keeps L level, so that the monitor output signal WDTOUT also keeps H level.

While only the bit Sb3 of the shift register 3 remains "1" and only the bit Sb2 thereof is "1", on the other hand, execution of the first instruction IN1 or second instruction IN2 raises the output of the OR gate 83 to H level. The fault detecting signal S1 being an output signal of the AND gate 65a also rises to H level. As a result, the flip-flops 11, 12 are reset. This turns the monitor output signal WDTOUT to L level, thereby announcing that the first instruction IN1 or the second instruction IN2 has been improperly executed.

When only the bit Sb1 of the shift register 3 becomes "1", the second instruction monitoring mode is selected. During this second instruction monitoring period, the bit Pb3 of the pattern register 1 is also "1", so that the two inputs to the AND gate 51 become "1", thereby raising the output thereof to H level. Consequently, the reload permit signal REL making up an output of the OR gate 54 becomes H level and therefore the first instruction IN1 is executed.

Assume that the second instruction IN2 is executed while only the bit Sb1 of the shift register 3 remains "1", i.e., that the second instruction IN2 is executed until the shift register 3 is reloaded. The output of the AND gate 56a becomes H level, and the two flip-flops 11, 12 are reset. The result is that the monitor output signal WDTOUT becomes L level, thus announcing that the execution of the second instruction IN2 was improper.

[Embodiment 15]

Figure 51:
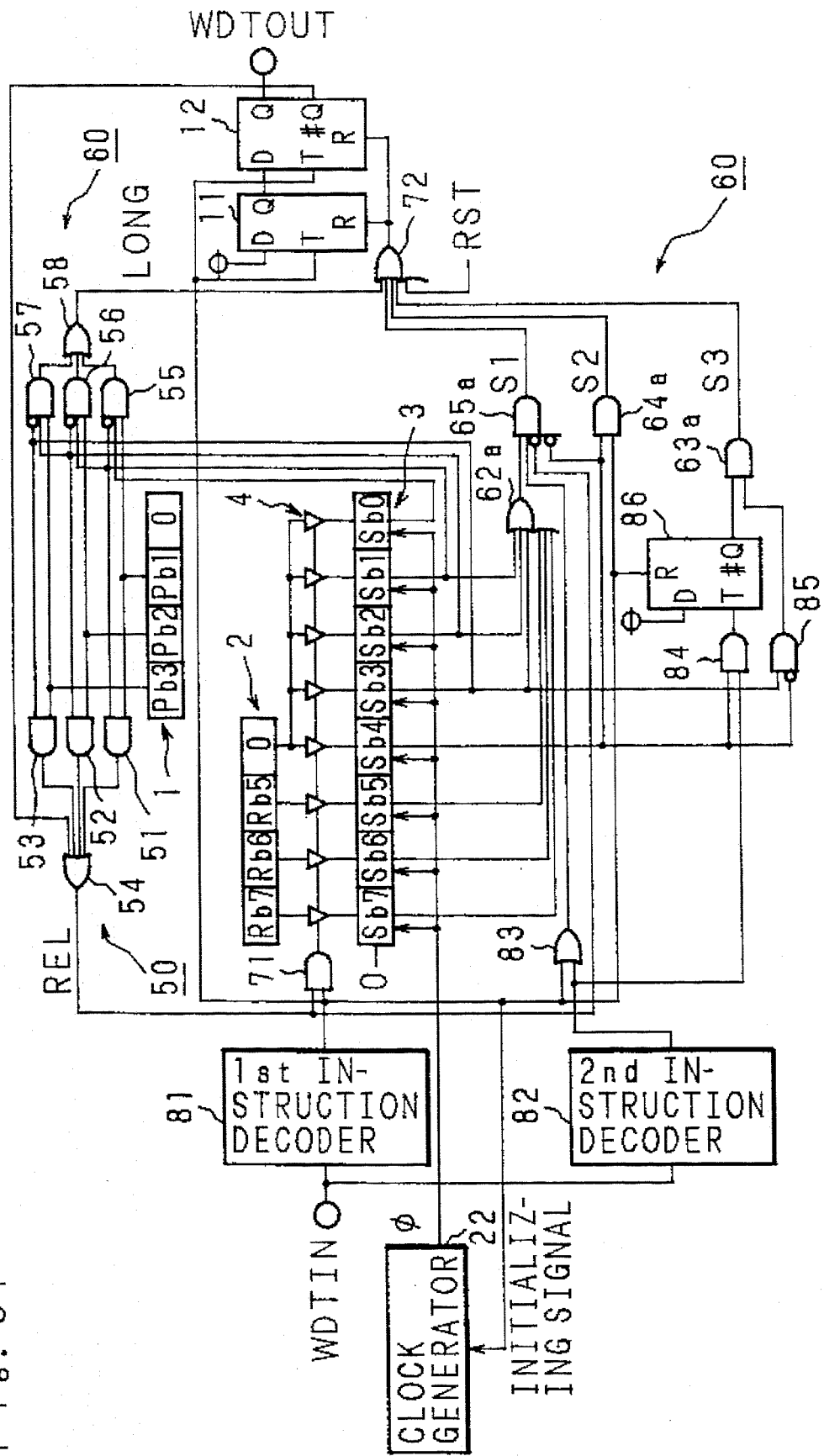
FIG. 51 is a circuit diagram showing a configuration example of the watch dog timer according to a 15th embodiment of the invention.

FIG. 51 is a circuit diagram showing a configuration example of the watch dog timer according to a 15th embodiment of the invention. This circuit is equivalent to the circuit according to the 14th embodiment shown in FIG. 47, and like the 7th embodiment shown in FIG. 30, is so constructed as to reset the clock generator 22 at the time point when the H level pulse signal is outputted from the rising edge detecting circuit 10, i.e., the first instruction IN1 is executed and decoded by a first instruction decoder 81, thereby synchronizing the reloading from the reload register 2 into the shift register 30 with the shift clock φ.

[Embodiment 16]

Figure 52:
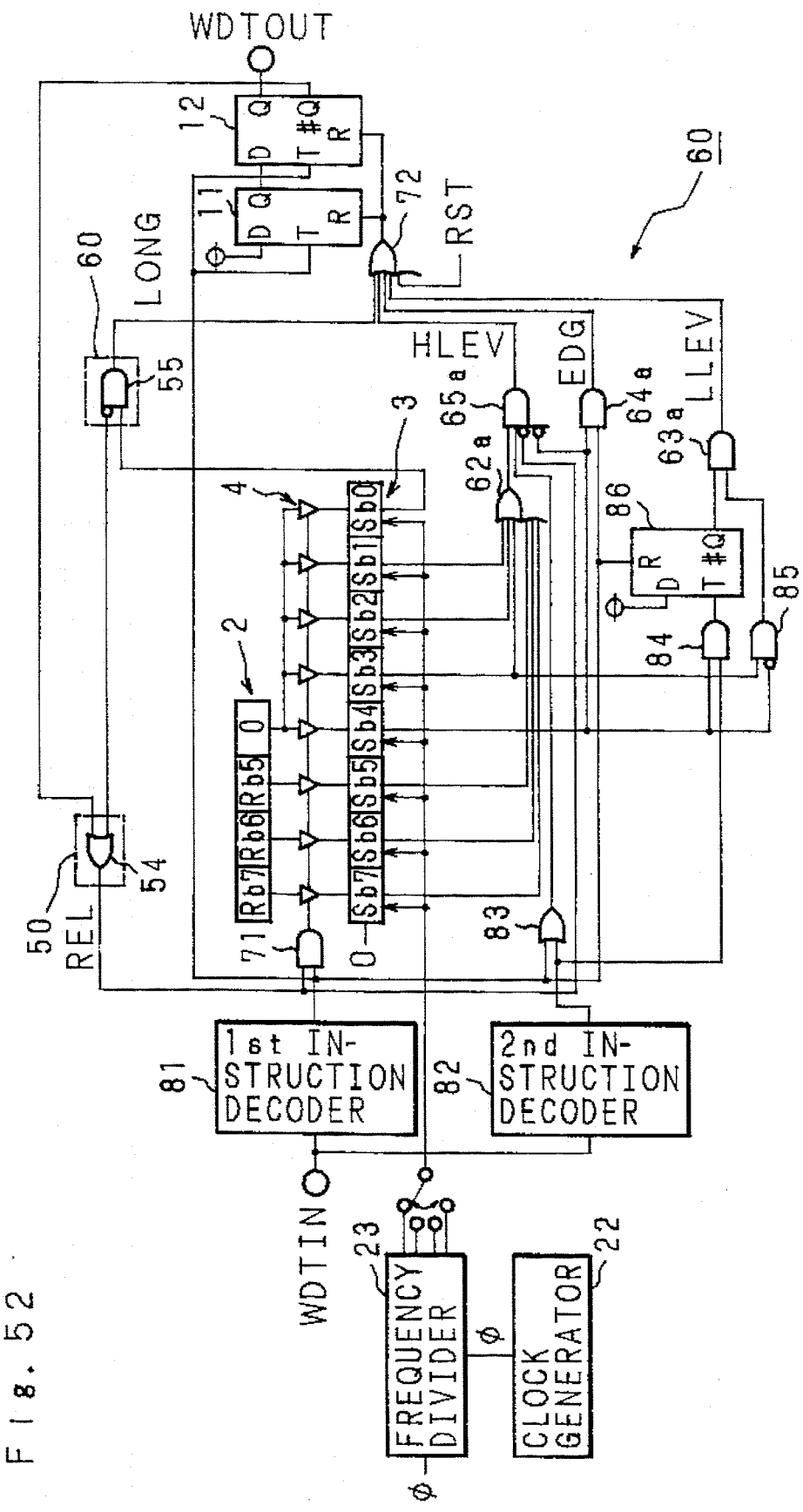
FIG. 52 is a circuit diagram showing a configuration example of the watch dog timer according to a 16th embodiment of the invention.

FIG. 52 is a circuit diagram showing a configuration example of the watch dog timer according to a 16th embodiment of the invention. The circuit according to the 14th embodiment shown in FIG. 47, like the 8th embodiment shown in FIG. 32, is constructed to include a frequency dividing circuit 23 of the shift clock φ. By employing the configuration as shown in FIG. 52, like the 8th embodiment shown in FIG. 32, the pattern register 1 and the circuit components associated therewith can be deleted without damaging the basic functions.

According to the 16th embodiment of the invention, as shown in FIG. 52, the reload permitting means 50 includes an OR gate 54, and the monitoring pattern changing means 60 is configured of an AND gate 55, an OR gate 62a, AND gates 63a, 64a, 65a, 84, 85 and a flip-flop 86.

[Embodiment 17]

Figure 53:
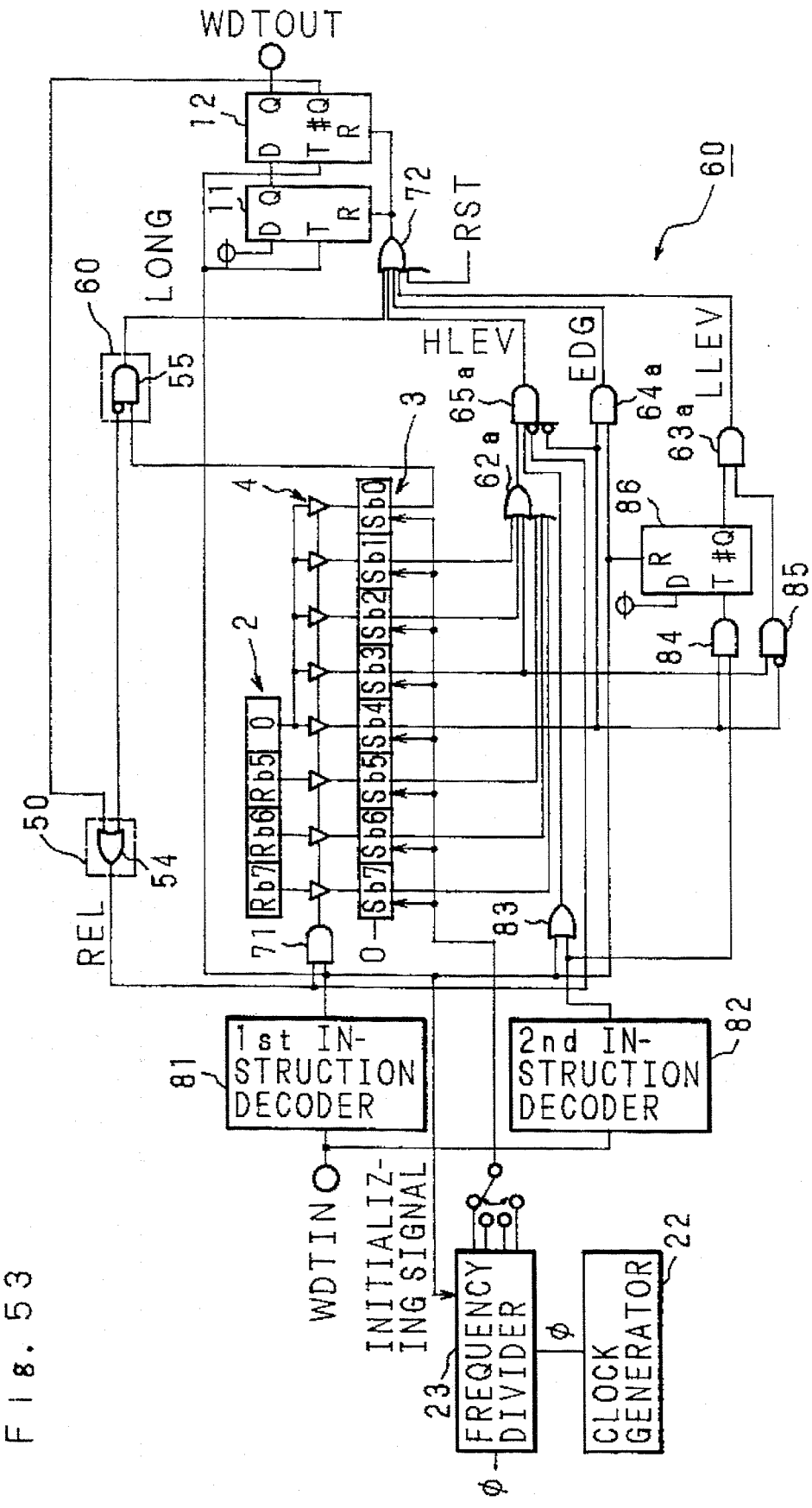
FIG. 53 is a circuit diagram showing a configuration example of the watch dog timer according to a 17th embodiment of the invention.

FIG. 53 is a circuit diagram showing a configuration example of the 17th embodiment in which, like the 8th embodiment shown in FIG. 32, the frequency divider 23 is supplied with an H level signal of the rising edge detecting circuit 10 in order to initialize the shift clock φ.

The configuration of the watch dog timer according to the 17th embodiment of the invention shown in FIG. 53 makes possible more accurate monitoring in synchronous with the clock φ even when the instruction execution is an object of monitoring.

[Embodiment 18]

Figure 54:
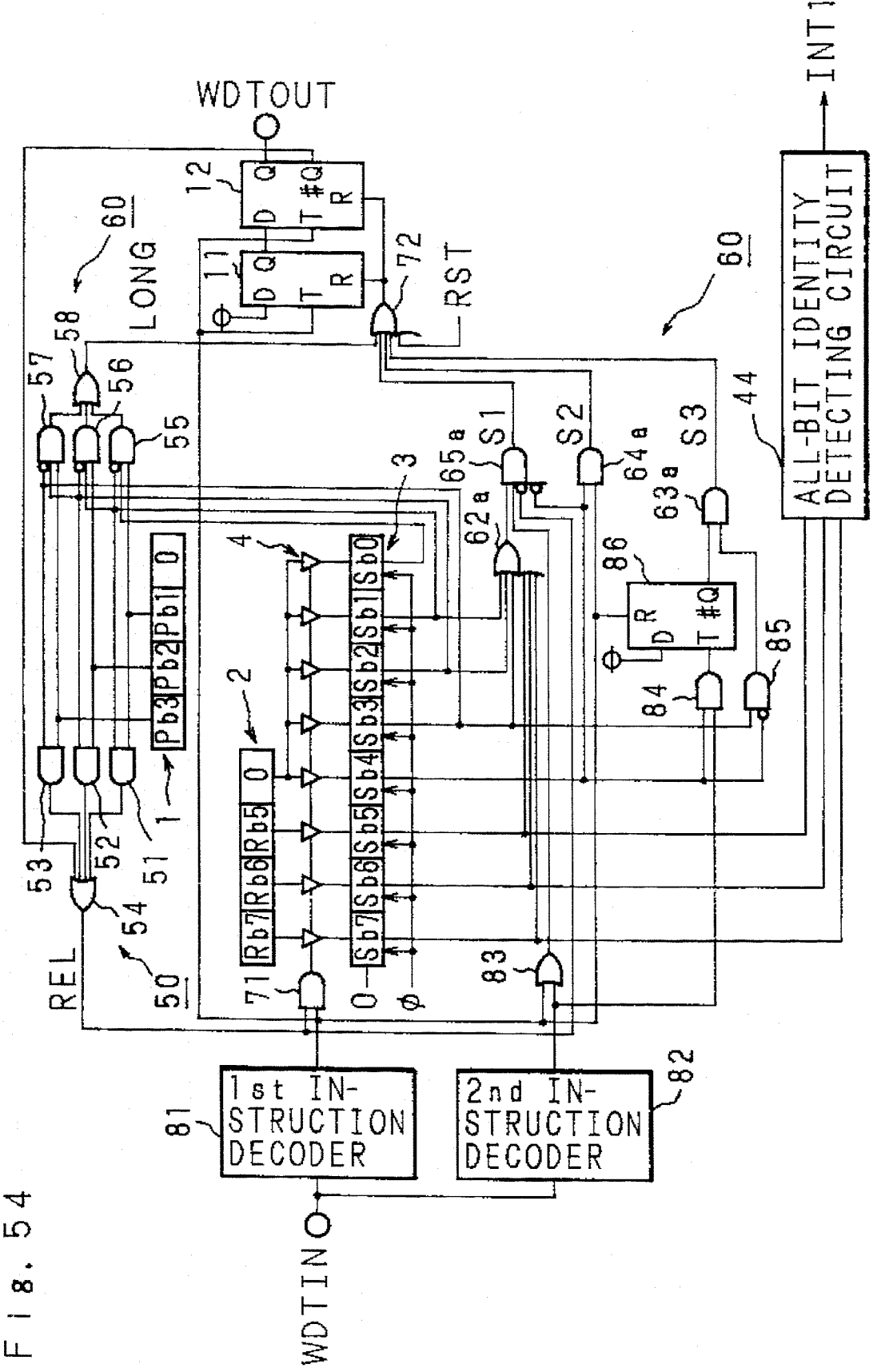
FIG. 54 is a circuit diagram showing a configuration example of the watch dog timer according to an 18th embodiment of the invention.

FIG. 54 is a circuit diagram showing a configuration of the watch dog timer according to an 18th embodiment of the invention.

Similarly to the seventh embodiment shown in FIG. 15, the 14th embodiment shown in FIG. 47 operates in accordance with whatever data is reloaded from the reload register 2 into the shift register 3, i.e., in spite of any erroneous data that may be reloaded. A normal monitoring operation is impossible, however, in the case where all of the bits of the data reloaded into the shift register 3 from the reload register 2 are active ("1") or nonactive ("0").

In view of this situation, the 18th embodiment shown in FIG. 54, like the 10th embodiment shown in FIG. 36, has added thereto a function of generating an interrupt signal upon detecting any possible case where all of the bits of the data reloaded into the shift register 3 from the reload register 2 are active or nonactive, that is, an all-bit identity detecting circuit 44.

Specifically, as shown in FIG. 54, the all-bit identity detecting circuit 44 is connected with bits Sb7, Sb6, Sb5 of the shift register 3. In addition, the configuration of the all-bit identity detecting circuit 44 is constructed in the same way as the circuit diagram shown in FIG. 37, and the configuration of the other components and the operation are also similar to those of the 14th embodiment shown in FIG. 47. These configurations and operations are therefore will not be described again.

As described above, in a configuration example of the watch dog timer according to the 18th embodiment of the invention, in the case where "1" or "0" is written in all of the bits Sb7, Sb6, Sb5 of the shift register 3 from the reload register 2, an H level signal (all-bit identical data fault interrupt signal) INT1 is outputted from an exclusive NOR gate 441 of the all-bit identity detecting circuit 44. As a result, in the event that an H level signal is outputted from the exclusive NOR gate 441, appropriate action is taken such as by writing data again into the reload register 2.

Figure 55:
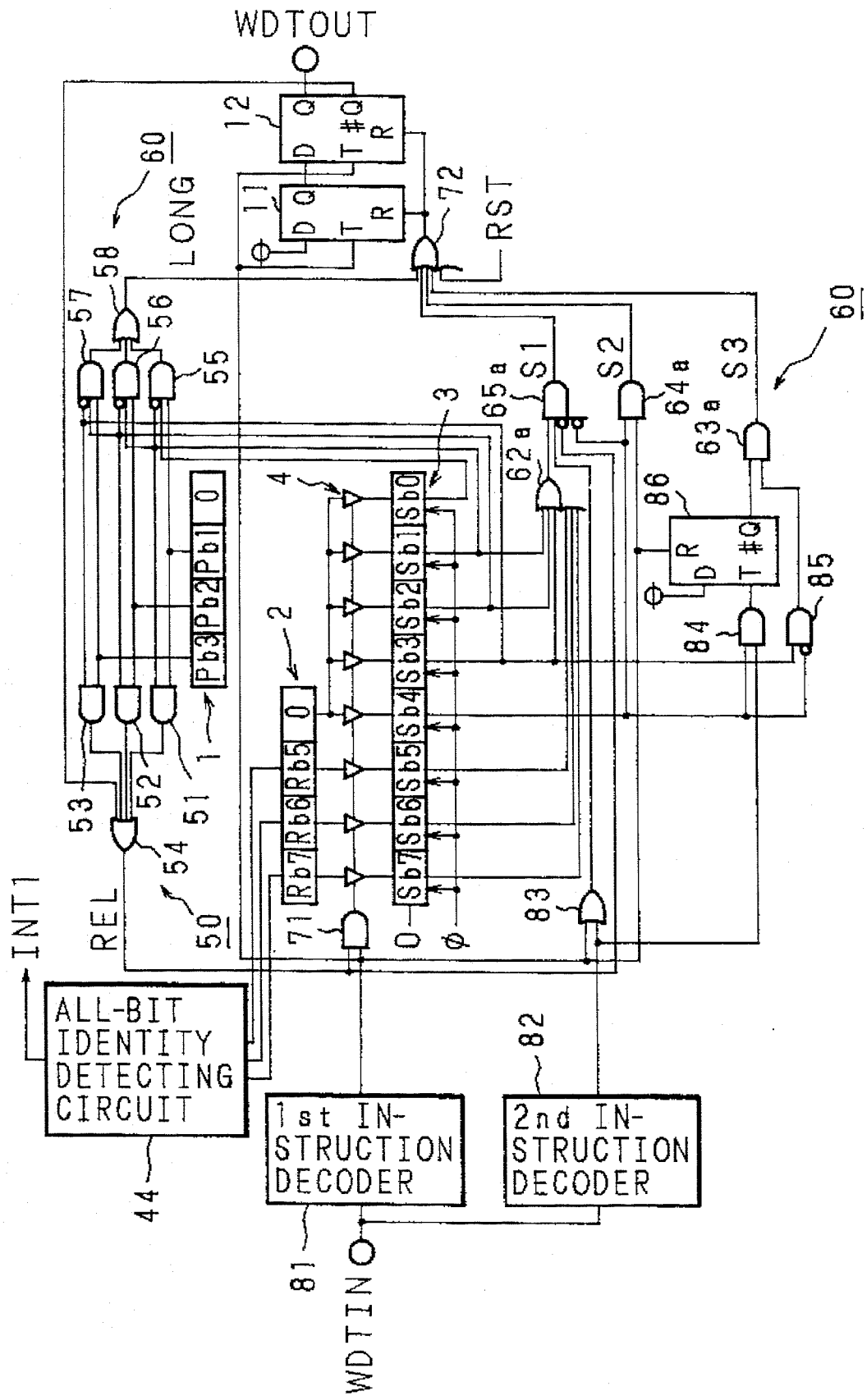
FIG. 55 is a circuit diagram showing another configuration example of the watch dog timer according to the 18th embodiment of the invention.

FIG. 55 is a circuit diagram showing still another configuration example according to the 18th embodiment. In this example, the all-bit identity detecting circuit 44 is connected with the bits Rb7, Rb6, Rb5 of the reload register 2.

In the further configuration example of the watch dog timer according to the 18th embodiment of the invention shown in FIG. 55, in the case where "1" or "0" is written in all of the bits Rb7, Rb6, Rb5 of the reload register 2 as data to be reloaded into the shift register 3 from the reload register 2, an H level interrupt signal (all-bit identical data fault interrupt signal) INT1 is outputted from the exclusive OR gate 441 of the all-bit identity detecting circuit, 44.

As described above, in the watch dog timer according to the 18th embodiment of the invention, the all-bit identity detecting circuit 44 constructed in the same way as the circuit shown in FIG. 37 according to the tenth embodiment is connected in the manner shown in FIG. 54 or FIG. 55, whereby it is possible to detect any case where all of the bits of the data reloaded from the reload register 2 into the shift register 3 become "1" or "0".

[Embodiment 19]

Figure 56:
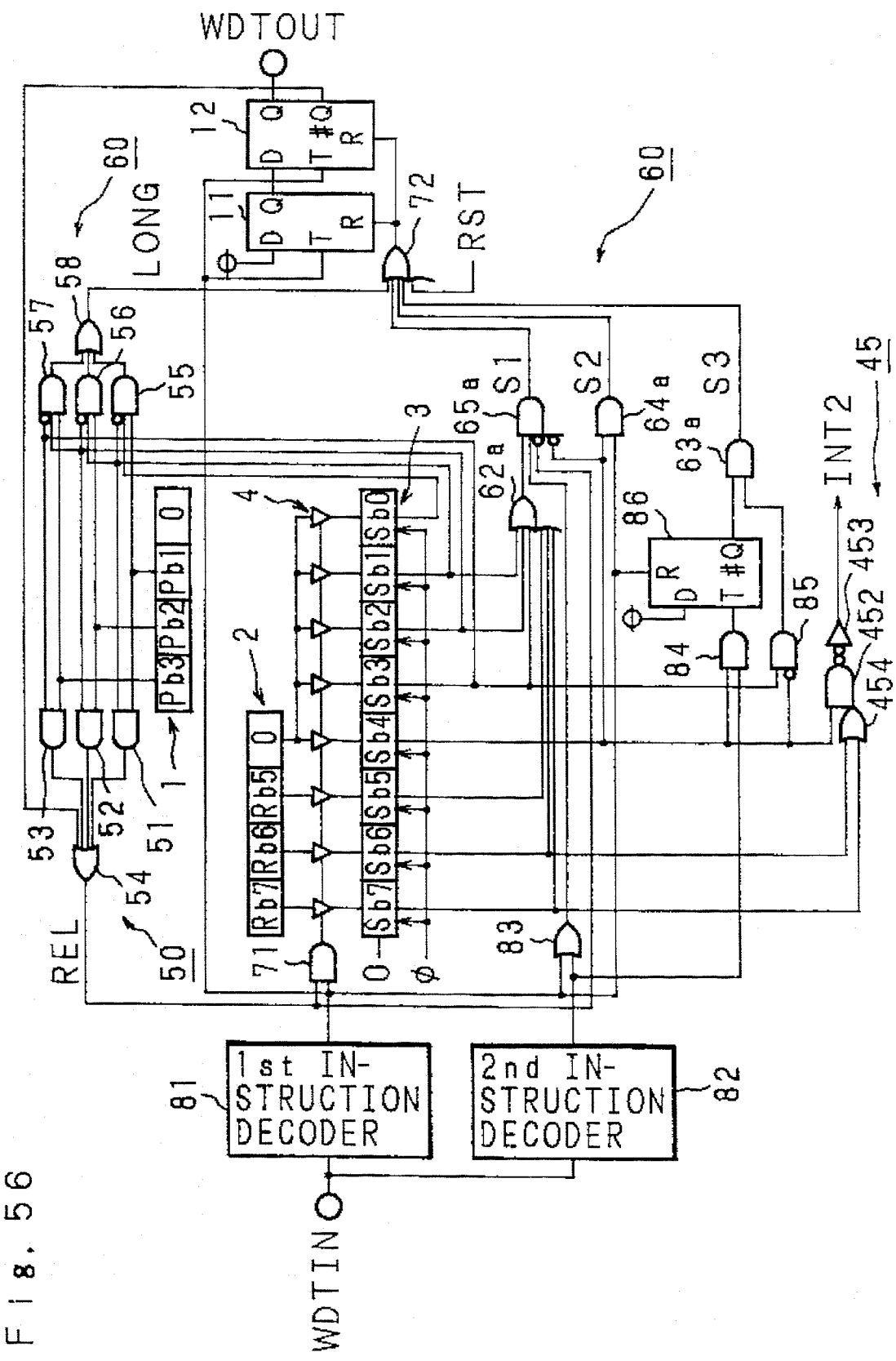
FIG. 56 is a circuit diagram showing a configuration example of the watch dog timer according to a 19th embodiment of the invention.

FIG. 56 is a circuit diagram showing a configuration example of the watch dog timer according to a 19th embodiment of the invention.

With the watch dog timer according to the 19th embodiment of the invention, like the 11th embodiment described above, whether the bit Sb7 and/or Sb6 is "1" is detected and an interrupt signal is generated in the case where "1" is written in the bit. Sb4 of the shift register 3. This is intended to detect the fact, if any, that the bit Sb4 of the shift register 3 remains "1" for an abnormally long length of time although the read or other operation may be permitted during such a period.

The configuration according to the 19th embodiment of the invention shown in FIG. 56 is equivalent to the configuration according to the 14th embodiment shown in FIG. 47, except that an active data fault detecting circuit designated by reference numeral 45 is added thereto. This active data fault detecting circuit 45 has the same configuration as in the 11th embodiment shown in FIG. 39, and includes an OR gate 454 supplied with bits Sb7, Sb6 of the shift register 3, a NAND gate 452 with the input thereof connected with the output of the OR gate 454 and the bit Sb4 of the shift register 3 and an inverter 453 for outputted an inverted output of the NAND gate 452.

According to the 19th embodiment constructed as described above, like the 11th embodiment described above, in the case where "1" is written also in the bits Sb7 or Sb6 in spite of the fact that "1" is written in the bit Sb4 of the shift register 3, the output of the OR gate 454 of the active data fault detecting circuit 45 becomes "1". Therefore, the output of the inverter 453, i.e., the output (active data fault interrupt signal) INT2 of the active data fault detecting circuit 45 becomes H level since the two inputs of the NAND gate 452 become "1" and the output thereof becomes "0".

In this way, in the watch dog timer according to the 19th embodiment of the invention, in the event that "1" state is held in the bits Sb7, Sb6 with "1" stored also in the bit Sb4 of the shift register 3, i.e., in the event that such data as to set two or more reloadable periods during one period of monitoring operation is written into the shift register 3, such faults can be detected.

[Embodiment 20]

Next, a configuration example of the watch dog timer according to the 20th embodiment of the invention will be described with reference to the circuit diagram of FIG. 57.

The watch dog timer according to the 20th embodiment of the invention is equivalent to the above-described 14th embodiment shown in FIG. 47 and comprises a function of detecting such a fault that active data, i.e., "1" is not reloaded at all from the reload register 2 into the shift register 3.

Figure 57:
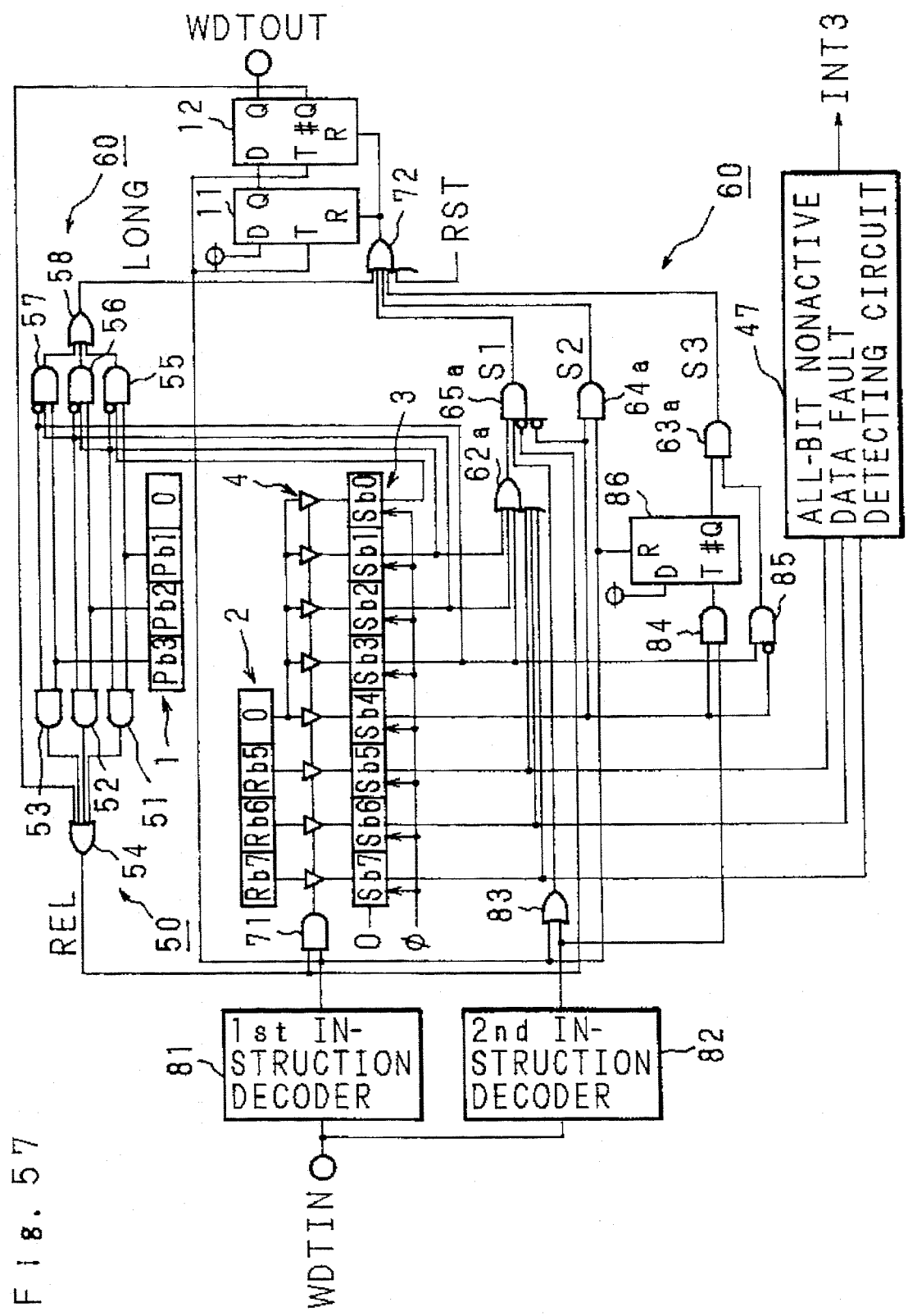
FIG. 57 is a circuit diagram showing a configuration example of the watch dog timer according to a 20th embodiment of the invention.

More specifically, the circuit, shown in FIG. 57 is equivalent to the circuit of FIG. 47 having added thereto an all-bit nonactive data fault detecting circuit designated by reference numeral 47. This all-bit nonactive data fault detecting circuit 47 is connected with the most significant side three bits Sb7 to Sb5 of the shift register 3. As an example, the all-bit nonactive data fault detecting circuit 47 includes an AND gate 472 with all inputs in negative logic as shown in the circuit diagram of FIG. 58.

In the watch dog timer according to the 20th embodiment of the invention as shown in FIG. 57, in the case where "0" is reloaded in all the most significant side three bits Sb7 to Sb5 of the shift register 3 from the reload register 2, an H level signal (all-bit nonactive data fault interrupt signal) INT3 is outputted from the AND gate 472 of the all-bit nonactive data fault detecting circuit 47. The other operations are similar to those of the 14th embodiment shown in FIG. 47.

Figure 58:
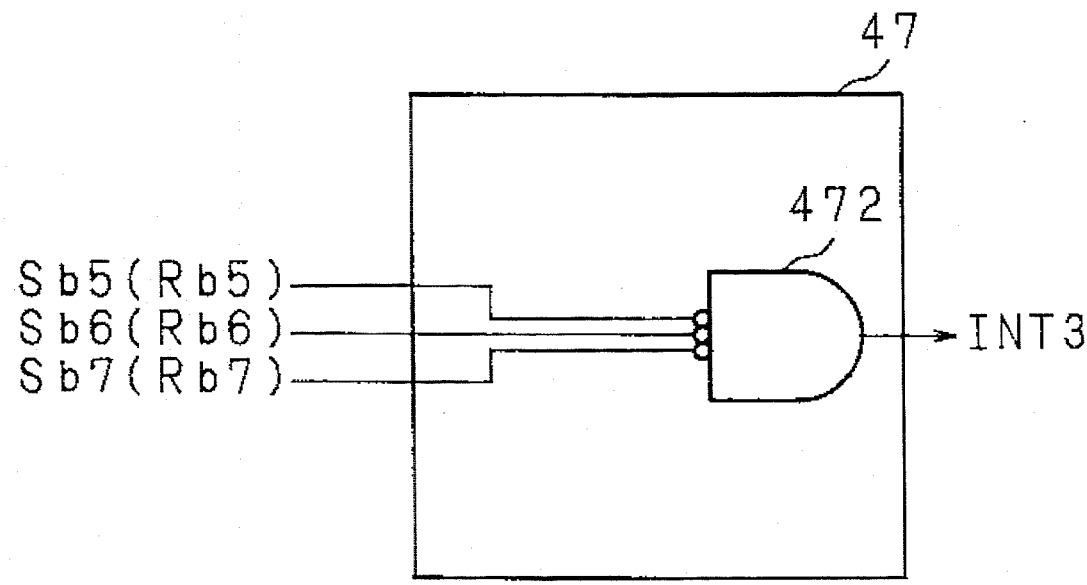
FIG. 58 is a circuit diagram showing a specific configuration example of all-bit nonactive data fault detecting circuit of the watch dog timer according to the 20th embodiment of the invention.

As a consequence, in the case where an H level signal is outputted from the all-bit nonactive data fault detecting circuit 47, an appropriate action is taken such as by writing data again into the reload register 2.

in addition, in FIG. 57 and FIG. 58, the values of the most significant side three bits Sb7 to Sb5 of the shift register 3 are adapted to be checked by the all-bit nonactive data fault detecting circuit 47. As shown in FIG. 40 and FIG. 41 showing the 12th embodiment described above, however, all of the bits Sb7 to Sb0 of the shift register 3 are alternatively checked by the all-bit nonactive data fault detecting circuit 47.

Figure 59:
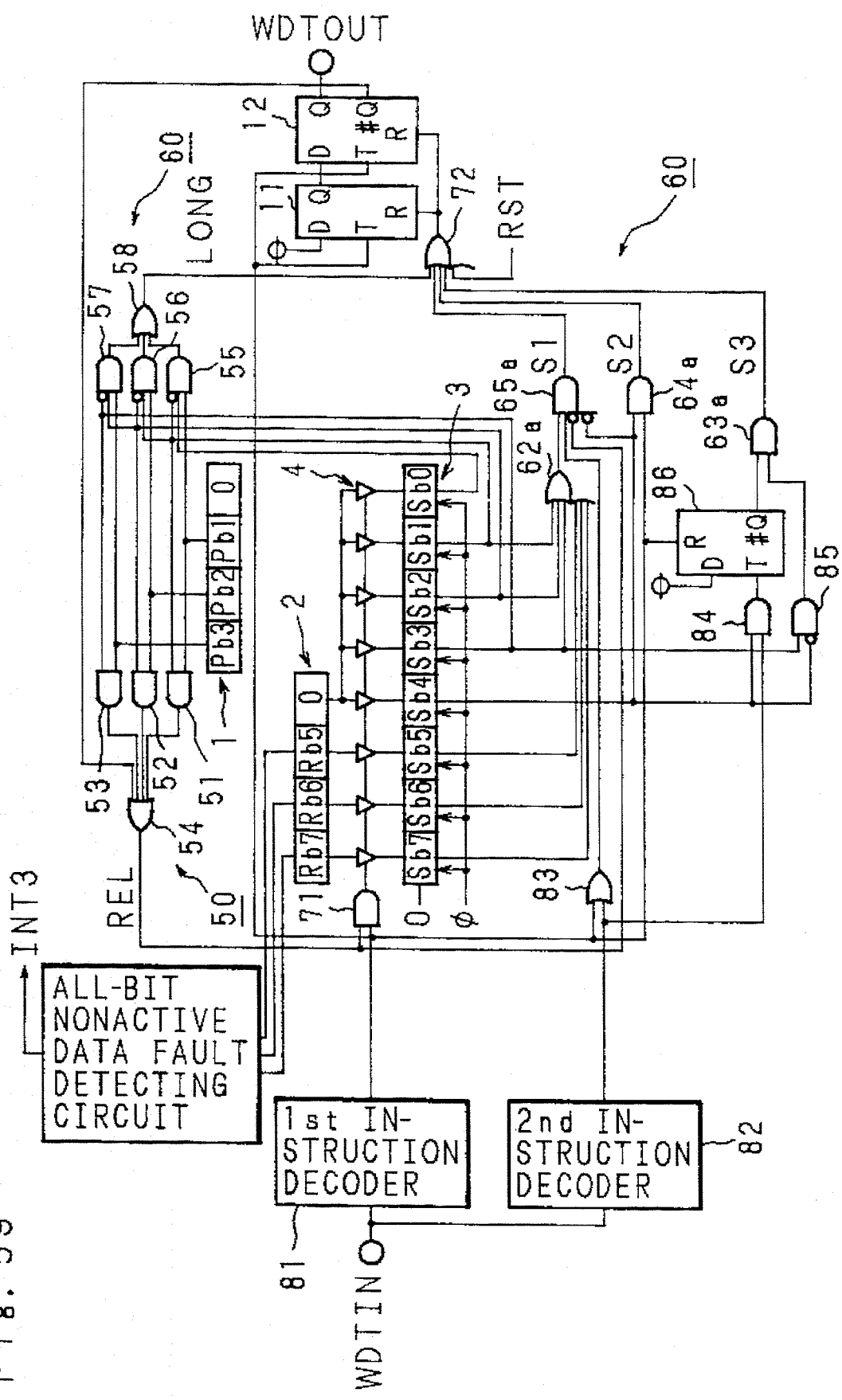
FIG. 59 is a circuit diagram showing another configuration example of the watch dog timer according to the 20th embodiment of the invention.

FIG. 59 is a circuit diagram showing a still further configuration example of the 20th embodiment. In this example, the above-described all-bit nonactive data fault detecting circuit 47 is connected with the most significant side three bits Rb7 to Rb5 of the reload register 2.

In this further configuration example of the watch dog timer according to the 20th embodiment of the invention shown in FIG. 59, in the case where "0" is written in all of the bits Rb7 to Rb5 of the reload register 2 as data to be reloaded into the shift register 3 (with bit Rb4 fixed to "0" under normal conditions), a "1" signal (all-bit nonactive data fault interrupt signal) INT3 is outputted from the AND gate 472 of the all-bit nonactive data fault detecting circuit 47.

In addition, in FIG. 59, the values of the most significant side three bits Rb7 to Rb5 of the reload register 2 are checked by the all-bit nonactive data fault detecting circuit 47. A value is to check all of the bits Rb7 to Rb4 of the reload register 2 by the all-bit nonactive data fault detecting circuit 47.

As described above, in the watch dog timer according to the 20th embodiment of the invention, the configuration shown in FIG. 57 or FIG. 59 makes it possible to detect "0" which may be written in all of the bits of data to be reloaded into the shift register 3 from the reload register 2.

[Embodiment 21]

Figure 60:
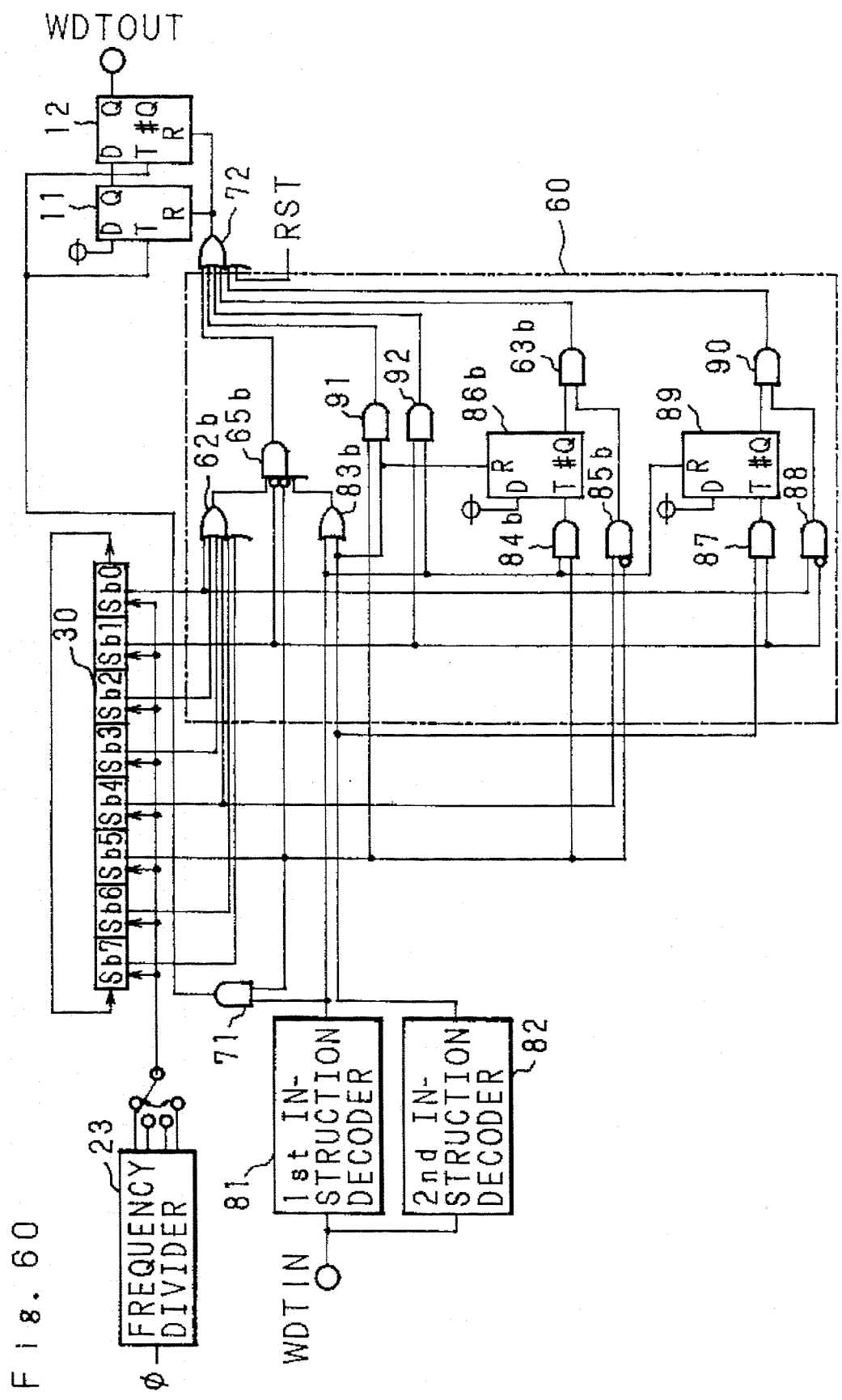
FIG. 60 is a circuit diagram showing a configuration example of the watch dog timer according to a 21st embodiment of the invention.

FIG. 60 is a circuit diagram showing a configuration of the 21th embodiment constructed in such a way that a rotary type shift register 30 is used in place of the shift register 3 of each embodiment described above and the period of the shift clock φ of the shift register 30 is changed by a frequency divider 23. The employment of the configuration shown in FIG. 60 makes it possible to delete the pattern register 1 and the reload register 2 and the circuit components attached thereto.

According to the 21st embodiment of the invention, the output of the first instruction decoder 81 is given to one of the inputs of the AND gate 71, one of the inputs of the OR gate 83b, one of the inputs of the AND gate 92, one of the inputs of the AND gate 84b and the reset terminal R of the D flip-flop 89.

The other input of the AND gate 71 is supplied with the value of bit Sb5 of the shift register 30, and the output thereof is given to the T-input terminal of the flip-flops 11, 12.

The other input of the OR gate 83b is supplied with the output of the second instruction decoder 82, and the output thereof is given to the fourth input of the AND gate 65b.

The other input of the AND gate 92 is supplied with the value of bit Sb1 of the shift register 30, and the output thereof is given to the input of the OR gate 72.

The other input of the AND gate 84b is supplied with the value of bit Sb5 of the shift register 30, and the output thereof is given to the T-input terminal of the D flip-flop 86b. The reset terminal R of the flip-flop 86b is supplied with the output of the second instruction decoder 82, and the inverted output terminal #Q thereof is connected to one of the inputs of the AND gate 63b. Also, the D-input terminal of the flip-flop 86b is connected with power potential ("1"). In addition, the other input of the AND gate 63b is connected with the output of the AND gate 85b. One of the inputs of the AND gate 85b is connected with bit Sb4 of the shift register 30, and the other input in negative logic is coupled with bit Sb5 of the shift register 30.

The inverted output terminal #Q of the flip-flop 89 is coupled to one of the inputs to the AND gate 90, and a T-input terminal thereof is connected with the output of the AND gate 87. The two input terminals of this AND gate 87 are connected with the output of the second instruction decoder 82 and the bit Sb1 of the shift register 30. Also, the output of the NAND gate 90 is coupled to the OR gate 72, and the other input thereof is connected with the output of the AND gate 88. One of the input terminals of the AND gate 88 is connected with bit Sb0 of the shift register 30, and the other input in negative logic thereof is connected with the bit Sb1 of the shift register 30.

The OR gate 62b has six inputs, which are connected with bits Sb7, Sb6, Sb4, Sb3, Sb2, Sb0, respectively, except Sb5 and Sb1 of the shift register 30. In addition, the output of the OR gate 72 is connected to the reset terminal R of the flip-flops 11, 12 as in each embodiment described above.

As a result, the bits Sb7 and Sb6 of the shift register 30 are connected only to the OR gate 62b, the bit Sb5 to the AND gate 91, the AND gate 84b and the AND gate 85b, the bit Sb4 to the OR gate 62b and the AND gate 85b, the bits Sb3 and Sb2 only to the OR gate 62b, the bit Sb1 to the AND gate 65b, the AND gate 92, the AND gate 87 and the AND gate 88, and the bit Sb0 to the OR gate 62b and the AND gate 88.

Figure 61:
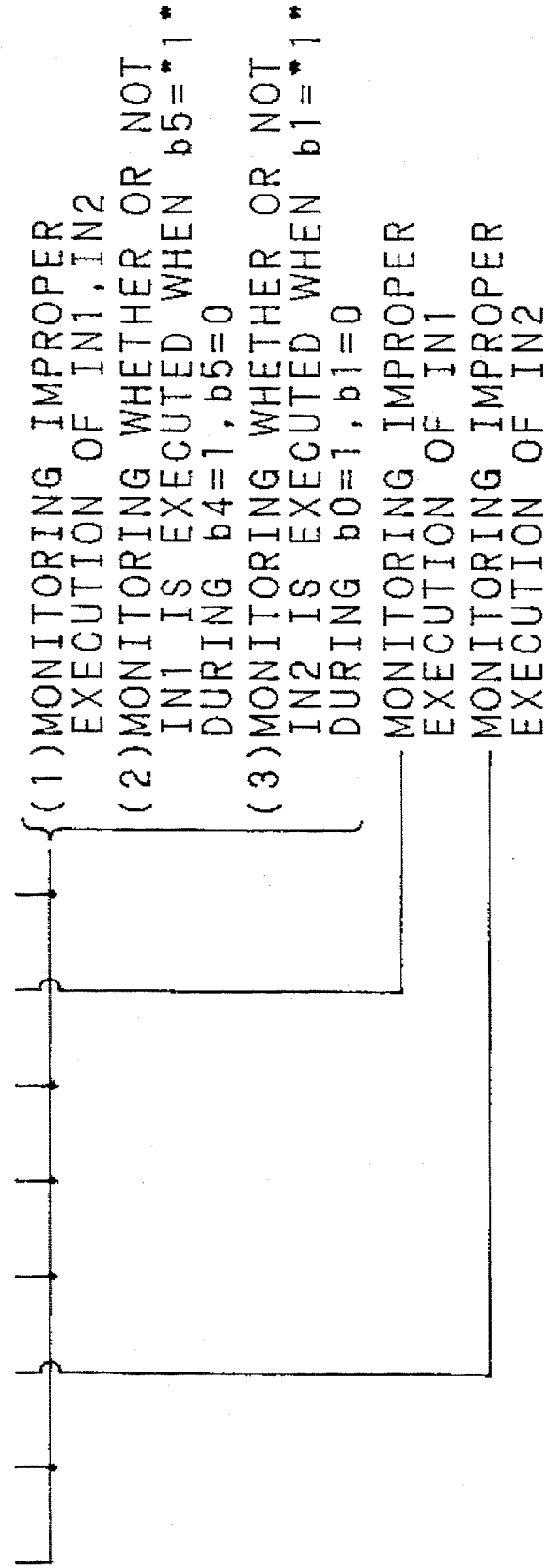
FIG. 61 is a schematic diagram showing the monitoring operation to be performed depending on the value held by each bit of the shift register of the watch dog timer according to the 21st embodiment of the invention.

FIG. 61 is a schematic diagram showing the monitoring condition which is selected in the case where "1" is held in each of bits Sb7 to Sb0 of the shift register 3 in the circuit according to the 21st embodiment shown in FIG. 60. The basic operation of the circuit shown in FIG. 60 will be described below mainly as to the components thereof different from FIG. 15 in each of the cases where "1" is set in the bits of the shift register 3 shown in FIG. 61.

Execution of the first instruction IN1 or second instruction IN2 is permitted in the case where bit Sb5 or Sb1 alone of the shift register 30 is "1". In other words, as long as the bit Sb5 or Sb1 alone of the shift register 30 is "1", they are not connected with the OR gate 62b. Even when the two instructions are executed and the output of the OR gate 83b becomes H level, the output of the AND gate 65b is not raised to H level. Assume that the first instruction IN1 is executed with bit Sb5 alone at "1" of the shift register 30. The H level pulse signal is output ted from the first instruction decoder 81, thereby the first flip-flop 11 or the second flip-flop 12 is triggered. Also, the flip-flop 89 is reset and an H level signal is output ted from the inverted output terminal #Q.

Upon execution of the second instruction IN2 in the case where the bit Sb5 or Sb1 alone of the shift register 30 is "1", the flip-flop 86b is reset. Under this condition, while one of the bits Sb7, Sb6, Sb4 to Sb2 and Sb0 of the shift register 3 is "1" and both bits Sb5 and Sb1 are "0", the output of the OR gate 62b, i.e., the first input of the AND gate 65b rises to H level, with the negative logic second and third inputs thereof falling to L level. As a result, execution of the first instruction IN1 or second instruction IN2 raises the output of the OR gate 83b, i.e., the fourth input of the AND gate 65b to H level, so that the output thereof also rises to H level. As a result, the flip-flops 11, 12 are reset.

The situation in which the two flip-flops 11, 12 are reset is the case where the second instruction IN2 is improperly executed with the first instruction IN1 under execution or the first instruction IN1 is improperly executed for the second time, or in the case where the first instruction IN1 is improperly executed while the second instruction IN2 is being executed or the second instruction IN2 is improperly executed for the second time. In this case, the monitor output signal WDTOUT being an output signal from the output terminal Q of the second flip-flop 12 falls to L level.

When only the bit Sb5 of the shift register 3 becomes "1", the same bit is given to one of the inputs of the AND gate 91. Upon execution of the second instruction IN2 under this condition with an H level signal given to the other input of the AND gate 91, the output of the AND gate 91 becomes H level, thereby resetting the two flip-flops 11, 12. As a result, the monitor output signal WDTOUT from the output terminal Q of the second flip-flop 12 turns to L level. The situation in which the monitor output signal WDTOUT turns to L level is the case where the second instruction IN2 is executed while the bit Sb5 of the shift register 3 remains "1", i.e., where the second instruction IN2 is improperly executed while the first instruction IN1 is under execution.

During the period when the bit Sb5 of the shift register 3 is "1", however, the same bit is also given to one of the inputs of the AND gate 84b and one of the inputs in negative logic of the AND gate 85b. Upon execution of the first instruction IN1 under this condition, an H level pulse signal is outputted from the first instruction decoder 81, and is given to the other input of the AND gate 84b, thereby the output thereof is raised to H level and the flip-flop 26b is triggered.

Next, when only the bit Sb4 becomes "1" with the shift register 30 shifted, the two inputs to the AND gate 85b become "1", and therefore the output thereof rises to H level, thereby the output of the AND gate 63b is also raised to H level. By doing so, the two flip-flops 11, 12 are reset and the monitor output signal WDTOUT turns to L level.

As long as the bit Sb5 of the shift register 30 remains "1", therefore, improper execution of the second instruction IN2 causes the particular monitoring result to be announced immediately with the output signal of the second flip-flop 12 turning to L level. At the same time, whether the first instruction IN1 has been executed or not is monitored, and the result of monitoring is notified by the fact that the monitor output signal WDTOUT being an output signal from the second flip-flop 12 turns to L level when the bit Sb4 of the shift register 30 rises to "1" level.

While the bit Sb1 of the shift register 3 described above remains "1", the particular bit is given to one of the inputs of the AND gate 87 and one of the inputs in negative logic of the AND gate 88. In the event that the second instruction IN2 is executed under this condition, an H level pulse signal is outputted from the second instruction decoder 82, and this signal is given to the other input of the AND gate 87. Thus the output thereof also rises to H level, thereby the flip-flop 89 is triggered.

Next, suppose that the bit Sb0 alone becomes "1" with the shift register 30 appropriately shifted. The two inputs of the AND gate 88 become "1", and therefore the output thereof rises to H level with the output of the AND gate 90 also rising to H level. As a result, the two flip-flops 11, 12 are reset, and the monitor output, signal WDTOUT turns to L level. Thus, while the bit Sb1 of the shift register 30 remains "1", improper execution of the first instruction IN1 causes the monitoring result thereof to be notified immediately as the monitor output signal WDTOUT being an output signal of the second flip-flop 12 turns to L level. At the same time, whether the second instruction IN2 has been executed or not is monitored. The result of this monitoring is notified by the fact that the monitor output signal WDTOUT being an output signal from the flip-flop 12 turns to L level when the bit Sb0 of the shift register 30 becomes "1".

In the case where one of bits Sb3 to Sb1 of the shift register 3 is "1", assume that any one of the bits Pb3 to Pb0 of the pattern register 1 corresponding to the particular "1" bit rises to "1". The output of one of the AND gates 81 to 83 supplied with the two inputs rises to H level, and so does the reload permit signal REL being an output signal of the OR gate 54. This reload permit signal REL is given to the negative logic third input of the AND gate 65a, and therefore the output thereof never rises to H level, thus execution of first instruction IN1 is permitted. Since the reload permit signal REL is also given to the AND gate 71, execution of firs instruction IN1 under this condition raises the output of the AND gate 71 to H level, thereby reload from the reload register 2 into the shift register 3 is performed.

In the case where "1" is set in the bits Sb2 to Sb0 of the shift register 3, assume that "1" is set only on the LSB side of bits Pb3 to Pb1 of the pattern register 1 corresponding to the particular "1" bit. A long-cycle fault, i.e., the condition in which neither first instruction IN1 nor second instruction IN2 is executed is detected. The associated operation is similar to that for the configuration according to the sixth embodiment shown in FIG. 15, and therefore will not described.

In addition, according to the 21st embodiment, as shown in FIG. 60, the monitoring pattern changing means 60 includes OR gates 62a, 83b, AND gates 63b, 65b, 84b, 85b, 87, 88, 90, 91, 92 and flip-flops 86b, 89.

Next, the operation in which a "10000000", i.e., "80H" is set in the bits Sb7 to Sb0 of the shift register 30 will be explained as an example of actual operation of the 21st embodiment shown in FIG. 60 with reference to the timing chart of FIG. 62. By the way, in FIG. 62, the shift clock φ inputted to the shift register 30, the values of bits Sb7 to Sb0 of the shift register 30, the execution timing of the instructions to be monitored, and the type of monitoring conditions selected, are shown in that order from top down.

In the initial state where "1" is set only in the bit Sb7 of the shift register 30, the instruction ½ monitoring condition is selected. During this instruction ½ monitoring period, the negative logic second and third input terminals of the AND gate 65b are supplied with "0" set in the bits Sb1, Sb5 of the shift register 30, and therefore the output thereof falls to L level. The AND gate 91 is supplied with "0" from bit Sb5 of the shift register 30, and therefore the output thereof assumes L level. The AND gate 92 is inputted with "0" from bit Sb1 of the shift register 92, so that the output thereof becomes L level. One of the inputs to the AND gate 63b is supplied with the L level output of the AND gate 85b which in turn is inputted with the bit Sb4 of the shift register 30, and therefore the output thereof becomes L level. One of the inputs to the AND gate 90 is supplied with the L level output of the AND gate 88 which in turn is input ted with bit Sb0 of the shift register 30, and therefore the output thereof becomes L level.

As a result, the output of the OR gate 72 becomes L level, so that the two flip-flops 11, 12 fail to be reset. The monitor output signal WDTOUT being an output signal from the output terminal Q of the second flip-flop 12 thus keeps H level.

With the next shift clock φ given to the shift register 30, only the bit Sb6 of the shift register 30 becomes "1". While bit Sb7 or Sb6 remains "1", however, the instruction ½ monitoring period is continued. Upon improper execution of the first instruction IN1 or second instruction IN2, the two flip-flops 11, 12 are reset, and the monitor output signal WDTOUT turns to L level, thereby that the occurrence of a fault is announced.

The next shift clock φ turns only the bit Sb5 of the shift register 30 to "1". In this case, the second instruction monitoring condition is selected. During this second instruction monitoring period, the flip-flops 11, 12 are both reset only when the second instruction IN2 is improperly executed, thereby the monitor output signal WDTOUT is turned to L level.

In the process, during the period when only the bit Sb5 of the shift register 3 remains "1", the flip-flops 11, 12 are not reset even when the first instruction IN1 is executed, and therefore the execution is permitted. In the case where the first instruction IN1 is executed, the two inputs of the AND gate 84b become "1", so that the flip-flop 86b is triggered with an output signal outputted from the inverted output terminal #Q at L level. In the case where the second instruction IN2 is not executed, on the other hand, the output signal from the inverted output terminal #Q of the flip-flop 86b keeps H level.

The next shift clock φ raises to "1" only the bit Sb4 of the shift register 30, and in that case the instruction ½ monitoring mode is selected. During this instruction ½ monitoring period, one of the inputs to the AND gate 85b is supplied with "1" held by bit Sb4, and the other negative logic input with "0" held by bit Sb5, thus making the output thereof "1". As a result, when the first instruction IN1 is not executed while only the bit. Sb5 is "1", the two inputs of the AND gate 63b become "1", and therefore the output thereof assumes H level. As a result, the two flip-flops 11, 12 are reset, so that the monitor output signal WDTOUT falls to L level, thus the first instruction IN1 has failed Lo be executed is announced.

In the case where the first instruction IN1 is executed while only the bit Sb5 of the shift register 30 is "1", the output signal from the inverted output terminal #Q of the flip-flop 86b falls to L level, and therefore the output of the AND gate 63b keeps the L level, with the monitor output signal WDTOUT also keeping the L level.

As long as only the bits Sb4 to Sb2 of the shift register 30 remain "1" by the subsequent shift clock φ, the instruction ½ monitoring period continues. During this instruction ½ monitoring period, upon execution of first instruction IN1 or second instruction IN2, the output of the OR gate 83b becomes H level, and so does the output of the AND gate 65b, thus resetting the flip-flops 11, 12. As a consequence, the monitor output signal WDTOUT turns to L level, thereby notifying that the first instruction IN1 or second instruction IN2 has been improperly executed.

The bit Sb1 alone of the shift register 30 is turned to "1" by the next shift clock φ. In this case, the first instruction monitoring mode is selected. During this first instruction monitoring period, only when the first instruction IN1 is improperly executed, the two flip-flops 11, 12 are reset and the monitor output signal WDTOUT turns to L level.

At the same time, as long as only the bit Sb1 of the shift register 3 remains "1", the flip-flops 11, 12 are not reset even when the second instruction IN2 is executed, and the execution thereof is permitted. Once the second instruction IN2 is executed, the two inputs of the AND gate 87 become "1", and therefore the flip-flop 89 is triggered with the output signal from the inverted output terminal #Q thereof falling to L level. In the case where the second instruction IN2 fails to be executed, on the other hand, the output signal from the inverted output terminal #Q of the flip-flop 89 keeps H level.

The bit Sb0 alone of the shift register 30 becomes "1" due to the next shift clock φ, and in that case the instruction ½ monitoring mode is selected. During this instruction ½ monitoring period, one input to the AND gate 88 is supplied with "1" held in bit Sb0, and the other negative logic input with "0" held in bit Sb1. The output therefore assumes "1" state. As a result, in the event that the second instruction IN2 fails to be executed as long as the bit SB0 alone of the shift register 3 remains "1", the two inputs of the AND gate 90 assume "1", and therefore the output thereof rises to H level. The result is that the two flip-flops 11, 12 are reset, so that the monitor output signal WDTOUT falls to L level, thereby that, the second instruction IN2 has failed to be executed is announced.

In the case where the second instruction IN2 is executed while only the bit Sb1 of the shift register 30 is "1", the output signal from the inverted output terminal #Q of the flip-flop 89 fails to L level. The output of the AND gate 90 thus keeps L level, and the monitor output signal WDTOUT keeps H level.

By the way, with the watch dog timer according to the 21st embodiment of the invention shown in FIG. 60, an arbitrary value is required to be set in advance in each bit of the shift register 30. For this purpose, a predetermined value may be set forcibly, for example, at the time of resetting or at the time of initialization with the rising of the program.

As described in detail above, in the watch dog timer according to the invention, the problem is overcome which may arise under an abnormal condition wherein the monitor signal has a periodicity shorter than a normal length of cycle or where it has a longer interval than the normal length of period. Also, the length of the period reloadable from a reload register into a shift register can be set arbitrarily in advance.

Further, since the pattern of the contents to be monitored can be set arbitrarily, various contents including the long/short pulses of H and L level can be monitored as compared with the conventional watch dog timer in which only the interval of each period was detected.

Further, in the multiprocessor system, the manner in which the CPU instruction is executed is monitored with a comparably small circuit size.

Furthermore, it is possible to set the number of times of normal inputs of a monitor signal in returning from an abnormal detecting condition to a normal detecting condition. Therefore, a setting is possible in accordance with the reliability requirement of the object to be monitored.

As this invention may be embodied in several forms without departing from the spirit of essential characteristics thereof the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A watch dog timer for monitoring whether or not an object to be monitored is operating normally by detecting a periodicity of a monitor signal which varies in a predetermined cycle while said object to be monitored is in a normal operation, comprising:

a shift register having a plurality of bits, in which data set initially in each bit are sequentially shifted among the bits by a shift clock;

a reload register having a plurality of bits, for holding data to be set initially in said shift register and reloading said data into said shift register when a reload signal is given;

reloading means, which sets a reloadable period in a case where data located in predetermined bit of said shift register is a predetermined value, for reloading the data held in said reload register to said shift register when said reload signal in response to a reload request signal generated in response to a predetermined condition of said monitor signal is given during the reloadable period;

first fault detecting means for detecting a first abnormal condition when said reload request signal is given thereto before said reloadable period; and second fault detecting means for detecting a second abnormal condition in the case where said reloadable period has elapsed in absence of said reload request signal;

wherein a length of the reloadable period can be changed by changing a number of series of predetermined data to be located at said predetermined bits of said shift register.

2. The watch dog timer of claim 1, further comprising means for detecting that all of the bits of data to be set initially in said shift register have an identical value.

3. The watch dog timer of claim 1, further comprising means for detecting that data which includes intermittently a plurality of said predetermined values for setting a reloadable period during one cycle of the monitor signal and/or more than a predetermined number of serial bits are written into said shift register.

4. The watch dog timer of claim 1, further comprising means for detecting that a predetermined value for setting a reloadable period by said reloading means is not included in the data to be set initially in said shift register.

5. The watch dog timer of claim 1, further comprising means for generating shift clock initialized by the reload signal generated by said reloading means.

6. A watch dog timer for monitoring whether or not an object to be monitored is operating normally by detecting a periodicity of changing points of a monitor signal which varies in a predetermined cycle while said object to be monitored is in a normal operation, comprising:

a shift register having a plurality of bits, in which data set initially in each bit are sequentially shifted among the bits by a shift clock;

a reload register having a plurality of bits, for holding the data to be set initially in the shift register and reloading said data into the shift register when a reload signal is given;

monitoring pattern setting means for setting data which designates as a monitoring pattern a pattern of changing points and a time pattern between the changing points of said monitor signal;

monitoring pattern changing means for changing monitoring contents of said monitor signal sequentially in response to values of each bit of said shift register according to contents of the monitoring pattern set in said monitoring pattern setting means;

reload permitting means for permitting setting of a reloadable period in a case where comparison result between the data located at each bit of said shift register and the data held in each bit of said monitoring pattern setting means is a predetermined condition;

reloading means for reloading the data held in said reload register to said shift register by generating said reload signal in the case where said monitor signal becomes the predetermined condition during the reloadable period set by said reload permitting means; and signal outputting means for outputting a predetermined signal when said reloadable period has elapsed before said monitor signal does not become said predetermined condition.

7. The watch dog timer of claim 6, wherein said monitoring pattern setting means is composed of a register having a plurality of bits in which data of an arbitrary value can be set.

8. The watch dog timer of claim 6, further comprising generating means for generating shift clock initialized in synchronism with changing points of the monitor signal.

9. The watch dog timer of claim 6, wherein said monitoring pattern setting means is composed of a circuit for generating fixed values, and the watch dog timer further comprising shift clock cycle changing means for changing a cycle of the shift clock.

10. The watch dog timer of claim 6, wherein said monitoring pattern setting means is composed of a circuit for generating fixed values, and the watch dog timer further comprising shift clock cycle changing means for changing a cycle of the shift clock; and generating means for generating shift clock initialized in synchronism with the changing points of the monitor signal.

11. The watch dog timer of claim 6 further comprising means for detecting that all of the bits of data to be set initially in said shift register have an identical value.

12. The watch dog timer of claim 6, further comprising means for detecting that data which includes intermittently a plurality of said predetermined values for setting a reloadable period during one cycle of the monitor signal and/or more than a predetermined number of serial bits are written into said shift register.

13. The watch dog timer of claim 6, further comprising means for detecting that a predetermined value for setting a reloadable period by said reloading means is not included in the data to be set initially in said shift register.

14. A watch dog timer which monitors a monitor signal having a periodicity outputted from an object to be monitored, outputs a first signal assuming as a normal condition in a case where one cycle of said monitor signal is in a predetermined condition, and outputs a second signal assuming as an abnormal condition in the case where one cycle of said monitor signal is not in a predetermined condition, comprising:

normal input detecting means for detecting the start of each one cycle of said monitor signal; and a register for setting a number of detections by said normal input detecting means;

wherein under a condition that said second signal is outputted, said first signal is outputted in the case where said normal input detecting means has successively performed detecting operations by times set in said register before said monitor signal is detected not in a predetermined condition.

15. A watch dog timer which monitors whether or not an object to be monitored iteratively executing a first instruction in a predetermined cycle when it is normally operating in a normal operation, comprising:

a shift register having a plurality of bits, in which the data set initially in each bit are sequentially shifted among the bits by the shift clock;

a reload register including a plurality of bits, for holding data to be set initially in said shift register and reloading said data into said shift register when a reload signal is given;

monitoring pattern setting means for setting data designating the cycle during which said object to be monitored executes said first instruction and a timing at which said object to be monitored executes a second instruction between the executions of said first instruction;

monitoring pattern changing means for sequentially changing the monitoring contents in response to the values of each bit data of said shift register according to the contents of the monitoring pattern set in said monitoring pattern setting means;

reload permitting means for permitting setting of a reloadable cycle in a case where comparison result between the data located in each bit of said shift register and the data held in each bit of said monitoring pattern setting means is a predetermined condition;

reloading means for reloading the data held in said reload register to said shift register by generating the reload signal when said first instruction is executed during the reloadable period set by said reload permitting means; and signal outputting means for outputting a predetermined signal when said reloadable period has elapsed without executing said first instruction.

16. The watch dog timer of claim 15, wherein said monitoring pattern setting means is composed of a register having a plurality of bits in which data of an arbitrary value can be set.

17. The watch dog timer of claim 15, further comprising generating means for generating shift clock initialized in synchronism with changing points of the monitor signal.

18. The watch dog timer of claim 15, wherein said monitoring pattern setting means is composed of a circuit for generating fixed values, and the watch dog timer further comprising shift clock cycle changing means for changing a cycle of the shift clock.

19. The watch dog timer of claim 15, wherein said monitoring pattern setting means is composed of a circuit for generating fixed values, and the watch dog timer further comprising shift clock cycle changing means for changing a cycle of the shift clock; and generating means for generating shift clock initialized in synchronism with the changing points of the monitor signal.

20. The watch dog timer of claim 15 further comprising means for detecting that all of the bits of data to be set initially in said shift register have an identical value.

21. The watch dog timer of claim 15 further comprising means for detecting that data which includes intermittently a plurality of said predetermined values for setting a reloadable period during one cycle of the monitor signal and/or more than a predetermined number of serial bits are written into said shift register.

22. The watch dog timer of claim 15, further comprising means for detecting that a predetermined value for setting a reloadable period by said reloading means is not included in the data to be set initially in said shift register.

23. A watch dog timer which monitors whether or not an object to be monitored for iteratively executing a first instruction in a predetermined cycle when it is operating normally in a normal operation, comprising:

a shift register having a plurality of bits, for setting data designating a cycle during which said object to be monitored executes said first instruction and a timing at which said object to be monitored executes a second instruction between executions of said first instruction, in which the data set in the bits are rotatively shifted among the bits by the shift clock;

monitoring pattern changing means for sequentially changing monitoring contents in response to a value of each bit data of said shift register; and shift clock cycle changing means for changing the cycle of the shift clock.

* * * * *